US012500040B2

(12) United States Patent
Sundaram et al.

(10) Patent No.: US 12,500,040 B2
(45) Date of Patent: Dec. 16, 2025

(54) PLANAR HIGH-DENSITY ALUMINUM CAPACITORS FOR STACKING AND EMBEDDING

(71) Applicant: SARAS MICRO DEVICES, INC., Atlanta, GA (US)

(72) Inventors: Venkatesh Sundaram, Atlanta, GA (US); Markondeyaraj Pulugurtha, Atlanta, GA (US); Dewei Zhu, Atlanta, GA (US); Thomas J. Beck, Atlanta, GA (US); Courtney Timms, Atlanta, GA (US); Mary Pickens, Atlanta, GA (US); Urmi Ray, Atlanta, GA (US); Bart Deprospo, Atlanta, GA (US); Kyle Dasch, Atlanta, GA (US); Jen-Chwen Lin, Atlanta, GA (US); Rajesh Gopalaswamy, Atlanta, GA (US); Kevin Mark Johnson, Merritt Island, FL (US)

(73) Assignee: Saras Micro Devices, Inc., Atlanta, GA (US)

( * ) Notice: Subject to any disclaimer, the term of this patent is extended or adjusted under 35 U.S.C. 154(b) by 461 days.

(21) Appl. No.: 17/760,356

(22) PCT Filed: Feb. 5, 2021

(86) PCT No.: PCT/US2021/016757
§ 371 (c)(1),
(2) Date: Aug. 8, 2022

(87) PCT Pub. No.: WO2021/158879
PCT Pub. Date: Aug. 12, 2021

(65) Prior Publication Data
US 2023/0067888 A1     Mar. 2, 2023

Related U.S. Application Data

(60) Provisional application No. 63/199,229, filed on Dec. 15, 2020, provisional application No. 63/198,243, (Continued)

(51) Int. Cl.
*H01G 9/045*     (2006.01)
*C23C 14/16*     (2006.01)
(Continued)

(52) U.S. Cl.
CPC .............. *H01G 9/045* (2013.01); *C23C 14/16* (2013.01); *C23C 16/403* (2013.01);
(Continued)

(58) Field of Classification Search
CPC ...... H01G 9/045; H01G 9/0032; H01G 9/012; H01G 9/048; H01G 9/055; H01G 9/07;
(Continued)

(56) References Cited

U.S. PATENT DOCUMENTS

2002/0122283 A1* 9/2002 Higashi .................. H01G 9/042
257/E23.062
2003/0007311 A1* 1/2003 Kojima .................. H01G 9/012
29/25.03
(Continued)

FOREIGN PATENT DOCUMENTS

CN      104282441 A  *  1/2015
JP       2007173439 A      7/2007
(Continued)

OTHER PUBLICATIONS

International Search Report dated Jul. 21, 2021, PCT/US2021/016757.

*Primary Examiner* — Timothy J. Dole
*Assistant Examiner* — Daniel M Dubuisson
(74) *Attorney, Agent, or Firm* — Stetina Garred Brucker & Newboles

(57) ABSTRACT

Multi-terminal capacitor devices and methods of making multi-terminal capacitor devices are described herein. The multi-terminal capacitor devices may include a plurality of individual capacitors arranged in a single device layer, such as high surface area capacitors. A individual capacitor may include an aluminum foil-based electrode, an aluminum oxide dielectric layer conformal with the aluminum foil-based electrode, and a conductive material electrode, such as a conducting polymer or a conductive ceramic, in conformal contact with the dielectric layer.

41 Claims, 21 Drawing Sheets

Related U.S. Application Data filed on Oct. 6, 2020, provisional application No. 62/704,941, filed on Jun. 3, 2020, provisional application No. 62/971,026, filed on Feb. 6, 2020.

(51) Int. Cl.

| | | |
|---|---|---|
| *C23C 16/40* | (2006.01) | |
| *C23C 16/455* | (2006.01) | |
| *C23C 18/16* | (2006.01) | |
| *C23C 18/32* | (2006.01) | |
| *C23C 28/00* | (2006.01) | |
| *H01G 9/00* | (2006.01) | |
| *H01G 9/012* | (2006.01) | |
| *H01G 9/048* | (2006.01) | |
| *H01G 9/055* | (2006.01) | |
| *H01G 9/07* | (2006.01) | |

(52) U.S. Cl.
CPC .... *C23C 16/45525* (2013.01); *C23C 18/1637* (2013.01); *C23C 18/165* (2013.01); *C23C 18/32* (2013.01); *C23C 28/322* (2013.01); *H01G 9/0032* (2013.01); *H01G 9/012* (2013.01); *H01G 9/048* (2013.01); *H01G 9/055* (2013.01); *H01G 9/07* (2013.01)

(58) Field of Classification Search
CPC . H01G 9/26; H01G 9/15; C23C 14/16; C23C 16/403; C23C 16/45525; C23C 18/1637; C23C 18/165; C23C 18/32; C23C 28/322; Y02E 60/13; H05K 1/113; H05K 1/162
See application file for complete search history.

(56) References Cited

U.S. PATENT DOCUMENTS

| | | | |
|---|---|---|---|
| 2004/0246690 A1* | 12/2004 | Nakamura | H01L 23/49827 257/E21.511 |
| 2006/0120014 A1 | 6/2006 | Nakamura | |
| 2006/0202346 A1* | 9/2006 | Shih | H01L 23/53238 257/774 |
| 2008/0216296 A1* | 9/2008 | Prymak | H01G 9/055 29/25.03 |
| 2010/0020473 A1 | 1/2010 | Prymak | |
| 2016/0329158 A1* | 11/2016 | Hattori | H01G 9/012 |
| 2017/0018368 A1* | 1/2017 | Ito | H01G 9/042 |
| 2019/0080849 A1 | 3/2019 | Fujii | |
| 2021/0082630 A1* | 3/2021 | Furukawa | H01G 9/0029 |
| 2022/0278035 A1* | 9/2022 | Otani | H05K 1/16 |

FOREIGN PATENT DOCUMENTS

| | | | |
|---|---|---|---|
| JP | 2008078301 A | | 4/2008 |
| JP | 2009224555 A | * | 10/2009 |
| WO | 2012042950 A1 | | 4/2012 |
| WO | 2021158879 A1 | | 8/2021 |

* cited by examiner

PLANAR HIGH-DENSITY ALUMINUM CAPACITORS FOR STACKING AND EMBEDDING

CROSS-REFERENCE TO RELATED APPLICATIONS

This application claims the benefit of and priority to U.S. Provisional Application No. 62/971,026, filed on Feb. 6, 2020, U.S. Provisional Application 62/704,941, filed on Jun. 3, 2020, U.S. Provisional Application 63/198,243, filed on Oct. 6, 2020, and U.S. Provisional Application No. 63/199,229, filed on Dec. 15, 2020, all of which are hereby incorporated by reference in their entireties.

FIELD

The present disclosure relates to electronic devices generally and more specifically to aluminum-based capacitors having high capacitance for use in semiconductor packages and circuits.

BACKGROUND

Capacitors are an important part of many integrated and embedded circuits, and are commonly used as energy storage structures, filters, or as specific components of complex circuits. Capacitors generally include high surface area to achieve high capacitance values and are commonly arranged as a pair of thin electrodes separated by a dielectric and rolled into a tight cylindrical structure to optimize the surface area per unit volume. They are also made as deep trenches in silicon to benefit from more surface area, or as layers of dielectric and metal stacked and connected to each other to benefit from both permittivity and surface area.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

The present disclosure provides high-capacitance capacitors and methods of making capacitors. The disclosed capacitors can be arranged as an array or plurality of individual capacitors in single device layer. The individual capacitors may be independent (e.g., electrically independent) and/or electrically isolated from one another. The individual capacitors can optionally share electrodes with other individual capacitors and still remain electrically isolated from one another. The capacitors can have very high capacitances and are capable of storing high amounts of charge, for example by using high-surface area electrodes separated by very thin dielectric layers. Capacitors in the array can be individually addressable, such that by addressing different capacitors, any desirable amount of capacitance can be available. In some cases, the individual capacitors can be organized as a multi-terminal capacitor device.

Example multi-terminal capacitor devices may comprise a plurality of individual capacitors arranged in a single device layer, and a plurality of capacitor terminals including one or more first electrode terminals and one or more second electrode terminals. Optionally, each individual capacitor may comprise a first electrode comprising a modified aluminum foil; a dielectric layer conformal with the first electrode, the dielectric layer comprising aluminum oxide; and a second electrode comprising a conductive material in conformal contact with the dielectric layer. One or more, or each, first electrode terminal may be in electrical contact with one or more first electrodes. One or more, or each, second electrode terminal in electrical contact with one or more second electrodes.

Different electrode arrangements may be used with the multi-terminal capacitor devices described herein. For example, the anodes of each individual capacitor may be independent, individualized, distinct, or discretized, while the cathode is shared among one or more, or all, individual capacitors. In some embodiments, such an arrangement may be referred to as a continuous cathode and independent, individualized, distinct, or discretized anode configuration. Optionally, the plurality of individual capacitors may comprise a continuous first electrode, such as a continuous first electrode that comprises modified aluminum foil. The continuous first electrode may optionally correspond to the first electrode of one or more, or each, of the plurality of individual capacitors. Optionally, the plurality of individual capacitors may comprise a continuous dielectric layer conformal with the continuous first electrode, such as a continuous dielectric layer that comprises the aluminum oxide. Optionally, the continuous dielectric layer corresponds to the dielectric layer of each of the plurality of individual capacitors. Optionally, the plurality of individual capacitors may comprise a plurality of individual second electrodes each in conformal contact with the continuous dielectric layer. The plurality of individual second electrodes may optionally comprise a conductive material. In some embodiments one or more or each of the plurality of individual second electrodes may be spatially separated from adjacent individual second electrodes by a spacing. Optionally, one or more, or each, of the plurality of individual second electrodes corresponds to the second electrode of different individual capacitors of the plurality of individual capacitors.

As another example, the cathodes of each individual capacitor may be independent, individualized, distinct, or discretized, while the anode is shared among one or more, or all, individual capacitors. In some embodiments, such an arrangement may be referred to as a continuous anode and independent, individualized, distinct, or discretized cathode configuration. Optionally, the plurality of individual capacitors comprises a plurality of individual first electrodes, such as a plurality of individual first electrodes that comprises the modified aluminum foil. Optionally, one or more or each of the plurality of individual first electrodes is spatially separated from adjacent individual first electrodes by a spacing. Optionally, one or more or each of the plurality of individual first electrodes corresponds to the first electrode of different individual capacitors of the plurality of individual capacitors. Optionally, the plurality of individual capacitors comprises a plurality of individual dielectric layers, such as a plurality of individual dielectric layers that is conformal with a corresponding individual first electrode. Optionally one or more or each of the plurality of individual dielectric layers comprises aluminum oxide. Optionally, one or more or each of the plurality of individual dielectric layers corresponds to the dielectric layer of different individual capacitors of the plurality of individual capacitors. Optionally, the plurality of individual capacitors comprises a continuous second electrode in conformal contact with each of the plurality of individual dielectric layers, such as a continuous second electrode that comprises a conductive material. Optionally, the continuous second electrode corresponds to the second electrode of each of the plurality of individual capacitors.

As another example, the cathodes of each individual capacitor may be independent, individualized, distinct, or discretized, while the anodes of each individual capacitor is also independent, individualized, distinct, or discretized. In some embodiments, such an arrangement may be referred to as an independent, individualized, distinct, or discretized anode and independent, individualized, distinct, or discretized cathode configuration. Optionally, the plurality of individual capacitors comprises a plurality of individual first electrodes, such as a plurality of individual first electrodes that comprises modified aluminum foil. Optionally, the plurality of individual first electrodes is spatially separated from adjacent individual first electrodes by a spacing. Optionally, one or more or each of the plurality of individual first electrodes corresponds to the first electrode of different individual capacitors of the plurality of individual capacitors. Optionally, the plurality of individual capacitors comprises a plurality of individual dielectric layers, such as a plurality of individual dielectric layers that is conformal with a corresponding individual first electrode. Optionally, each of the plurality of individual dielectric layers comprises the aluminum oxide. Optionally, each of the plurality of individual dielectric layers corresponds to the dielectric layer of different individual capacitors of the plurality of individual capacitors. Optionally, the plurality of individual capacitors comprises a plurality of individual second electrodes. Optionally, one or more or each of the plurality of individual second electrodes is in conformal contact with a corresponding individual dielectric layer. Optionally, one or more or each of the plurality of individual second electrodes comprises a conductive material. Optionally, one or more or each of the plurality of individual second electrodes is spatially separated from adjacent individual second electrodes by the spacing. Optionally, one or more or each of the plurality of individual second electrodes corresponds to the second electrode of different individual capacitors of the plurality of individual capacitors.

Continuous electrodes, individual electrodes, spacings, or the like may have any suitable dimensions. For example, a continuous electrode may have lateral dimensions of from about 1 µm to about 100 mm, such as from 1 µm to 10 µm, from 1 µm to 100 µm, from 1 µm to 1 mm, from 1 µm to 10 mm, from 1 µm to 100 mm, from 10 µm to 100 µm, from 10 µm to 1 mm, from 10 µm to 10 mm, from 10 µm to 100 mm, from 100 µm to 1 mm, from 100 µm to 10 mm, from 100 µm to 100 mm, from 1 mm to 10 mm, from 1 mm to 100 mm, or from 10 mm to 100 mm. For example, individual electrodes may each independently have lateral dimensions of from about 1 µm to about 50 mm, such as from 1 µm to 10 µm, from 1 µm to 50 µm, from 1 µm to 100 µm, from 1 µm to 500 µm, from 1 µm to 1 mm, from 1 µm to 5 mm, from 1 µm to 10 mm, from 1 µm to 50 mm, from 10 µm to 50 µm, from 10 µm to 100 µm, from 10 µm to 500 µm, from 10 µm to 1 mm, from 10 µm to 5 mm, from 10 µm to 10 mm, from 10 µm to 50 mm, from 50 µm to 100 µm, from 50 µm to 500 µm, from 50 µm to 1 mm, from 50 µm to 5 mm, from 50 µm to 10 mm, from 50 µm to 50 mm, from 100 µm to 500 µm, from 100 µm to 1 mm, from 100 µm to 5 mm, from 100 µm to 10 mm, from 100 µm to 50 mm, from 500 µm to 1 mm, from 500 µm to 5 mm, from 500 µm to 10 mm, from 500 µm to 50 mm, from 1 mm to 5 mm, from 1 mm to 10 mm, from 1 mm to 50 mm, from 5 mm to 10 mm, from 5 mm to 50 mm, or from 10 mm to 50 mm. Optionally, a spacing between individual electrodes and/or individual capacitors may be from about 1 µm to about 10 mm, such as from 1 µm to 10 µm, from 1 µm to 50 µm, from 1 µm to 100 µm, from 1 µm to 500 µm, from 1 µm to 1 mm, from 1 µm to 10 mm, from 10 µm to 50 µm, from 10 µm to 100 µm, from 10 µm to 500 µm, from 10 µm to 1 mm, from 10 µm to 10 mm, from 50 µm to 100 µm, from 50 µm to 500 µm, from 50 µm to 1 mm, from 50 µm to 10 mm, from 100 µm to 500 µm, from 100 µm to 1 mm, from 100 µm to 10 mm, from 500 µm to 1 mm, from 500 µm to 10 mm, or from 1 mm to 10 mm.

In some cases, capacitors can be arranged in a stacked configuration, which may be referred to as a vertically stacked arrangement or a multiple device layer configuration. For example, a multi-terminal capacitor device may comprise one or more additional device layers positioned adjacent to the single device layer in a stacked configuration. Optionally, one or more, or each, of the one or more additional device layers may include a plurality of additional individual capacitors. For example, one or more, or each, additional individual capacitor may be the same as or different from other individual capacitors. Optionally, an additional individual capacitor may comprise an additional first electrode comprising modified aluminum foil; an additional dielectric layer conformal with the additional first electrode, the additional dielectric layer comprising aluminum oxide; and an additional second electrode comprising conductive material in conformal contact with the additional dielectric layer. Optionally, a multi-terminal capacitor device may comprise an additional plurality of capacitor terminals including one or more additional first electrode terminals and one or more additional second electrode terminals, such as where one or more or each additional first electrode terminal in electrical contact with one or more additional first electrodes and where one or more or each additional second electrode terminal in electrical contact with one or more additional second electrodes. Optionally, the single device layer and the one or more additional device layers are stacked so as to occupy a same areal footprint. Optionally, a total capacitance of the multi-terminal capacitor device is a sum of a first capacitance provided by the single device layer and additional capacitances provided by the one or more additional device layers. Optionally, one or more, or each, single device layer has a thickness of from about 50 µm to about 500 µm, such as from 50 µm to 100 µm, from 50 µm to 200 µm, from 50 µm to 300 µm, from 50 µm to 400 µm, from 50 µm to 500 µm, from 100 µm to 200 µm, from 100 µm to 300 µm, from 100 µm to 400 µm, from 100 µm to 500 µm, from 200 µm to 300 µm, from 200 µm to 400 µm, from 200 µm to 500 µm, from 300 µm to 400 µm, from 300 µm to 500 µm, or from 400 µm to 500 µm.

A variety of aluminum foil-based or modified aluminum foil electrodes may be used with the capacitors and multi-terminal capacitor devices described herein. For example, the modified aluminum foil may comprise an etched aluminum foil. Optionally, the modified aluminum foil comprises an aluminum foil that is etched on one or both surfaces. Optionally, the etched aluminum foil comprises a plurality of tunnels corresponding to recessed regions within the modified aluminum foil. Optionally, the dielectric layer extends within the plurality of tunnels and conformally coats a surface therein. In some embodiments, an aluminum foil-based electrode or a modified aluminum foil electrode comprises aluminum having a purity of greater than 80%. Optionally, an aluminum foil-based electrode or a modified aluminum foil electrode has a thickness of from 5 µm to 500 µm. Optionally, an aluminum foil-based electrode or a modified aluminum foil electrode exhibits a volumetric surface area of from 100 mm$^2$/mm$^3$ to 10,000 mm$^2$/mm$^3$. Optionally, an aluminum foil-based electrode or a modified aluminum foil electrode comprises sintered aluminum powder supported by and in physical and electrical contact with an aluminum foil substrate. Optionally, an aluminum foil-based electrode or a modified aluminum foil electrode comprises an aluminum alloy including one or more alloying elements or dopants selected from Ti, Zr, Si, Mg, Cu, Ta, Ba, or Ce. Optionally, an aluminum foil-based electrode or a modified aluminum foil electrode comprises vapor deposited aluminum, aluminum oxide, titanium, or titanium oxide, such as in powder form. Optionally, a powder may be deposited using a glancing angle deposition (GLAD) process.

A variety of dielectric layers may be suitable for use with the capacitors and multi-terminal capacitor devices described herein. For example, the dielectric layer may comprise aluminum oxide. Aluminum oxide may optionally be generated by subjecting an aluminum foil-based electrode or modified aluminum foil electrode to anodizing conditions or an anodizing process. Optionally, the dielectric layer comprises aluminum oxide doped with one or more other oxides, such as oxides of Ti, Zr, Si, Mg, Cu, Ta, Ba, or Ce. Optionally, the dielectric layer has a dielectric constant of from 5 to 1000. Optionally, the dielectric layer has a thickness of from 3 nm to 100 nm. Optionally, the dielectric layer is formed through a process including anodizing the modified aluminum foil.

As examples of the conductive material, conducting polymers, metals, or conductive ceramics may be used. A variety of conducting polymer electrodes may be suitable for use with the capacitors and multi-terminal capacitor devices described herein. For example, the conducting polymer may comprise one or more of a polypyrrole, a polythiophene, a polyaniline, a polyacetylene, a polyphenylene, a poly(p-phenylene-vinylene), PEDOT:PSS (poly(3,4-ethylenedioxythiophene) polystyrene sulfonate), or P3HT (poly(3-hexylthiophene-2,5-diyl)). An example of a conductive ceramic that may be used is TiN. Conductive ceramics may be useful as these materials may provide very high intimacy of and/or conformal contact between the conductive ceramic layer and the dielectric layer. Use of conductive ceramics may also or alternatively allow for very high capacitance, very low equivalent series resistance (e.g., less than 50 mΩ*mm$^2$), and/or handling of very high currents. Optionally, the conductive material at least partially conformally coats non-planar regions of the first electrode and is separated from the first electrode by the dielectric layer. For example, in an etched foil-based capacitor, the conductive material may extend into and/or fill tunnels in the etched foil. Optionally, a conductive material used as an electrode may have a thickness of from 5 nm to 50 µm.

The capacitors and multi-terminal capacitor devices described herein may exhibit various different properties and may be used in or suitable for use in a variety of applications. For example, one or more, or each, of the plurality of individual capacitors may exhibit a capacitance density of from 0.05 µF/mm$^2$ to 25 µF/mm$^2$. Optionally, one or more, or each, of the plurality of individual capacitors are independently electrically addressable. Optionally, one or more, or each, of the plurality of individual capacitors have independent lateral dimensions. For example, one or more, or each, of the plurality of individual capacitors may have a footprint of from about 0.1 mm$^2$ to about 2500 mm$^2$, such as from 0.1 mm$^2$ to 0.5 mm$^2$, from 0.1 mm$^2$ to 1 mm$^2$, from 0.1 mm$^2$ to 5 mm$^2$, from 0.1 mm$^2$ to 10 mm$^2$, from 0.1 mm$^2$ to 50 mm$^2$, from 0.1 mm$^2$ to 100 mm$^2$, from 0.1 mm$^2$ to 500 mm$^2$, from 0.1 mm$^2$ to 2500 mm$^2$, from 0.5 mm$^2$ to 1 mm$^2$, from 0.5 mm$^2$ to 5 mm$^2$, from 0.5 mm$^2$ to 10 mm$^2$, from 0.5 mm$^2$ to 50 mm$^2$, from 0.5 mm$^2$ to 100 mm$^2$, from 0.5 mm$^2$ to 500 mm$^2$, from 0.5 mm$^2$ to 2500 mm$^2$, from 1 mm$^2$ to 5 mm$^2$, from 1 mm$^2$ to 10 mm$^2$, from 1 mm$^2$ to 50 mm$^2$, from 1 mm$^2$ to 100 mm$^2$, from 1 mm$^2$ to 500 mm$^2$, from 1 mm$^2$ to 2500 mm$^2$, from 5 mm$^2$ to 10 mm$^2$, from 5 mm$^2$ to 50 mm$^2$, from 5 mm$^2$ to 100 mm$^2$, from 5 mm$^2$ to 500 mm$^2$, from 5 mm$^2$ to 2500 mm$^2$, from 10 mm$^2$ to 50 mm$^2$, from 10 mm$^2$ to 100 mm$^2$, from 10 mm$^2$ to 500 mm$^2$, from 10 mm$^2$ to 2500 mm$^2$, from 50 mm$^2$ to 100 mm$^2$, from 50 mm$^2$ to 500 mm$^2$, from 50 mm$^2$ to 2500 mm$^2$, from 100 mm$^2$ to 500 mm$^2$, from 100 mm$^2$ to 2500 mm$^2$, or from 500 mm$^2$ to 2500 mm$^2$.

Other components or structures may be useful with the capacitors and multi-terminal capacitor devices described herein. For example, a multi-terminal capacitor device may further comprising a substrate or transfer tape supporting the plurality of individual capacitors.

Optionally, a capacitor or multi-terminal capacitor device may comprise a conducting carbonaceous layer in physical contact with the conductive material. Conducting carbonaceous layers may be useful for decreasing a contact resistance between a conductive material electrode and an adjacent material, such as a metal. Useful conducting carbonaceous layers include one or more of carbon black, graphite, a carbon-based ink, a polymeric binder, sputtered carbon, or carbon-polymer composites. Optionally, a conducting carbonaceous layer has a thickness of from 100 nm to 50 µm or from 100 nm to 100 µm.

A capacitor or multi-terminal capacitor device may comprise a diffusion barrier layer in electrical contact with the conductive material. Useful diffusion barrier layer include one or more of Ti, W, Cr, Ti—W, TaN, or Co—W. Optionally, a diffusion barrier layer has a thickness of from 10 nm to 2500 nm.

A capacitor or multi-terminal capacitor device may comprise a metallization layer in electrical contact with the conductive material. Useful metallization layers may include one or more of Ag, Au, Cu, Pt, Pd, and/or composites or alloys of these, polymers, epoxies, silicones, or fluoroelastomers. Optionally, a metallization layer has a thickness of from 100 nm to 2500 nm.

A capacitor or multi-terminal capacitor device may comprise a metal contact layer in electrical contact with the conductive material. Useful metal contact layers include, but are not limited to, those comprising Cu or Ag. Optionally, a metal contact layer has a thickness of from 0.5 µm to 50 µm.

A capacitor or multi-terminal capacitor device may comprise a dielectric planarization layer positioned adjacent to the plurality of individual capacitors. A capacitor or multi-terminal capacitor device may comprise one or a plurality of conductor filled vias. Optionally, one or more or each conductor filled via may extend through the dielectric planarization layer. In some cases, a conductor filled via may be or correspond to a through-hole via and may extend from one side of a device to the opposite side of the device and may optionally be a plated through-hole via. Optionally, one or more or each conductor filled via may provide electrical contact between a corresponding capacitor terminal and a corresponding first electrode or corresponding second electrode. Optionally, a dielectric planarization layer has a thickness of from 1 μm to 100 μm. A capacitor or multi-terminal capacitor device may comprise an insulating material in a spacing separating adjacent individual capacitors. A capacitor or multi-terminal capacitor device may comprise a plurality of conductor filled vias. Optionally, one or more, or each, conductor filled via may be positioned within the spacing separating adjacent individual capacitors and extend through the insulating material. Optionally, each conductor filled via provides electrical contact between a corresponding capacitor terminal and a corresponding first electrode or corresponding second electrode.

In an aspect, methods are described herein, such as methods for making capacitors or multi-terminal capacitor devices. An example method of this aspect comprises providing a capacitor; patterning the capacitor to remove portions of the capacitor to form a plurality of individual capacitors arranged in a single device layer; and providing a plurality of capacitor terminals including one or more first electrode terminals and one or more second electrode terminals. Optionally, a capacitor comprises a first electrode comprising a modified aluminum foil; a dielectric layer conformal with the first electrode, the dielectric layer comprising aluminum oxide; and a second electrode comprising a conductive material in conformal contact with the dielectric layer. Optionally, each first electrode terminal of the one or more first electrode terminals is in electrical contact with one or more of the first electrodes. Optionally, each second electrode terminal of the one or more second electrode terminals is in electrical contact with one or more of the second electrodes, thereby generating a multi-terminal capacitor device.

Another method of this aspect may comprise a method of making or providing a capacitor. For example, a method of this aspect may comprise providing a modified aluminum foil; subjecting the modified aluminum foil to an anodizing process, such as an anodizing process that generates the dielectric layer conformal with the modified aluminum foil as a first electrode; and arranging the conductive material adjacent to the dielectric layer. Optionally, making or providing a capacitor comprises one or more of: depositing a conducting carbonaceous layer over the conductive material; depositing a diffusion barrier layer over the conductive material; or depositing a metallization layer over the conductive material. Optionally, making or providing a capacitor comprises patterning the modified aluminum foil prior to arranging the conductive material adjacent to the dielectric layer. Optionally, the modified aluminum foil is patterned prior to arranging the conductive material adjacent to the dielectric layer.

Optionally, patterning a capacitor comprises one or more of patterning the first electrode to generate a plurality of individual first electrodes; patterning the dielectric layer to generate a plurality of individual dielectric layers; or patterning the second electrode to generate a plurality of individual second electrodes. Optionally, patterning the capacitor comprises one or more of: masking and etching the capacitor; subjecting the capacitor to a laser etching or laser ablation process; or mechanically dicing the capacitor. Optionally, patterning the capacitor comprises depositing a polymer isolation bridge pattern; and depositing a conductive material so that it is contained within the polymer isolation bridge pattern. Optionally, patterning the capacitor comprises: depositing a polymer isolation bridge pattern with polymer microdispensing or microprinting; and depositing a conductive material with microdispensing or microprinting so that it is contained within the polymer isolation bridge pattern. Optionally, masking and etching the capacitor comprises masking the second electrode with a photoresist; and wet etching of unmasked second electrode portions or plasma etching of unmasked secondary electrode portions, thereby generating a plurality of individual second electrodes.

Optionally, capacitors or multi-terminal capacitor devices may be incorporated into other devices or components. In some cases, a multi-terminal capacitor device may be a surface mount device or an integrated passive device (IPD).

Other objects and advantages will be apparent from the following detailed description of non-limiting examples.

BRIEF DESCRIPTION OF THE FIGURES

The specification makes reference to the following appended figures, in which use of like reference numerals in different figures is intended to illustrate like or analogous components.

DETAILED DESCRIPTION

Figure 1:
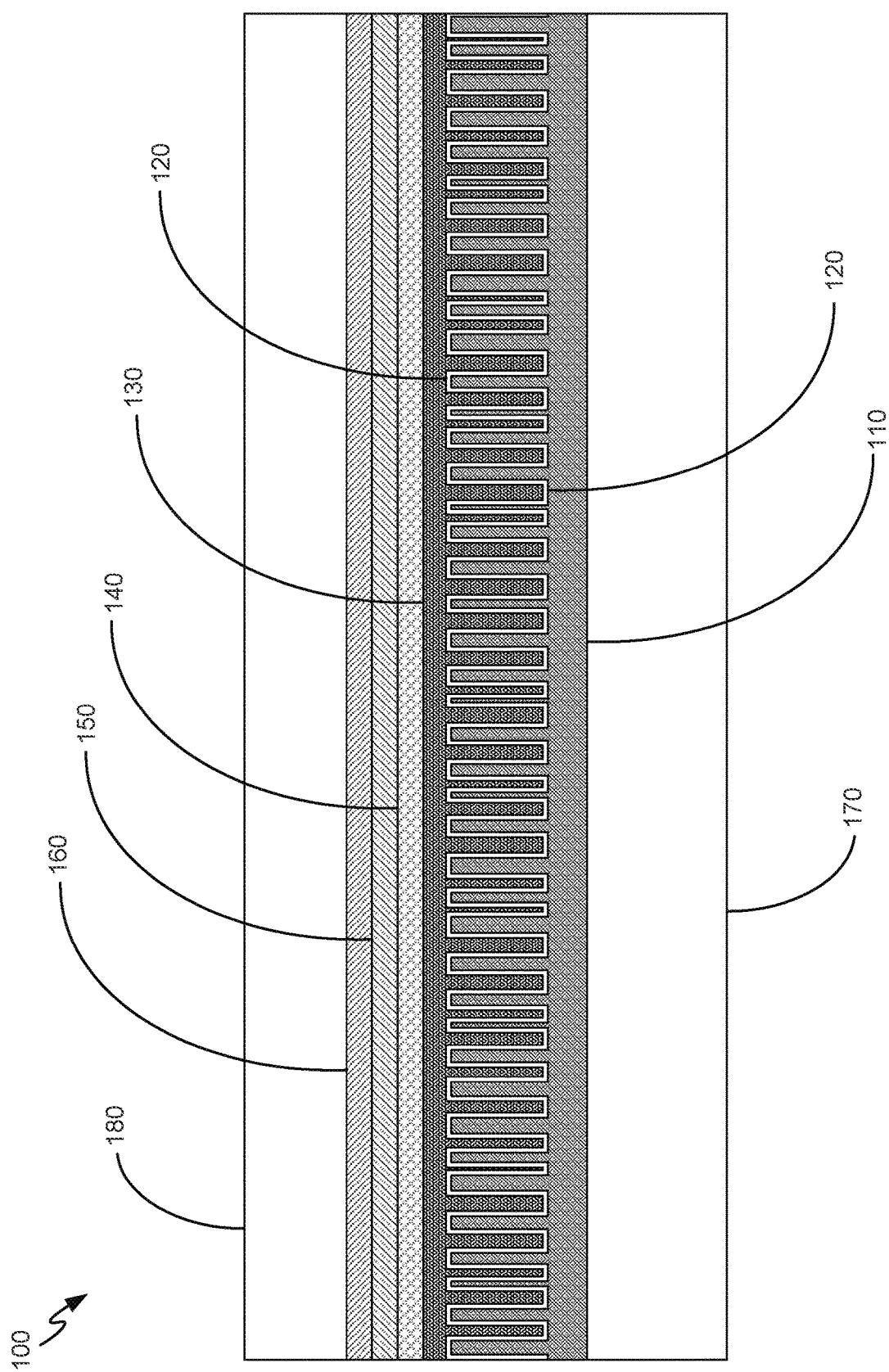
FIG. 1 provides a schematic cross-sectional illustration of a high-density capacitor.

Described herein are capacitors, multi-terminal capacitor devices, and associated methods of making and using the capacitors and multi-terminal capacitor devices. The disclosed capacitors employ a modified aluminum foil electrode and a conductive material counter electrode. A dielectric layer comprising aluminum oxide separates the two electrodes and may be formed by anodizing the modified aluminum foil electrode. By using a modified aluminum foil electrode having a high surface area and a thin conformal dielectric layer, extremely high capacitance densities per areal footprint can be achieved, such as from about 0.1 $\mu F/mm^2$ to about 25 $\mu F/mm^2$. Capacitors of this nature may optionally be referred to herein as high-density capacitors. In part due to their high capacitance densities, the capacitors described herein are useful as components of integrated circuits, embedded circuits, and surface mounted integrated passive devices, for example. Example capacitance densities of the capacitors described herein may be from 0.1 $\mu F/mm^2$ to 1 $\mu F/mm^2$, from 1 $\mu F/mm^2$ to 5 $\mu F/mm^2$, from 5 $\mu F/mm^2$ to 10 $\mu F/mm^2$, from 10 $\mu F/mm^2$ to 15 $\mu F/mm^2$, from 15 $\mu F/mm^2$ to 20 $\mu F/mm^2$, from 20 $\mu F/mm^2$ to 25 $\mu F/mm^2$, from 0.1 $\mu F/mm^2$ to 25 $\mu F/mm^2$, from 1 $\mu F/mm^2$ to 25 $\mu F/mm^2$, from 5 $\mu F/mm^2$ to 25 $\mu F/mm^2$, from 10 $\mu F/mm^2$ to 25 $\mu F/mm^2$, from 15 $\mu F/mm^2$ to 25 $\mu F/mm^2$, from 0.1 $\mu F/mm^2$ to 20 $\mu F/mm^2$, from 1 $\mu F/mm^2$ to 20 $\mu F/mm^2$, from 5 $\mu F/mm^2$ to 20 $\mu F/mm^2$, from 10 $\mu F/mm^2$ to 20 $\mu F/mm^2$, from 0.1 $\mu F/mm^2$ to 15 $\mu F/mm^2$, from 1 $\mu F/mm^2$ to 15 $\mu F/mm^2$, from 5 $\mu F/mm^2$ to 15 $\mu F/mm^2$, from 0.1 $\mu F/mm^2$ to 10 $\mu F/mm^2$, from 1 $\mu F/mm^2$ to 10 $\mu F/mm^2$, or from 0.1 $\mu F/mm^2$ to 5 $\mu F/mm^2$.

Definitions

As used herein, the terms "invention," "the invention," "this invention" and "the present invention" are intended to refer broadly to all of the subject matter of this patent application and the claims below. Statements containing these terms should be understood not to limit the subject matter described herein or to limit the meaning or scope of the patent claims below.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Unless stated otherwise, the expression "up to" when referring to the compositional amount of an element means that element is optional and includes a zero percent composition of that particular element. Unless stated otherwise, all compositional percentages are in weight percent (wt. %).

As used herein, the meaning of "a," "an," and "the" includes singular and plural references unless the context clearly dictates otherwise.

FIG. 1 provides a schematic illustration of an example capacitor 100 in accordance with the present disclosure. Capacitor 100 comprises first electrode 110. First electrode 110 may advantageously correspond to or comprise a modified aluminum foil. First electrode 110 may optionally comprise an etched aluminum foil, for example. Although first electrode 110 is depicted in FIG. 1 as having a plurality of alternating raised and recessed portions, the depiction is not intended to be limiting and is intended to represent the cross-sectional structure of an etched aluminum foil rather than a simple comb-like structure. A plurality of tunnels, voids, or recessed regions may be present within the aluminum foil's thickness, which may include tunnels that are parallel, approximately parallel, intersecting, or otherwise arranged to provide a large surface area to first electrode 110 with continuous electrical conductivity present within the aluminum structure containing the tunnels, voids, or recessed regions. Optionally, instead of or in addition to an etched foil, first electrode 110 may comprise sintered aluminum powder supported by and in physical and electrical contact with an aluminum foil substrate, for example. Optionally, glancing angle deposition or other etching methods for generating three-dimensional porous structures may be used. In some cases, only one side or surface of first electrode 110 is modified, such as with tunnels or with sintered aluminum powder, etc., as illustrated in FIG. 1. In other cases, both sides or surfaces of first electrode 110 are modified, which can be useful for approximately doubling the surface area of first electrode 110. Example surface area configurations for first electrode 110 may include a volumetric surface area of from about 100 $mm^2/mm^3$ to about 10,000 $mm^2/mm^3$, such as from 100 $mm^2/mm^3$ to 500 $mm^2/mm^3$, from 100 $mm^2/mm^3$ to 1,000 $mm^2/mm^3$, from 100 $mm^2/mm^3$ to 5,000 $mm^2/mm^3$, from 100 $mm^2/mm^3$ to 10,000 $mm^2/mm^3$, from 500 $mm^2/mm^3$ to 1,000 $mm^2/mm^3$, from 500 $mm^2/mm^3$ to 5,000 $mm^2/mm^3$, from 500 $mm^2/mm^3$ to 10,000 $mm^2/mm^3$, from 1,000 $mm^2/mm^3$ to 5,000 $mm^2/mm^3$, from 1,000 $mm^2/mm^3$ to 10,000 $mm^2/mm^3$, or from 5,000 $mm^2/mm^3$ to 10,000 $mm^2/mm^3$.

Optionally, an electrode, such as first electrode 110, comprises aluminum having a purity greater than or about 80%, greater than 85%, greater than 90%, greater than 95%, greater than or about 98%, greater than or about 99%, greater than or about 99.9% or greater than or about 99.99%. In some cases, first electrode 110 comprises an aluminum alloy. Optionally, first electrode 110 is alloyed, doped with, or otherwise comprises one or more alloying elements or dopants. Example dopants include, but are not limited to, Ti, Zr, Si, Mg, Cu, Ta, Ba, and/or Ce. An electrode, such as first electrode 110, may have any suitable thickness and optionally has a thickness from about 5 µm to about 500 µm, such as from 5 µm to 10 µm, from 10 µm to 50 µm, from 50 µm to 100 µm, from 100 µm to 200 µm, from 200 µm to 300 µm, from 300 µm to 400 µm, from 400 µm to 500 µm, from 5 µm to 100 µm, from 5 µm to 200 µm, from 10 µm to 100 µm, from 10 µm to 200 µm, from 50 µm to 200 µm, from 50 µm 300 µm, from 50 µm to 400 µm, or from 100 µm to 500 µm.

Capacitor 100 also comprises dielectric layer 120. Dielectric layer 120 may advantageously be conformal over first electrode 110, and may correspond to or comprise an oxide layer, such as an aluminum oxide layer. Although dielectric layer 120 is depicted in FIG. 1 as having a plurality of alternating raised and recessed portions, the depiction is not intended to be limiting and is intended to represent the cross-sectional structure of an etched aluminum foil where dielectric layer 120 coats the plurality of tunnels, voids, or recessed regions within the aluminum foil's thickness. Dielectric layer 120 may be formed through a process including anodizing first electrode 110. Optionally, dielectric layer 120 is alloyed, doped with, or otherwise comprises one or more alloying elements or dopants. Example dopants include, but are not limited to, oxides of Ti, Zr, Si, Mg, Cu, Ta, Ba, and/or Ce. Such dopants advantageously may be used to increase a dielectric constant (permittivity) to a value greater than that of pure aluminum oxide. Example dielectric constants for a dielectric layer may be from about 5 to about 1000, such as from 5 to 5.5, from 5.5 to 6, from 6 to 6.5, from 6.5 to 7, from 7 to 7.5, from 7 to 8, from 7 to 8.5, from 7 to 9, from 7 to 9.5, from 7 to 10, from 7 to 10.5, from 7 to 11, from 7 to 11.5, from 7 to 12, from 7.5 to 8, from 7.5 to 8.5, from 7.5 to 9, from 7.5 to 9.5, from 7.5 to 10, from 7.5 to 10.5, from 7.5 to 11, from 7.5 to 11.5, from 7.5 to 12, from 8 to 8.5, from 8 to 9, from 8 to 9.5, from 8 to 10, from 8 to 10.5, from 8 to 11, from 8 to 11.5, from 8 to 12, from 8.5 to 9, from 8.5 to 9.5, from 8.5 to 10, from 8.5 to 10.5, from 8.5 to 11, from 8.5 to 11.5, from 8.5 to 12, from 9 to 9.5, from 9 to 10, from 9 to 10.5, from 9 to 11, from 9 to 11.5, from 9 to 12, from 9.5 to 10, from 9.5 to 10.5, from 9.5 to 11, from 9.5 to 11.5, from 9.5 to 12, from 10 to 10.5, from 10 to 11, from 10 to 11.5, from 10 to 12, from 10.5 to 11, from 10.5 to 11.5, from 10.5 to 12, from 11 to 11.5, from 11 to 12, from 11.5 to 12, from 12 to 12.5, from 12.5 to 13, from 13 to 13.5, from 13.5 to 14, from 14 to 14.5, from 14.5 to 15, from 15 to 20, from 20 to 30, from 30 to 40, from 40 to 50, from 50 to 100, from 100 to 500, or from 500 to 1000.

A dielectric layer, such as dielectric layer 120, may have any suitable thickness and optionally has a thickness from about 3 nm to about 100 nm, such as from 3 nm to 5 nm, from 5 nm to 10 nm, from 10 nm to 15 nm, from 15 nm to 20 nm, from 20 nm to 25 nm, from 25 nm to 30 nm, from 30 nm to 35 nm, from 35 nm to 40 nm, from 40 nm to 45 nm, from 45 nm to 50 nm, from 50 nm to 55 nm, from 55 nm to 60 nm, from 60 nm to 65 nm, from 65 nm to 70 nm, from 70 nm to 75 nm, from 75 nm to 80 nm, from 80 nm to 85 nm, from 85 nm to 90 nm, from 90 nm to 95 nm, from 95 nm to 100 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, 25 nm, 26 nm, 27 nm, 28 nm, 29 nm, 30 nm, 31 nm, 32 nm, 33 nm, 34 nm, 35 nm, 36 nm, 37 nm, 38 nm, 39 nm, 40 nm, 41 nm, 42 nm, 43 nm, 44 nm, 45 nm, 46 nm, 47 nm, 48 nm, 49 nm, 50 nm, 51 nm, 52 nm, 53 nm, 54 nm, 55 nm, 56 nm, 57 nm, 58 nm, 59 nm, 60 nm, 61 nm, 62 nm, 63 nm, 64 nm, 65 nm, 66 nm, 67 nm, 68 nm, 69 nm, 70 nm, 71 nm, 72 nm, 73 nm, 74 nm, 75 nm, 76 nm, 77 nm, 78 nm, 79 nm, 80 nm, 81 nm, 82 nm, 83 nm, 84 nm, 85 nm, 86 nm, 87 nm, 88 nm, 89 nm, 90 nm, 91 nm, 92 nm, 93 nm, 94 nm, 95 nm, 96 nm, 97 nm, 98 nm, 99 nm, or 100 nm.

Capacitor 100 also comprises second electrode 130. Second electrode 130 may advantageously be conformal over dielectric layer 120 and first electrode 110, and may correspond to or comprise a conductive material, such as a conducting polymer, a metal, or a conductive ceramic. Example conducting polymers include, but are not limited to, one or more of a polypyrrole, a polythiophene, a polyaniline, a polyacetylene, a polyphenylene, a poly(p-phenylene-vinylene), PEDOT:PSS (poly(3,4-ethylenedioxythiophene) polystyrene sulfonate), or P3HT (poly(3-hexylthiophene-2,5-diyl)). In some cases, conducting polymers may be referred to as conductive polymers. Examples metals may include, but are not limited to, nickel. In some cases, nickel plating may be used, such as a coating or thin layer of nickel prepared using an electrical plating process. Example conductive ceramics include, but are not limited to, TiN. In some cases, conductive ceramics may be referred to as conducting ceramics. Capacitor 100 may, for example, be referred to in some embodiments as an electrolytic capacitor due to use of a conductive material that substitutes the electrolyte that is typically used for second electrode 130. Although second electrode 130 is depicted in FIG. 1 as having a plurality of alternating raised and recessed portions, the depiction is not intended to be limiting and is intended to represent the cross-sectional structure of a second electrode 130 filling tunnels, voids, recessed regions, or pores within an etched aluminum foil. Without limitation, the volume percentage of filling for the conductive material in tunnels, voids, recessed regions, pores, etc. can range from 0.1% to 100% or from 1% to 100%.

Second electrode 130 may coat non-planar regions of first electrode 110 and dielectric layer 120 and may be electrically isolated from and/or separated from first electrode 110 due to the presence of dielectric layer 120 between first electrode 110 and second electrode 130. An electrode, such as second electrode 130, may have any suitable thickness and optionally has a thickness from about 5 nm to about 50 µm, such as from 5 nm to 10 nm, from 5 nm to 50 nm, from 5 nm to 100 nm, from 5 nm to 500 nm, from 5 nm to 1 µm, from 5 nm to 5 µm, from 5 nm to 10 µm, from 5 nm to 50 µm, from 10 nm to 50 nm, from 10 nm to 50 nm, from 10 nm to 100 nm, from 10 nm to 500 nm, from 10 nm to 1 µm, from 10 nm to 5 µm, from 10 nm to 10 µm, from 10 nm to 50 µm, from 50 nm to 100 nm, from 50 nm to 500 nm, from 50 nm to 1 µm, from 50 nm to 5 µm, from 50 nm to 10 µm, from 50 nm to 50 µm, from 100 nm to 500 nm, from 100 nm to 1 µm, from 100 nm to 5 µm, from 100 nm to 10 µm, from 100 nm to 50 µm, from 500 nm to 1 µm, from 500 nm to 5 µm, from 500 nm to 10 µm, from 500 nm to 50 µm, from 1 µm to 5 µm, from 1 µm to 10 µm, from 1 µm to 50 µm, from 5 µm to 10 µm, from 5 µm to 50 µm, from 10 µm to 50 µm, from 20 µm to 50 µm, or from 30 µm to 50 µm. Further, the coverage percentage of the conductive material of second electrode 130 on the surface of dielectric layer 120 can be from 30% to 100%. That is, the "intimate contact" between the second electrode 130 with the dielectric layer 120 may be from 30% to 100%, such as 30%, 35%, 40%, 45%, 50%, 55%, 60%, 65%, 70%, 75%, 80%, 85%, 90%, 95%, or 100%. A variety of techniques may be useful for filling pores or voids in the structure of the first electrode 110 coated with dielectric layer 120 with second electrode 130, such as to as high a fill factor, coverage percentage, or intimate contact factor as possible. In some cases, the first electrode 110 and dielectric layer 120 may be dipped into a material comprising second electrode 130 (e.g., a conducting polymer), such as under increased pressure (e.g., greater than ambient pressure). In some cases, the first electrode 110 and dielectric layer 120 may be dipped into a material comprising second electrode 130 under alternating pressure conditions, such as alternating between increased pressure conditions (e.g., greater than ambient pressure) and vacuum conditions (e.g., less than ambient pressure). Optionally, a baking process may be used, such as under increased pressure conditions (e.g., greater than ambient pressure), which may aid in retention of the material comprising second electrode 130, such as upon decreasing the pressure, such as to ambient pressure. In some cases, electrochemical polymerization techniques may be used, such as where the material comprising second electrode 130 is present, at least in part, in a prepolymer or uncured polymer form and is subjected to electrochemical polymerization upon the prepolymer or uncured polymer filling pores or voids in the structure of first electrode 110 coated with dielectric layer 120. Filling the pores or voids as much as possible with the material of second electrode 130 may be useful for increasing the capacitance of the capacitor 100 as much as possible and/or for reducing the equivalent series resistance (ESR) of the capacitor 100 as much as possible. As described above, the volume percentage of filling for the conductive material in tunnels, voids, recessed regions, pores, etc. can range from 0.1% to 100% or from 1% to 100%. In some examples, a thickness of conductive material in tunnels, voids, recessed regions, pores, etc. can range from 3 nm to 5 µm, such as from 5 nm to 10 nm, from 5 nm to 50 nm, from 5 nm to 100 nm, from 5 nm to 500 nm, from 5 nm to 1 µm, from 5 nm to 5 µm, from 10 nm to 50 nm, from 10 nm to 50 nm, from 10 nm to 100 nm, from 10 nm to 500 nm, from 10 nm to 1 µm, from 10 nm to 5 µm, from 50 nm to 100 nm, from 50 nm to 500 nm, from 50 nm to 1 µm, from 50 nm to 5 µm, from 100 nm to 500 nm, from 100 nm to 1 µm, from 100 nm to 5 µm, from 500 nm to 1 µm, from 500 nm to 5 µm, from 1 µm to 5 µm, from 2 µm to 5 µm, from 3 µm to 5 µm, or from 4 µm to 5 µm.

Optionally, second electrode 130 may further comprise a conducting carbonaceous layer in physical contact with the conductive material. Useful conducting carbonaceous layers include, but are not limited to one or more of carbon black, graphite, a carbon-based ink, a polymeric binder, sputtered carbon, or carbon-polymer composites. A conducting carbonaceous layer may have any suitable thickness, such as from about 100 nm to about 100 µm, from 100 nm to 500 nm, from 100 nm to 1 µm, from 100 nm to 5 µm, from 100 nm to 10 µm, from 100 nm to 50 µm, from 100 nm to 100 µm, from 500 nm to 1 µm, from 500 nm to 5 µm, from 500 nm to 10 µm, from 500 nm to 50 µm, from 500 nm to 100 µm, from 1 µm to 5 µm, from 1 µm to 10 µm, from 1 µm to 50 µm, from 1 µm to 100 µm, from 5 µm to 10 µm, from 5 µm to 50 µm, from 5 µm to 100 µm, from 10 µm to 50 µm, from 10 µm to 100 µm, or from 50 µm to 100 µm.

Capacitor 100 may optionally comprise other components, such as for use in supporting capacitor 100, for use in integrating capacitor 100 into another device or structure, for use in interfacing capacitor 100 with another device or component, or for use while processing or making capacitor 100. As illustrated, capacitor 100 comprises a carbonaceous layer 140 in physical contact with second electrode 130, a diffusion barrier layer 150 in physical contact with carbonaceous layer 140, and a metallization layer 160 in physical contact with diffusion barrier layer 150. Each of these layers is optional and may be useful for interfacing second electrode 130 with an external contact, for example. Carbonaceous layer 140 may advantageously reduce a contact resistance between second electrode 130 and other components, such as diffusion barrier layer 150 and metallization layer 160. Example materials for a carbonaceous layer include, but are not limited to, carbon black, graphite, a carbon-based ink, or a polymeric, for example. Carbonaceous layer 140 may be applied using a variety of techniques, such as screen printing, inkjet printing, sputter deposition, vacuum deposition, spin coating, doctor blading, or the like. A carbonaceous layer, such as carbonaceous layer 140, may have any suitable thickness, such as from about 100 nm to about 100 µm. As examples, the carbonaceous layer 140 may have a thickness of from 100 nm to 500 nm, from 100 nm to 1 µm, from 100 nm to 5 µm, from 100 nm to 10 µm, from 100 nm to 50 µm, from 100 nm to 100 µm, from 500 nm to 1 µm, from 500 nm to 5 µm, from 500 nm to 10 µm, from 500 nm to 50 µm, from 500 nm to 100 µm, from 1 µm to 5 µm, from 1 µm to 10 µm, from 1 µm to 50 µm, from 1 µm to 100 µm, from 5 µm to 10 µm, from 5 µm to 50 µm, from 5 µm to 100 µm, from 10 µm to 50 µm, from 10 µm to 100 µm, or from 50 µm to 100 µm. Optionally, carbonaceous layer 140 may be subjected to an adhesion promotion process, such as an argon sputter process to enhance adhesion of diffusion barrier layer 150 and/or metallization layer 160 to carbonaceous layer 140.

Diffusion barrier layer 150 may limit infiltration of components from metallization layer 160 into the carbonaceous layer 140 or second electrode 130. Example materials for a diffusion barrier layer include, but are not limited to, Ti, W, Cr, Ti—W, TaN, and/or Co—W. Diffusion barrier layer 150 may be applied using any suitable techniques, such as vacuum deposition (e.g., sputter deposition). A diffusion barrier layer, such as diffusion barrier layer 150, may have any suitable thickness, such as from about 10 nm to about 2500 nm. For example diffusion barrier layer 150 may have a thickness of from 10 nm to 25 nm, from 10 nm to 50 nm, from 10 nm to 100 nm, from 10 nm to 250 nm, from 10 nm to 500 nm, from 10 nm to 1000 nm, from 10 nm to 2500 nm, from 25 nm to 50 nm, from 25 nm to 100 nm, from 25 nm to 250 nm, from 25 nm to 500 nm, from 25 nm to 1000 nm, from 25 nm to 2500 nm, from 50 nm to 100 nm, from 50 nm to 250 nm, from 50 nm to 500 nm, from 50 nm to 1000 nm, from 50 nm to 2500 nm, from 100 nm to 250 nm, from 100 nm to 500 nm, from 100 nm to 1000 nm, from 100 nm to 2500 nm, from 250 nm to 500 nm, from 250 nm to 1000 nm, from 250 nm to 2500 nm, from 500 nm to 1000 nm, from 500 nm to 2500 nm, or from 1000 nm to 2500 nm.

Metallization layer 160 may be used to provide high-quality electrical conductivity between capacitor 100 and an external circuit or electrical contact (e.g., a copper contact). Example materials for a metallization layer include, but are not limited to, Ag, Au, Cu, Pt, Pd, and/or composites or alloys of the aforementioned metals, or polymers such as epoxies, silicones, or fluoroelastomers. A metallization layer, such as metallization layer 160, may be applied using any suitable techniques, such as vacuum deposition (e.g., sputter deposition). A metallization layer, such as metallization layer 160, may have any suitable thickness, such as from about 100 nm to 2500 nm. For example, metallization layer 160 may have a thickness of from 100 nm to 250 nm, from 100 nm to 500 nm, from 100 nm to 1000 nm, from 100 nm to 2500 nm, from 250 nm to 500 nm, from 250 nm to 1000 nm, from 250 nm to 2500 nm, from 500 nm to 1000 nm, from 500 nm to 2500 nm, or from 1000 nm to 2500 nm.

As illustrated in FIG. 1, capacitor 100 may also include a substrate 170. Substrate 170 may comprise any suitable material for use in assembling or supporting capacitor 100, such as a dielectric material, a semiconductor material, a metal or metal oxide, a ceramic material, a sacrificial material, a polymeric material, a temporary material, or a transfer material (e.g., a transfer tape). In some cases, ceramic encapsulation or another moisture barrier can be used, such as a polymeric moisture barrier, which may limit or reduce exposure to moisture and/or damage due to moisture exposure. As illustrated in FIG. 1, capacitor 100 includes a planarization layer 180, which may correspond to or comprise a dielectric material, for example. Substrates and/or planarization layers, such as substrate 170 and/or planarization layer 180, may each independently have any suitable thickness, such as from about 1 µm to about 100 µm. For example substrate 170 and/or planarization layer 180 may each independently have thicknesses of from 1 µm to 5 µm, from 1 µm to 10 µm, from 1 µm to 25 µm, from 1 µm to 50 µm, from 1 µm to 100 µm, from 5 µm to 10 µm, from 5 µm to 25 µm, from 5 µm to 50 µm, from 5 µm to 100 µm, from 10 µm to 25 µm, from 10 µm to 50 µm, from 10 µm to 100 µm, from 25 µm to 50 µm, from 25 µm to 100 µm, or from 50 µm to 100 µm. Optionally, thicker planarization layers or substrates may be used, such as with thicknesses up to 1 mm or more. Optionally, the configuration of substrate 170 and planarization layer 180 may be switched, such as where substrate 170 serves as a planarization layer, and where planarization layer 180 serves as a substrate.

Optionally, components other than those illustrated in FIG. 1 may be included in capacitor 100, such as electrical contacts or terminals, vias, or the like. Conductor filled vias may be useful for providing electrical contact between an electrode of capacitor 100 and an electrical terminal to allow for interfacing with external circuits or devices, for example.

Figure 2:
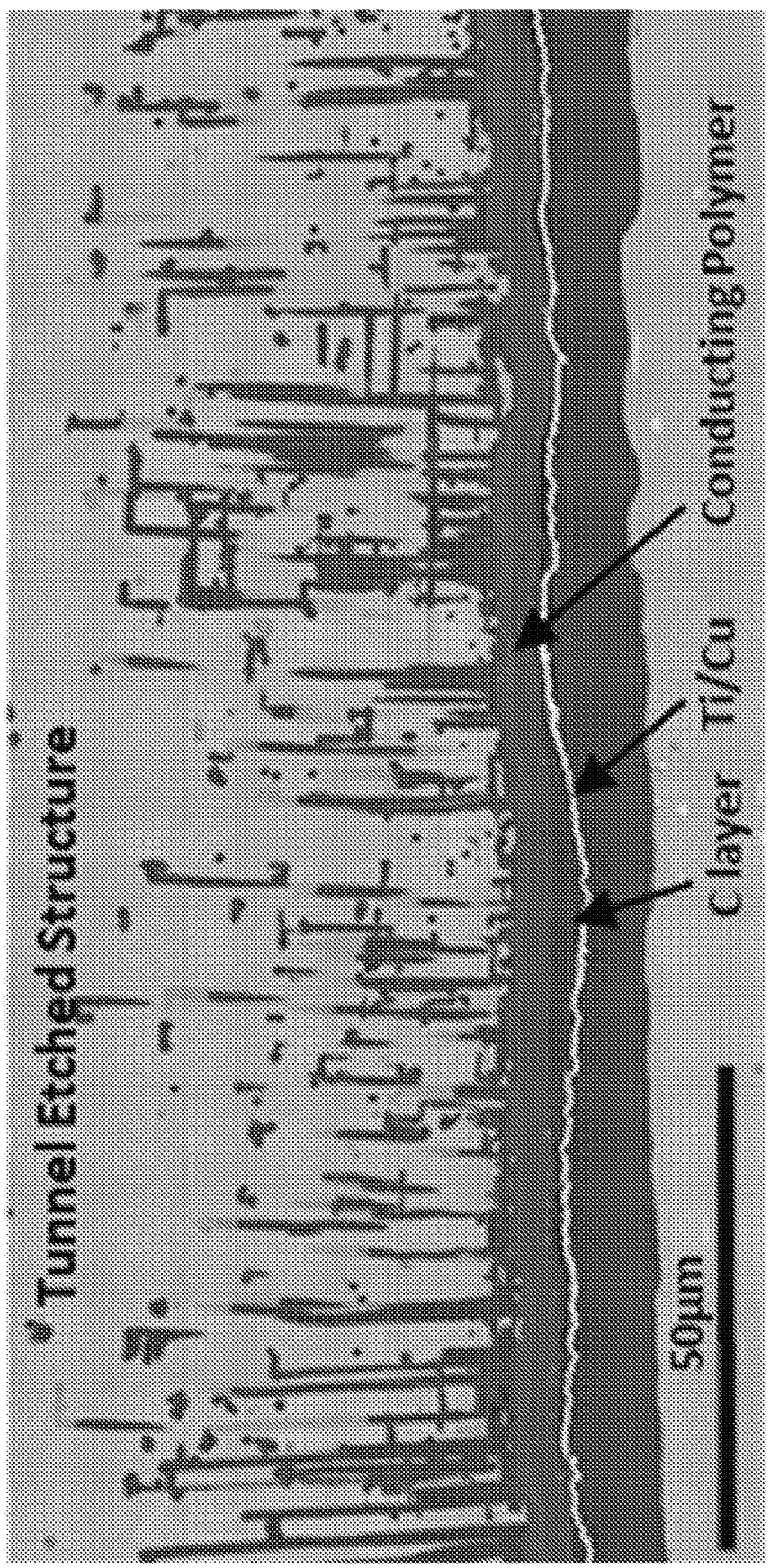
FIG. 2 provides a cross-sectional micrograph image of an example capacitor device comprising an etched aluminum foil electrode and a conducting polymer electrode.

FIG. 2 provides a cross-sectional micrograph image of an example capacitor device, constructed with a configuration similar to capacitor 100 in FIG. 1. In FIG. 2, visible components include an etched metal foil (with some tunnels in view), a conductive material (conducting polymer) layer, a carbonaceous layer (C layer) and a Ti/Cu diffusion barrier layer/metallization layer. Due to size and imaging constraints, the dielectric layer may not be visible in FIG. 2.

The capacitors described herein may be incorporated directly into integrated circuits on an individual basis or may be assembled into a larger structure corresponding to a multi-terminal capacitor comprising a plurality of individual capacitors. Advantageously, the plurality of individual capacitors can be arranged in a single device layer, which may be prepared by first fabricating a large capacitor and then patterning the capacitor or components thereof to create the plurality of individual capacitors. In some cases, a multi-terminal capacitor may have a plurality of individual first electrode (e.g., anode) terminals, each providing an electrical contact for the first electrode of a single individual capacitor. In some cases, a multi-terminal capacitor may have one or more first electrode (e.g., anode) terminals, providing an electrical contact for a continuous first electrode shared among multiple individual capacitors. In some cases, a multi-terminal capacitor may have a plurality of individual second electrode (e.g., cathode) terminals, each providing an electrical contact for the second electrode of a single individual capacitor. In some cases, a multi-terminal capacitor may have one or more second electrode (e.g., cathode) terminals, providing an electrical contact for a continuous second electrode shared among multiple individual capacitors. In some cases, both the first electrodes and the second electrodes may be independent, individualized, distinct, or discretized.

Figure 3:
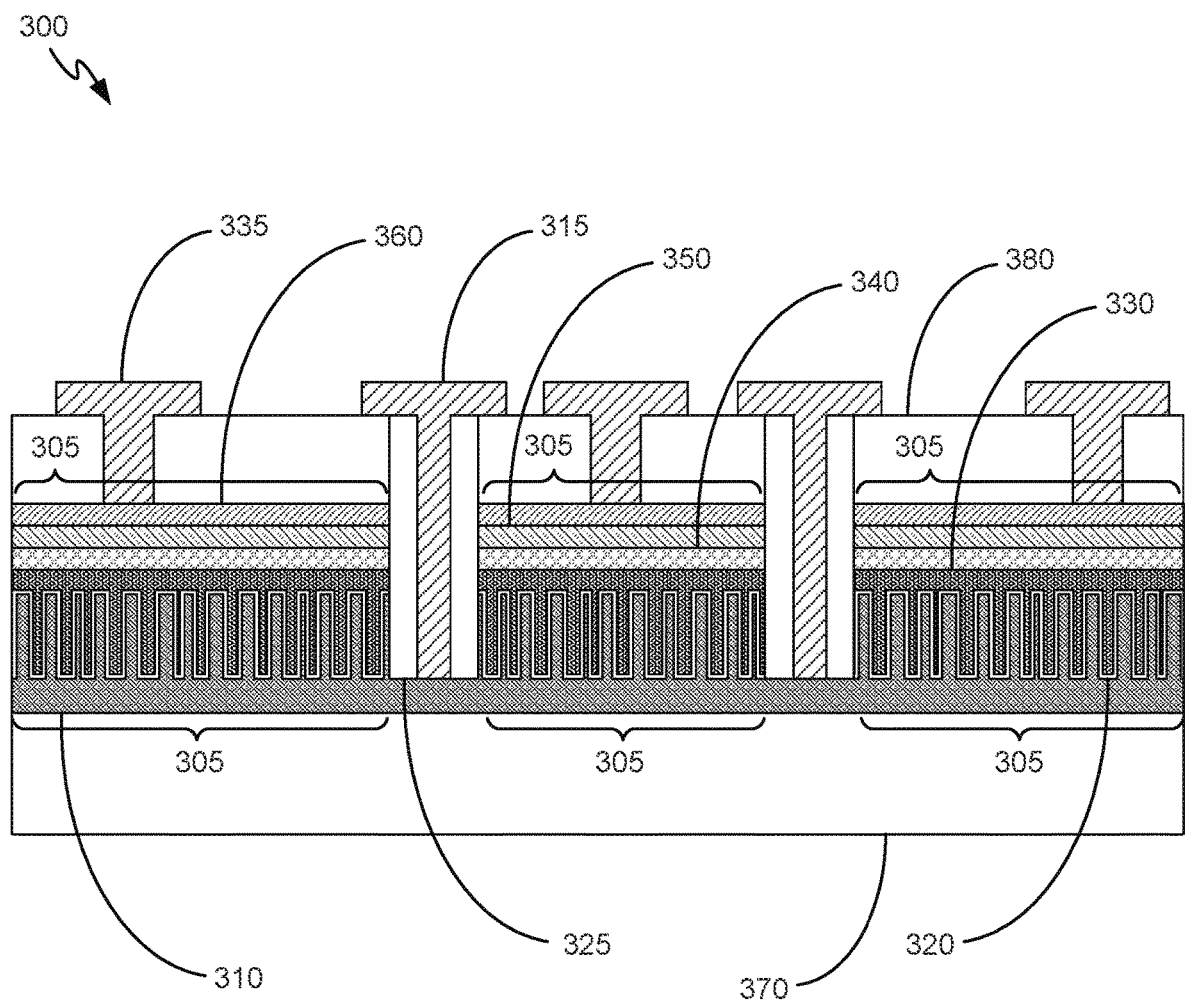
FIG. 3 provides a schematic cross-sectional illustration of a multi-terminal capacitor device with a continuous modified aluminum foil electrode, showing internal components and external electrode terminals.

FIG. 3 provides a schematic cross-sectional illustration of an example multi-terminal capacitor 300. Multi-terminal capacitor 300 may comprise or include a plurality of individual capacitors 305, each optionally similar or substantially identical to capacitor 100. Each individual capacitor 305 includes a first electrode 310 (analogous to first electrode 110), a dielectric layer 320 (analogous to dielectric layer 120), and a second electrode 330 (analogous to second electrode 130), and optionally a carbonaceous layer 340, a diffusion barrier layer 350, a metallization layer 360, a substrate 370, and/or a planarization layer 380 (analogous to corresponding layers in capacitor 100). In the configuration shown in FIG. 3, however, first electrode 310 is a common electrode, shared among all individual capacitors. Use of a common electrode for a multi-terminal capacitor may be advantageous, as this may reduce a number of total electrical connections used to interface with all of the individual capacitors, since as few as one electrical connection to first electrode 310 may be used since it is common to all of the individual capacitors 305.

Multi-terminal capacitor 300 also includes electrical contacts 315 and 335, which provide for electrical connectivity for the first electrode 310 and the second electrode 330, respectively, to an external device, component, or circuit. Although electrical contacts 315 and 335 are shown positioned in FIG. 3 as extending through the planarization layer 380, embodiments are contemplated where electrical contacts 315 or 335 extend through substrate 370. Example materials for electrical contacts 315 and 335 include Cu, Al, Ag, Pd, Pt, or the like. In FIG. 3, electrical contact 315 extends through the planarization layer 380 and in a spacing filled with a dielectric material 325 that separates adjacent individual capacitors 305 and provides an electrical connection with first electrode 310. Electrical contact 335 extends through the planarization layer 380 to provide an electrical connection to second electrode 330, such as by way of carbonaceous layer 340, diffusion barrier layer 350, and/or metallization layer 360, if present.

For manufacturing of multi-terminal capacitor 300, a single device layer capacitor, such as capacitor 100, may be patterned to form the plurality of individual capacitors 305. For example, once the first electrode 110, dielectric layer 120, second electrode 130, and optional overlayers, such as carbonaceous layer 140, diffusion barrier layer 150, metallization layer 160, substrate 170, and planarization layer 180 are prepared, the capacitor 100 may be patterned by removing material and generating a spacing between individual capacitors. In the case of FIG. 3, portions of the dielectric layer 320, second electrode 330, and optional overlayers, such as carbonaceous layer 340, diffusion barrier layer 350, metallization layer 360, substrate 370, and planarization layer 380, are removed during patterning, but the first electrode 310 remains unpatterned. The spacing between adjacent individual capacitors may be filled with a dielectric material and patterned and filled with a conductive material to provide an electrical contact.

Although the configurations shown in FIGS. 1 and 3 show first electrode 110 and 310 (corresponding to a modified aluminum foil electrode) as the bottom electrode, embodiments are contemplated where a conductive material is a bottom electrode. It will further be appreciated that although the figures show an orientation of components, such orientations are not intending to be limiting and that other orientations are possible.

Figure 4:
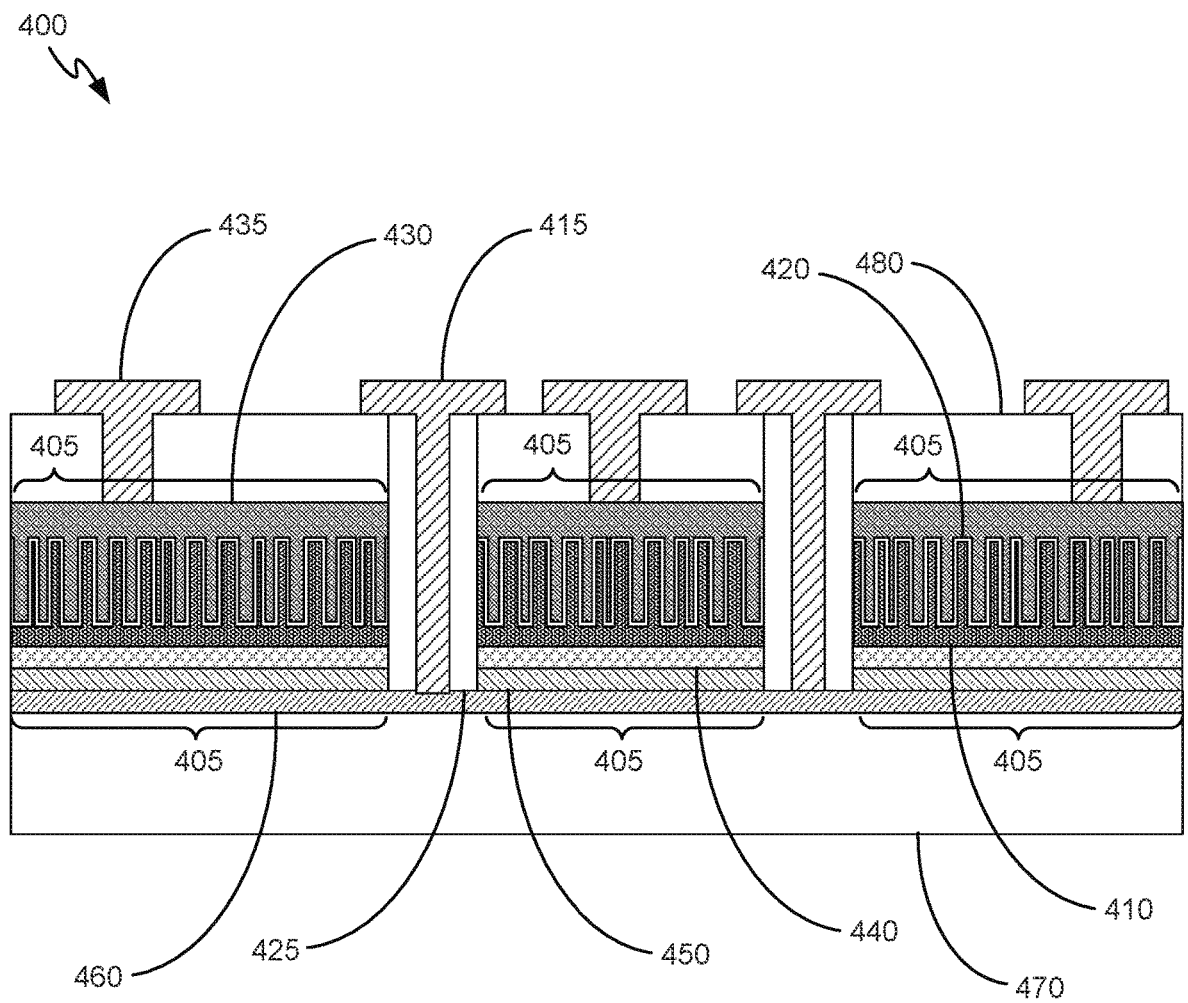
FIG. 4 provides a schematic cross-sectional illustration of a multi-terminal capacitor device with a continuous conductive material electrode, showing internal components and external electrode terminals.

FIG. 4 provides a schematic cross-sectional illustration of a multi-terminal capacitor 400. Multi-terminal capacitor 400 comprises a plurality of individual capacitors 405, each optionally similar or substantially identical capacitor 100, though the orientations of the conductive material and modified aluminum foil electrode in FIG. 4 is vertically flipped from that in FIG. 1. Each individual capacitor 405 includes a first electrode 410 (analogous to second electrode 130), a dielectric layer 420 (analogous to dielectric layer 120), and a second electrode 430 (analogous to first electrode 110), and optionally a carbonaceous layer 440, a diffusion barrier layer 450, a metallization layer 460, a substrate 470, and/or a planarization layer 480 (analogous to corresponding layers in capacitor 100). In the configuration shown in FIG. 4, each first electrode 410 is electrically connected with other first electrodes 410 so that the potential is shared among all individual first electrodes as a common electrode. Use of a common electrode for multi-terminal capacitor may be advantageous, as this may reduce a number of total electrical connections used to interface with all of the individual capacitors, since as few as one electrical connection to all first electrodes 410 may be used since their potential is common among all of the individual capacitors 405. In contrast to FIG. 3, where first electrode 310 may correspond to or comprise a modified aluminum foil and second electrode 330 may correspond to or comprise a conductive material, the first electrode 410 in FIG. 4 may correspond to or comprise a conductive material, while the second electrode 430 may correspond to or comprise a modified aluminum foil.

Multi-terminal capacitor 400 also includes electrical contacts 415 and 435, which provide for electrical connectivity for first electrode 410 and second electrode 430, respectively, to an external device, component, or circuit. Although electrical contacts 415 and 435 are shown positioned in FIG. 4 as extending through the planarization layer 480, embodiments are contemplated where electrical contacts 415 or 435 extend through substrate 470. In FIG. 4, electrical contact 415 extends through the planarization layer 480 and into a spacing filled with a dielectric material 425 that separates adjacent individual capacitors 405 and provides for an electrical connection with first electrode 410. Electrical contact 435 extends through the planarization layer 480 to provide an electrical connection to second electrode 430.

For manufacturing of multi-terminal capacitor 400, a single device layer capacitor, similar to capacitor 100, may be patterned to form the plurality of individual capacitors 405. For example, once the first electrode, dielectric layer, second electrode, and optional carbonaceous layer, diffusion barrier layer, and/or metallization layer are prepared, the capacitor may be patterned by removing material and generating a spacing between individual capacitors. In the case of FIG. 4, portions of the dielectric layer 420, second electrode 430, and optionally a portion of the first electrode 410, carbonaceous layer 440, diffusion barrier layer 450, and metallization layer 460 are removed during patterning, but the first electrode 410 remains otherwise continuously electrically connected beneath all of the individual capacitors 405.

In the configurations of FIGS. 3 and 4, the first electrode is depicted as a continuous bottom electrode, while the second electrode is shown as an individual top electrode for each individual capacitor. Optionally, both a first electrode and a second electrode are individual electrodes. Further, while the configurations of FIGS. 3 and 4 show the electrode corresponding to a modified aluminum foil as having only one side or surface of the aluminum foil modified, optionally, both surfaces or sides may be modified.

Figure 5:
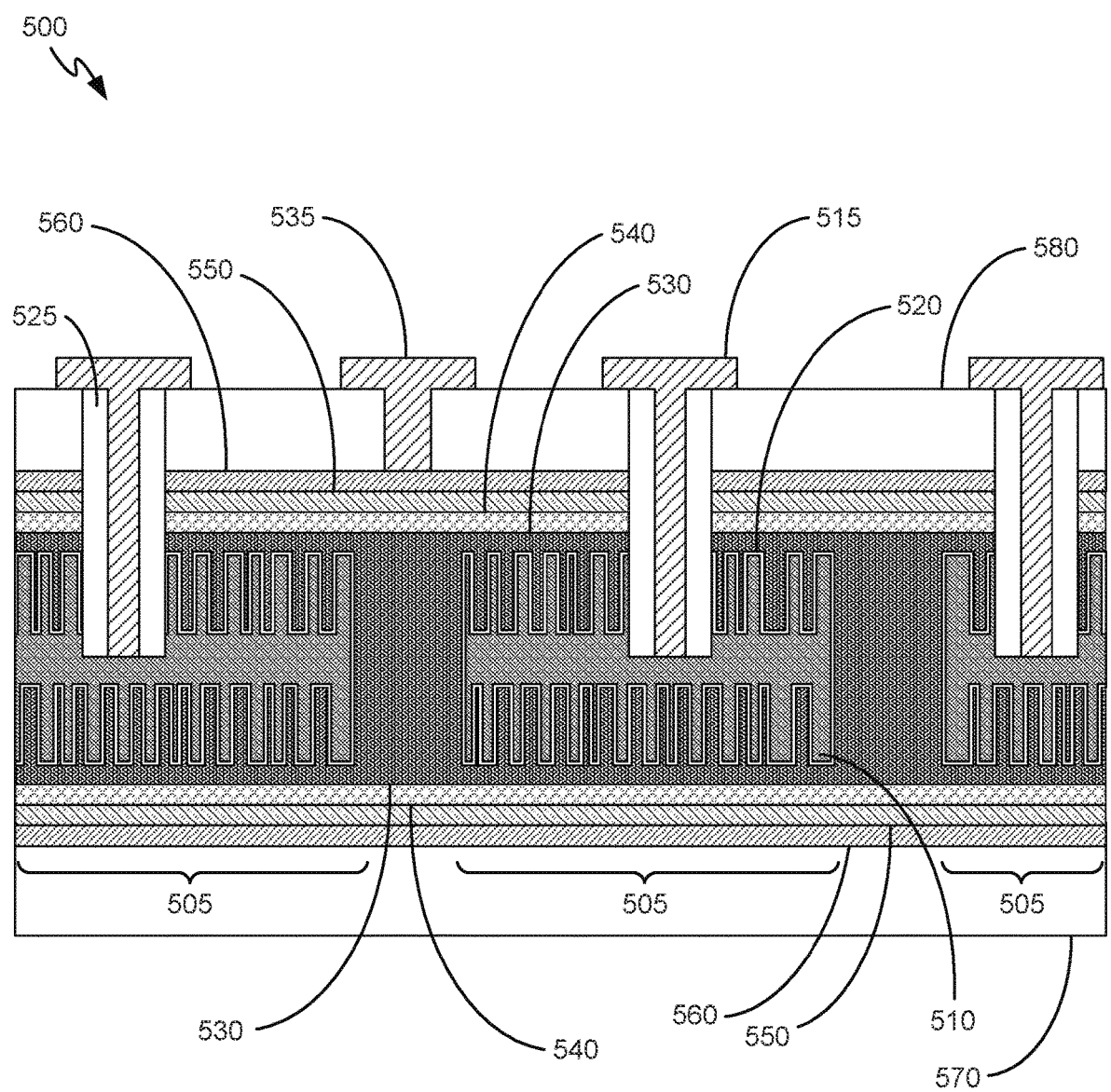
FIG. 5 provides a schematic cross-sectional illustration of a multi-terminal capacitor device with individual modified aluminum foil electrodes and a continuous conductive material electrode, showing internal components and external electrode terminals.

For example, FIG. 5 provides a schematic cross-sectional illustration of a multi-terminal capacitor 500 where both sides of first electrode 510 are modified, such as having an etched configuration. Multi-terminal capacitor 500 comprises a plurality of individual capacitors 505. Each individual capacitor 505 includes an individual first electrode 510, an individual dielectric layer 520, and a second electrode 530, which may be continuously shared among all individual capacitors 505, and optionally one or more carbonaceous layers 540, diffusion barrier layers 550, and/or metallization layers 560, a substrate 570, and a planarization layer 580 (analogous to corresponding components in capacitor 100).

Multi-terminal capacitor 500 also includes electrical contacts 515 and 535, which provide for electrical connectivity for first electrode 510 and second electrode 530, respectively, to an external device, component, or circuit. Although electrical contacts 515 and 535 are shown positioned in FIG. 5 as extending through the planarization layer 580, embodiments are contemplated where electrical contacts 515 or 535 extend through substrate 570. For individual use, each individual capacitor 505 has a corresponding electrical contact 515 in electrical communication with a corresponding first electrode 510, while as few as one electrical contact 535 may be positioned in electrical communication with second electrode 530. In FIG. 5, electrical contact 515 extends through the planarization layer 580 and into first electrode 510 and is surrounded by a dielectric material 525 to maintain electrical isolation from second electrode 530. Electrical contact 535 extends through the planarization layer 580 to provide an electrical connection to second electrode 530, and may be positioned at or through a spacing to provide an electrical connection with second electrode 530 at a bottom position, similar to the configuration depicted in FIG. 4.

For manufacturing of multi-terminal capacitor 500, a single device layer capacitor may be patterned to form the plurality of individual capacitors 505. For example, once the first electrode, dielectric layer, second electrode, and optional carbonaceous layers, diffusion barrier layers, and/or metallization layers are prepared, the capacitor may be patterned by removing material and generating a spacing between individual capacitors 505.

In the configurations of FIGS. 3, 4, and 5, the capacitor devices are depicted as having a single device layer. That is, in FIGS. 3, 4, and 5, the first electrodes, second electrodes, and dielectric layers are all depicted as lying within a particular single layer or thickness of the devices. In some embodiments, individual capacitor devices may be present in different device layers, stacked above and/or below one another. Such a configuration may allow for increasing the total capacitance available in the same footprint and/or may provide for more or different combinations of individual capacitors of a multi-terminal capacitor device.

Figure 6:
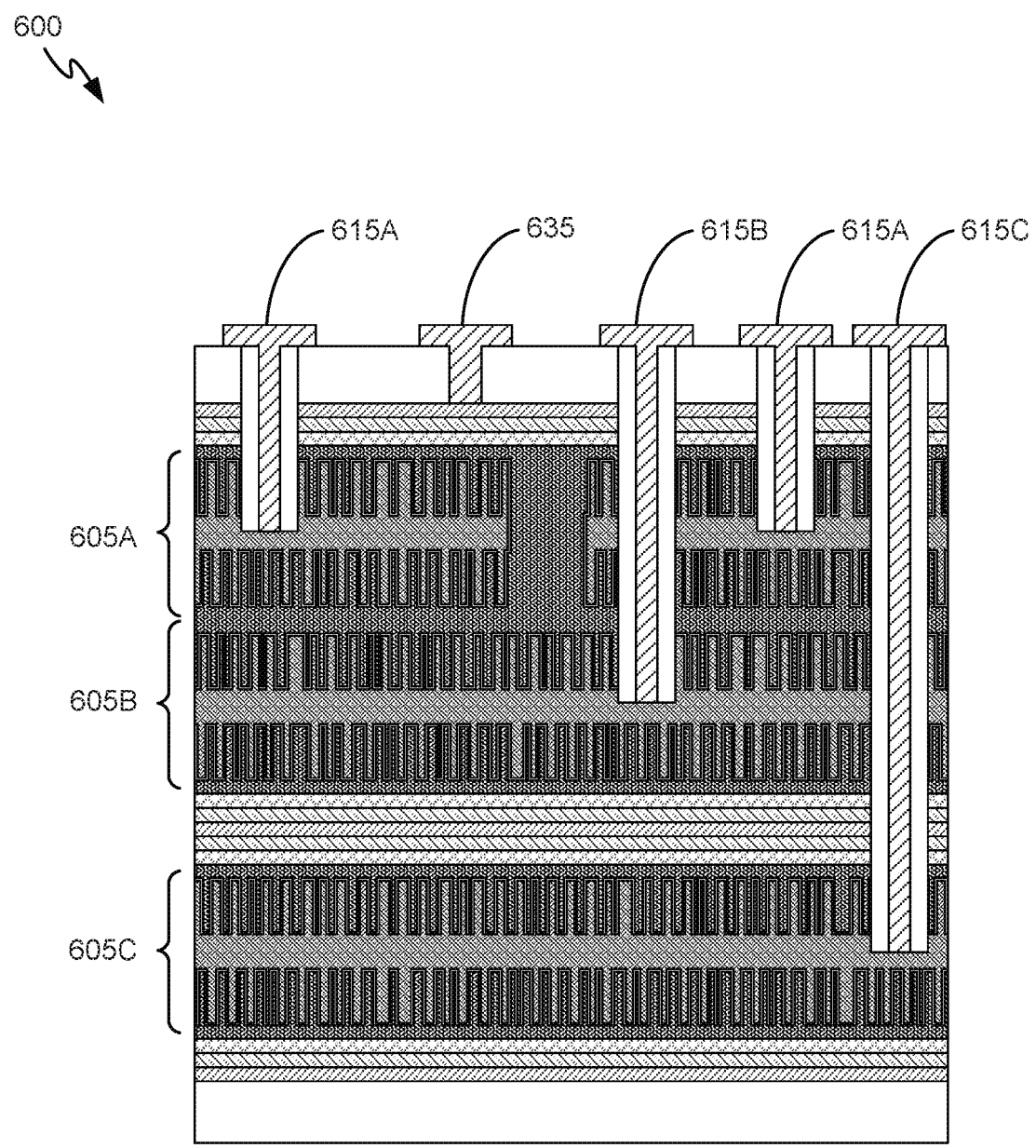
FIG. 6 provides a schematic cross-sectional illustration of a multi-terminal capacitor device with individual modified aluminum foil electrodes and conductive material electrodes arranged in a stacked configuration.

For example, FIG. 6 shows a multi-layer multi-terminal capacitor device 600. In FIG. 6, three device layers are illustrated in a stacked configuration, device layer 605A, device layer 605B, and device layer 605C. Device layer 605A is depicted as having multiple individual first electrodes each comprising a modified aluminum foil within the layer, while device layers 605B and 605C are depicted as having only single first electrodes comprising a modified aluminum foil within the layers. In embodiments, any desirable number of individual electrodes may be present within a device layer, such as one or a plurality of individual first electrodes and one or a plurality of individual second electrodes, similar to the configurations depicted in FIGS. 3, 4, and 5.

As illustrated, electrical contacts 615A provide for electrical conductivity to the first electrodes of device layer 605A, electrical contact 615B provides for electrical conductivity to the first electrode of device layer 605B, electrical contact 615C provides for electrical conductivity to the first electrode of device layer 605C, and electrical contact 635 provides for electrical conductivity to the second electrodes (e.g., a conducting polymer electrode or a conductive ceramic electrode) of device layers 605A, 605B, and 605C. In embodiments, the first electrodes within a device layer in a stacked configuration may be electrically connected or electrically isolated from first electrodes in other device layers. As illustrated in FIG. 6, the second electrodes of device layers 605A and 605B are a continuous second electrode, extending between both device layers, while the second electrode of device layer 605C is separated from that of device layer 605B by one or more carbonaceous layers, diffusion barrier layers, and/or metallization layers. Such a configuration is merely an illustration, and any desirable number of electrical contacts and any desirable number of shared or individual electrodes in accordance with any of the configurations described herein may be used in a multi-layer multi-terminal capacitor device.

The capacitance provided by multi-layer multi-terminal capacitor device 600 may be greater than that of a comparable single layer device. For example, the capacitance provided by a comparable single layer device may be similar to that provided by the device layer 605C even though the device layers occupy the same footprint or lateral area, but since device layers 605A and 605B are present in multi-layer multi-terminal capacitor device 600, the capacitance provided by device layers 605A and 605B may be added to that of device layer 605C. The total thickness of multi-layer multi-terminal capacitor device 600 may, however, be greater than that of the comparable single layer device, such as about 3 times as thick total for the three device layers 605A, 605B, and 605C. As an example, if the capacitances provided by each of the device layers 605A, 605B, and 605C and a comparable single-layer capacitor device are each about 500 nF, the total capacitance provided by multi-layer multi-terminal capacitor device 600 may be about 1500 nF, while the comparable single-layer capacitor device is only about 500 nF. If the comparable single layer capacitor device and the multi-layer multi-terminal capacitor device 600 each occupy the same footprint, such as about 5 mm$^2$, the areal capacitance density of the single layer device would be about 100 nF/mm$^2$, while the areal capacitance density of multi-layer multi-terminal capacitor device 600 would be about 300 nF/mm$^2$. In this way, additional capacitance or capacitance density may be available in a multi-layer multi-terminal capacitance device without occupying any additional areal footprint.

Figure 7:
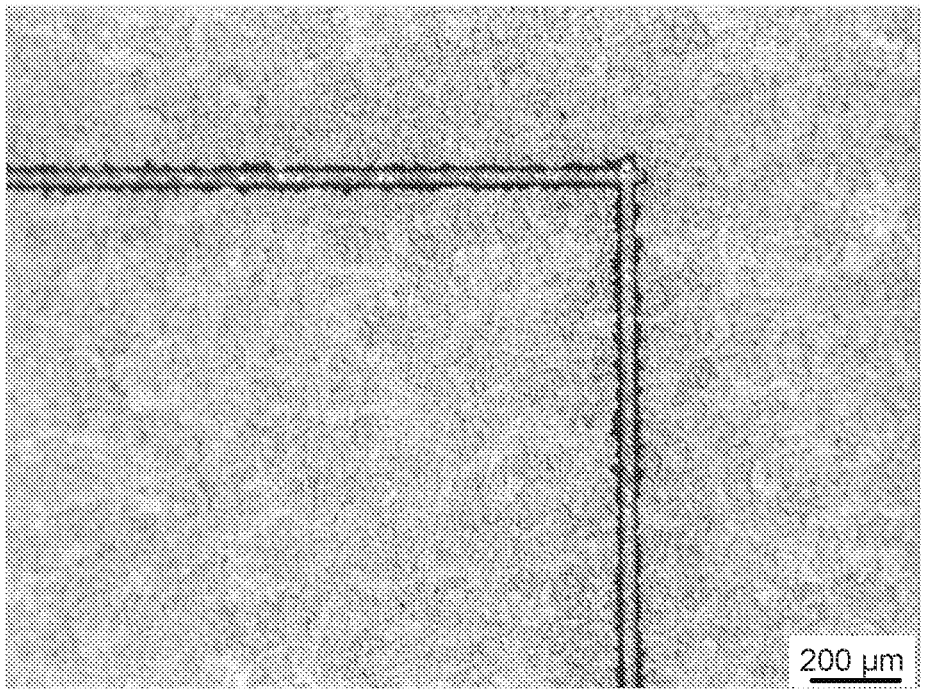
FIG. 7 provides plan view micrograph images of an example capacitor device showing individual capacitors and spacings isolating the individual capacitors.
Figure 7:
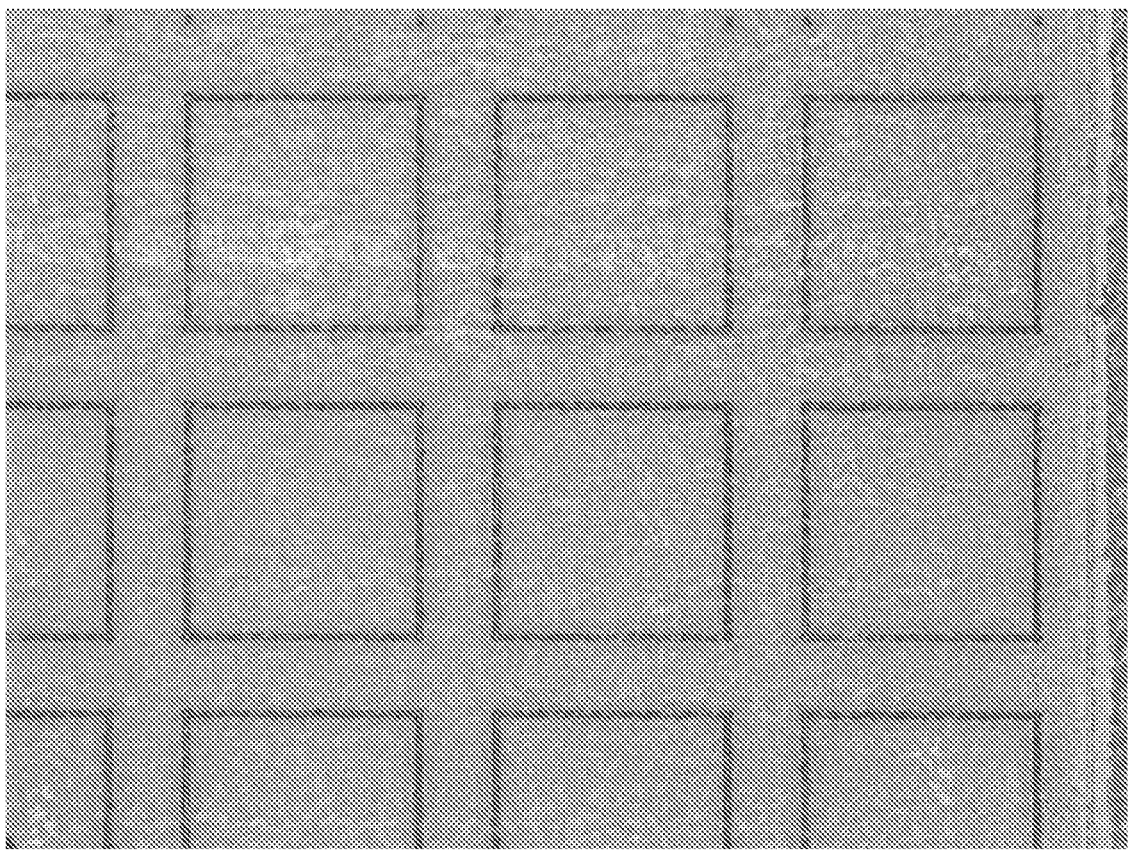

FIG. 7 provide optical micrograph images (bottom, lower magnification; top, higher magnification) of a plurality of individual capacitors each having a structure of a capacitor as described herein, such as with an aluminum metal foil first electrode, an aluminum oxide dielectric layer, and a conducting polymer second electrode, and prepared according to methods described herein. In FIG. 7, individual capacitors are separated by a spacing that provide electrical isolation between the individual capacitors and the intermediate structure. The plurality of individual capacitors were generated by preparing a larger area capacitor and then using a laser patterning technique to create the spacing by removing portions of the capacitor stack. Although laser patterning was used to generate the plurality of individual capacitors in FIG. 7, other patterning techniques may alternatively or additionally be used, including microfabrication techniques like masking and etching (e.g., plasma etching), or mechanical methods, such as dicing. Optionally, multiple patterning techniques may be used, such as to ensure electrical isolation between individual capacitors, to prepare positions for metal contacts, or to otherwise remove or pattern components as desired. Optionally, a polymer isolation bridge pattern may be deposited, following by deposition of a conducting polymer so that it is contained within the polymer isolation bridge pattern. Optionally microdispensing and/or microprinting may be used for depositing a conducting polymer and/or a polymer isolation bridge pattern. Optionally, masking and etching may comprise masking the second electrode with a photoresist; and wet etching of unmasked second electrode portions (e.g., in the case of metal electrodes) or plasma etching of unmasked secondary electrode portions (e.g., in the case of conducting polymer electrodes), thereby generating a plurality of individual second electrodes.

Figure 8:
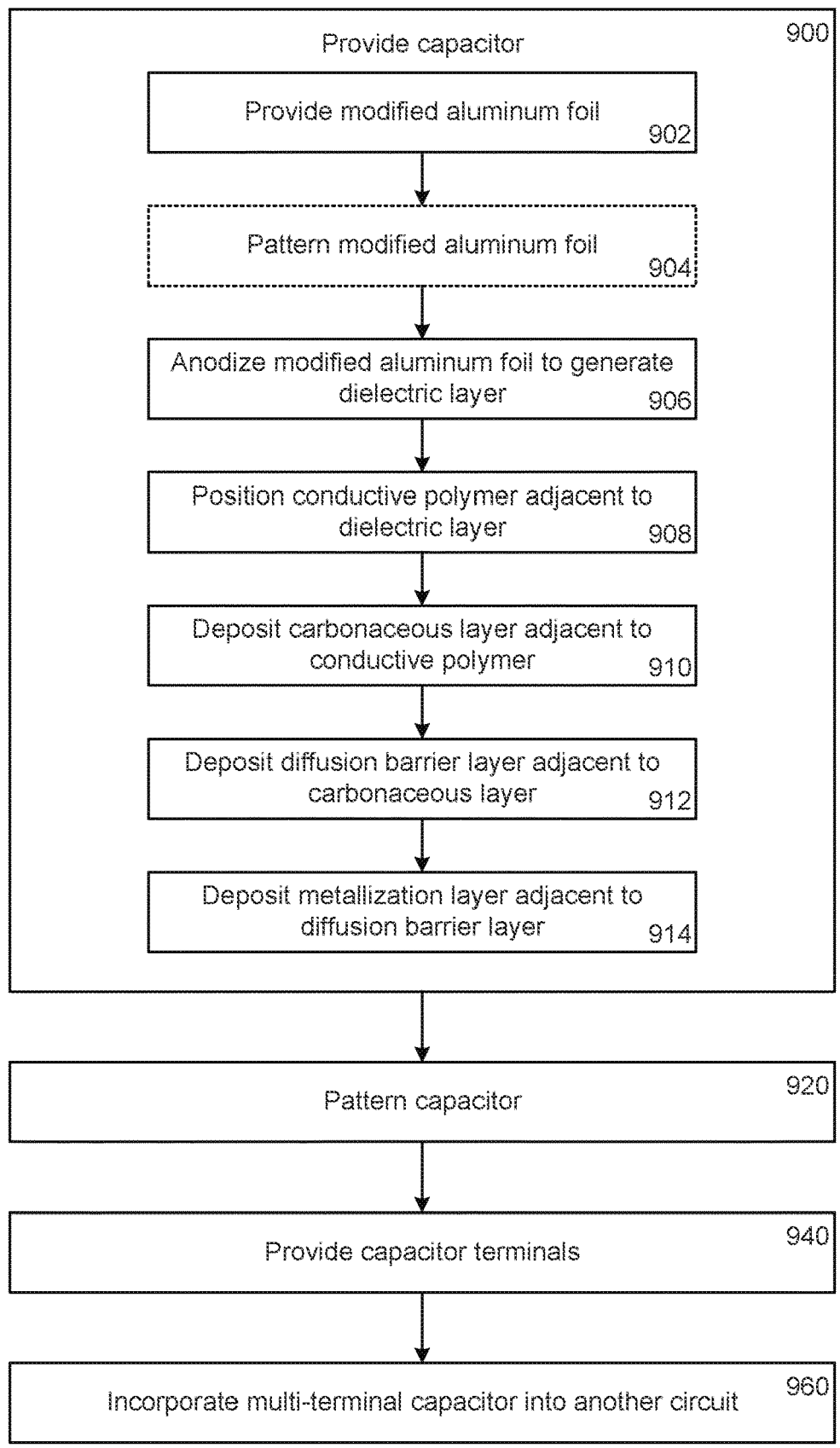
FIG. 8 provides an overview of an example method of making and/or using a multi-terminal capacitor device.

FIG. 8 provides an overview of an example method of making a multi-terminal capacitor device. At block 900, a capacitor is provided. The capacitor may be a single device layer capacitor, such as described herein. Providing the capacitor at block 900 may optionally comprise making the capacitor. For example, blocks 902-914 provide for making a capacitor. At block 902, a modified aluminum foil is provided. As described herein, the modified aluminum foil may be an aluminum foil with an etched surface, an aluminum foil supporting sintered aluminum particles, or another high-surface area-based aluminum foil. Optionally, providing the modified aluminum foil includes making the modified aluminum foil, such as by subjecting an aluminum foil to a tunnel etching process, or by depositing and sintering aluminum particles on an aluminum foil.

At block 904, the modified aluminum foil is optionally patterned. In some cases, the modified aluminum foil is not patterned, such as when the modified aluminum foil is to serve as a common first electrode for a plurality of individual capacitors. Optionally, the modified aluminum foil is patterned at block 900 prior to or after other steps shown as part of block 900. The patterning of modified aluminum foil at block 900 may employ any suitable patterning technique, such as laser-based patterning techniques, masking and etching, or other patterning techniques employed in microfabrication, integrated circuit, or semiconductor processing systems.

At block 906, the modified aluminum foil is subjected to an anodizing process to generate the dielectric layer for use in the capacitor. Any suitable anodizing process may be used to generate the dielectric layer, such as by placing the modified aluminum foil in an electrolytic solution and passing a current through the solution and modified aluminum foil with the modified aluminum foil arranged as an anode. The anodizing process may proceed for a sufficient amount of time to form a continuous and conformal coating of aluminum oxide to serve as a dielectric layer of a desired thickness.

At block 908, a conductive material is positioned adjacent to the dielectric layer. Together, the modified aluminum foil, dielectric layer, and conductive material make up the primary components of the capacitor, with the modified aluminum foil and conductive material serving as electrodes of the capacitor. Depending on the desired capacitor configuration, the conductive material may be deposited over the modified aluminum foil and the dielectric layer, or the modified aluminum foil and dielectric layer may be placed into the conductive material. Useful conductive materials include conducting polymers, such as PEDOT:PSS, and conductive ceramics, such as TiN, for example.

Optionally, additional layers may be added to the primary components of the capacitor, such as to allow for interfacing the conductive material layer with other components, such as a metal contact. For example, at block 910, a carbonaceous layer is deposited adjacent to the conductive material. A carbonaceous layer may be used to reduce a contact resistance between the conductive material and other components. Useful carbonaceous layers include carbon black or a sputter deposited thin carbon film, for example.

At block 912, a diffusion barrier layer optionally may be deposited over the conductive material and adjacent to a carbonaceous layer. For example, the diffusion barrier layer may be a conductive (e.g., metal) layer that exhibits low diffusivity and may prevent overlying materials from diffusing into the carbonaceous layer and/or conductive material. Useful diffusion barrier layers include Ti thin films, for example.

At block 914, a metallization layer optionally is deposited over the conductive material and adjacent to a diffusion barrier layer. The metallization layer may serve as a platform for overlying conductive materials, such as a metal contact or via, to electrically interface with the conductive material electrode of the capacitor. Useful materials for a metallization layer include Ag or Cu, for example.

Having a prepared or otherwise provided capacitor, the capacitor may be patterned at block 920 in order to create a plurality of individual capacitors for the multi-terminal capacitor device. The plurality of individual capacitors may be created by removing portions of the primary components of the capacitor and optionally any additional layers to create electrically isolated regions of one or both electrodes. For example, a spacing that extends through one or more of the modified aluminum foil or the conductive material may be generated using any suitable patterning technique, such as a laser ablation or other laser patterning technique. The spacing may optionally be filled with an insulating material (e.g., a dielectric material) to provide for electrical isolation and fixing of the arrangement of individual capacitors in the multi-terminal capacitor device. As described above, some multi-terminal capacitor devices may employ a continuous modified aluminum foil electrode, and so the patterning of the capacitor at block 920 may optionally exclude patterning of the modified aluminum foil electrode. Some multi-terminal capacitor devices may employ a continuous conductive material electrode, and so the patterning of the capacitor at block 920 may optionally exclude patterning of the conductive material electrode and other associated layers, such as a carbonaceous layer, a diffusion barrier layer, and/or a metallization layer. Some multi-terminal capacitor devices may employ individual conductive material electrodes and individual modified aluminum foil electrodes, and so the patterning of the capacitor at block 920 may include all components of the capacitor. The useful surface area of the capacitor may be increased by patterning the capacitor after depositing all of its layers rather than patterning each layer individually (e.g., laser patterning the conductive material before depositing the carbonaceous layer). Patterning all of the layers of the capacitor at one time may result in layers with substantially the same areal footprint. In contrast, patterning each layer of the capacitor individually may result in a particular overlying layer having a smaller areal footprint than an underlying layer, decreasing the total area of the capacitor that is useful in capacitance. Patterning all of the layers of the capacitor at one time may also allow for increased via density.

Once the plurality of individual capacitors are generated by the patterning of block 920, at block 940 capacitor terminals may be provided. The capacitor terminals may be provided as metal contacts, such as those that extend through one or more layers of the capacitor structure. The capacitor terminals may be provided by depositing a planarization layer or other dielectric overlayer over the plurality of individual capacitors and pattering recesses (vias) in the dielectric layers and filling the vias with a conductive material, such as Cu. In some cases, the vias may be created in a spacing generated by the patterning process of block 920, which may be useful for providing metal contacts in electrical contact with bottom most electrodes of the capacitors. In some cases, terminals may be provided before patterning (i.e., where block 940 occurs before block 920).

The layers of the patterned multi-terminal capacitor may have substantially the same areal footprints. For example, the modified aluminum foil (e.g., the first electrode) may have substantially the same areal footprint as the dielectric layer and the conductive material (e.g., the second electrode). Other layers of the patterned multi-terminal capacitor (e.g., the diffusion barrier layer and the metallization layer) may also have substantially the same areal footprint as the above-mentioned layers. The layers may have areal footprints that are identical, or the layers may have areal footprints that are at most about 10%, 9%, 8%, 7%, 6%, 5%, 4%, 3%, 2%, 1%, 0.1%, 0.01%, or less different.

The layers may also have substantially the same areal geometry. The areal geometry may be a square, a rectangle, or an oblique shape. Layers that have substantially the same areal footprint and substantially the same areal geometry may be considered to be coextensive.

At block 960, the multi-terminal capacitor device may be incorporated into another circuit.

The multi-terminal capacitor device may advantageously exhibit a number of exceptional performance properties. For example, each individual capacitor may optionally exhibit a capacitance density of from about 0.05 $\mu F/mm^2$ to about 25 $\mu F/mm^2$, such as from 0.05 $\mu F/mm^2$ to 0.1 $\mu F/mm^2$, 0.05 $\mu F/mm^2$ to 1 $\mu F/mm^2$, 0.05 $\mu F/mm^2$ to 5 $\mu F/mm^2$, 0.05 $\mu F/mm^2$ to 10 $\mu F/mm^2$, 0.05 $\mu F/mm^2$ to 15 $\mu F/mm^2$, 0.05 $\mu F/mm^2$ to 20 $\mu F/mm^2$, 0.05 $\mu F/mm^2$ to 25 $\mu F/mm^2$, from 0.1 $\mu F/mm^2$ to 1 $\mu F/mm^2$, from 0.1 $\mu F/mm^2$ to 5 $\mu F/mm^2$, from 0.1 $\mu F/mm^2$ to 10 $\mu F/mm^2$, from 0.1 $\mu F/mm^2$ to 15 $\mu F/mm^2$, from 0.1 $\mu F/mm^2$ to 20 $\mu F/mm^2$, from 0.1 $\mu F/mm^2$ to 25 $\mu F/mm^2$, from 1 $\mu F/mm^2$ to 5 $\mu F/mm^2$, from 1 $\mu F/mm^2$ to 10 $\mu F/mm^2$, from 1 $\mu F/mm^2$ to 15 $\mu F/mm^2$, from 1 $\mu F/mm^2$ to 20 $\mu F/mm^2$, from 1 $\mu F/mm^2$ to 25 $\mu F/mm^2$, from 5 $\mu F/mm^2$ to 10 $\mu F/mm^2$, from 5 $\mu F/mm^2$ to 15 $\mu F/mm^2$, from 5 $\mu F/mm^2$ to 20 $\mu F/mm^2$, from 5 $\mu F/mm^2$ to 25 $\mu F/mm^2$, from 10 $\mu F/mm^2$ to 15 $\mu F/mm^2$, from 10 $\mu F/mm^2$ to 20 $\mu F/mm^2$, from 10 $\mu F/mm^2$ to 25 $\mu F/mm^2$, from 15 $\mu F/mm^2$ to 20 $\mu F/mm^2$, from 15 $\mu F/mm^2$ to 25 $\mu F/mm^2$, or from 20 $\mu F/mm^2$ to 25 $\mu F/mm^2$. Each individual capacitor may optionally exhibit a very small leakage current, such as less than or about 100 nA/$\mu F$ at operating voltage. Optionally, each individual capacitor may exhibit an effective series resistance (ESR) of less than or about 500 m$\Omega$ for 1 $\mu F$. Each individual capacitor may exhibit frequency stability in the range for from 0.1 MHz to 100 MHz, such as at 10 MHz exhibiting a capacitance droop of 5% or less or a capacitance droop of 50% or less at 100 MHz.

Aspects of the disclosure may be further understood by reference to the following non-limiting examples.

Example 1

Figure 10:
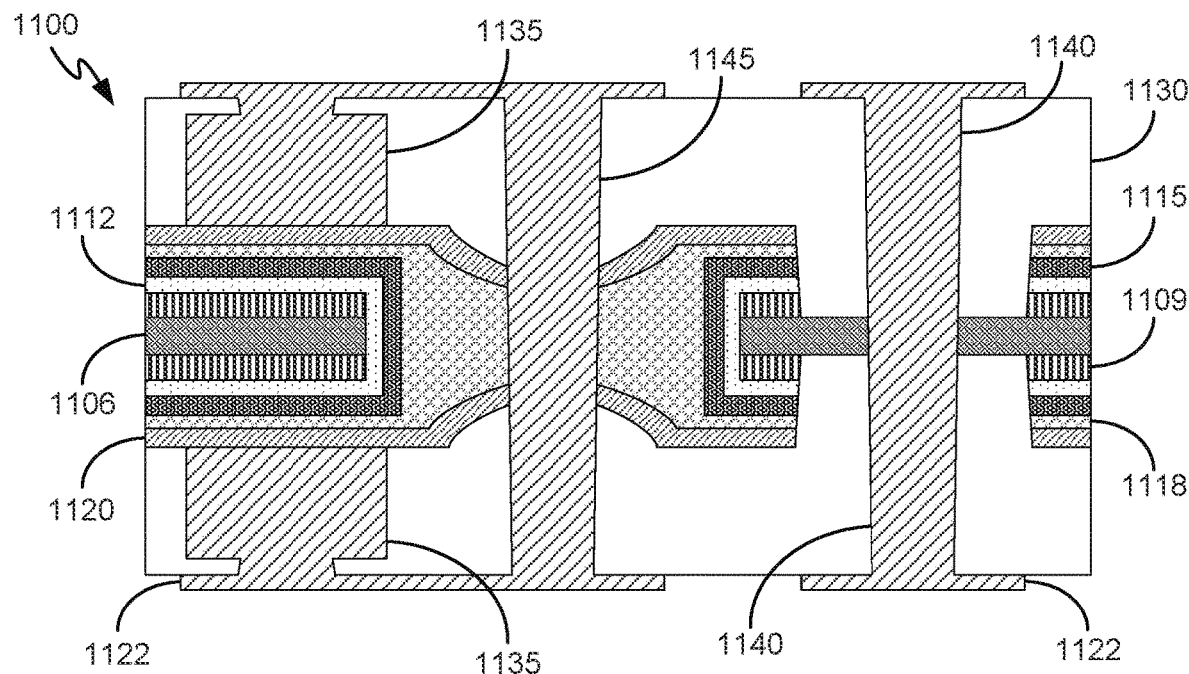
FIG. 10 provides a schematic cross-sectional illustration of an example multi-terminal capacitor device with a through via connecting different blind vias on opposite sides of a two-sided capacitor device.

Double-sided capacitor devices were created from an anodized etched foil and conducting polymer, with each individual capacitor device having a structure similar to that depicted in FIG. 10. For creation of the devices, samples of an etched foil were laser patterned prior to anodization. After anodization, a conducting polymer coating was applied to the anodized foil, and metallization layers were generated. Laser patterning was performed and electrical measurements performed. An individual double-sided capacitor device had lateral dimensions of 3 mm×3 mm and its capacitance was measured to be 13500 nF at 100 kHz, providing an areal capacitance density of about 1540 nF/mm$^2$. The areal capacitance density measured at 10 kHz was about 1630 nF/mm$^2$, resulting in a droop of about 5%. The series resistance of the device at 10 kHz and 100 kHz was about 1 Ω*mm$^2$ and about 0.4 Ω*mm$^2$, respectively. The phase angle of the device at 100 kHz was bout −80. The DC resistance was about 9500 Ω*mm$^2$.

Similar measurements were performed for double-sided capacitor devices with lateral dimensions of 1 mm×1 mm and 2 mm×2 mm. For the 1 mm×1 mm device, the areal capacitance density measured at 10 kHz and 100 kHz was about 1570 and 1500 nF/mm$^2$, respectively, resulting in a droop of about 4.5%. The series resistance of the device at 10 kHz and 100 kHz was about 1 Ω*mm$^2$ and about 0.2 Ω*mm$^2$, respectively. The phase angle of the device at 100 kHz was about −85. The DC resistance was about 3200 Ω*mm$^2$. For the 2 mm×2 mm device, the areal capacitance density measured at 10 kHz and 100 kHz was about 1620 and 1530 nF/mm$^2$, respectively, resulting in a droop of about 5.7%. The series resistance of the device at 10 kHz and 100 kHz was about 1 Ω*mm$^2$ and about 0.3 Ω*mm$^2$, respectively. The phase angle of the device at 100 kHz was about −82. The DC resistance was about 6700 Ω*mm$^2$.

Oxidation of the metallization layers in the above-mentioned devices prior to measurement may have affected their performance characteristics. Prior to subsequent tests, oxidation was removed using sulfuric acid. For a 1 mm×1 mm device, the areal capacitance density measured at 10 kHz and 100 kHz improved to about 2100 and 2000 nF/mm$^2$, respectively, resulting in a droop of about 5.5%. The series resistance of the device at 10 kHz and 100 kHz was about 0.8 Ω*mm$^2$ and about 0.2 Ω*mm$^2$, respectively. The phase angle of the device at 100 kHz was about −82. The DC resistance was about 19000 Ω*mm$^2$. For a 2 mm×2 mm device, the areal capacitance density measured at 10 kHz and 100 kHz improved to about 2100 and 2000 nF/mm$^2$, respectively, resulting in a droop of about 5.5%. The series resistance of the device at 10 kHz and 100 kHz was about 0.8 Ω*mm$^2$ and about 0.3 Ω*mm$^2$, respectively. The phase angle of the device at 100 kHz was about −80. The DC resistance was about 13000 Ω*mm$^2$.

Example 2

Double-sided capacitor devices were created from an anodized etched foil and conducting polymer, having a structure similar to that depicted in FIG. 5. For creation of the devices, samples of an etched foil were laser patterned prior to anodization. After anodization, a conducting polymer coating was applied to both sides of the anodized foil, and metallization layers were generated. Laser patterning was performed and electrical measurements performed. An individual double-sided capacitor device had lateral dimensions of 3 mm×3 mm and its capacitance between the center etched foil electrode and the top and bottom conducting polymer electrodes (connected to one another by a through-hole via) was measured to be 27000 nF at 100 kHz, providing an areal capacitance density of about 3000 nF/mm$^2$.

Example 3

A capacitor device was created from an anodized etched foil and conducting polymer and patterned using a laser patterning technique. The laser patterning technique allowed creation of a plurality of trenches in the capacitor device to generate multiple individual capacitor devices. Dimensions of the trenches were measured at various different points. Example depths measured were 34.5 µm and 36.6 µm. Example widths measured were 69.3 µm and 60.9 µm. In some cases, trenches were created adjacent to other trenches. Example separations between adjacent trenches were measured at 84.9 µm and 83.9 µm.

Example 4

A capacitor device was created from an anodized etched foil and conducting polymer and the thickness dimensions of the different components were evaluated. The etched foil had a thickness of about 120 µm. An anodized oxide layer on the etched foil had a thickness between about 10 nm and about 30 nm. A total thickness of the conducting polymer layer and carbonaceous material layer deposited on the oxide layer was about 50 µm. A titanium layer in contact with the carbonaceous material layer was about 50 nm thick. A copper layer in contact with the titanium layer was about 200 nm thick.

Example 5

A single-device layer, multi-terminal capacitor device was created on a flexible substrate from an anodized etched foil and conducting polymer. The multi-terminal capacitor device had overall lateral dimensions of about 30 mm×45 mm and included 30 individual capacitor devices, each having lateral dimensions of about 3 mm. The multi-terminal capacitor device was conformed to a cylindrical support structure having a radius of about 35 mm. No evidence of damage to the individual capacitors of the multi-terminal capacitor device was observed upon conforming to the cylindrical support structure.

Example 6

Figure 9:
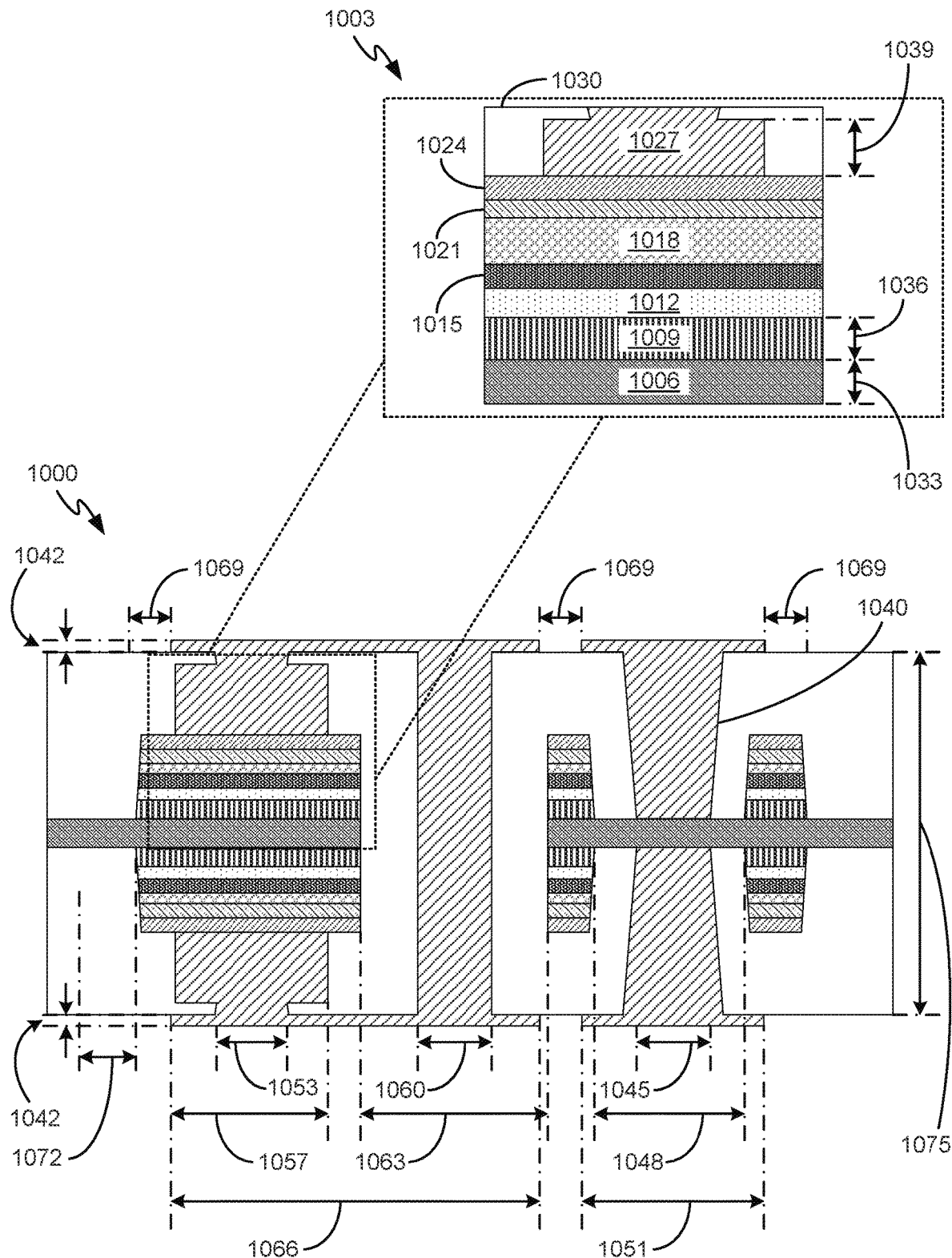
FIG. 9 provides a schematic cross-sectional illustration of an example high surface-area anodized etched foil-based capacitor.

A set of dimensional design rules were developed to guide fabrication of high surface-area anodized etched foil-based capacitors, such as single-sided structures similar to the construction describe above with reference to FIGS. 3 and 4, or double-sided structures similar to the construction described above with reference to FIG. 5, for example. FIG. 9 provides a schematic cross-sectional illustration of an example high surface-area anodized etched foil-based capacitor 1000 showing various dimensions for which design rules were identified, with an expanded schematic inset view 1003 of the layers of the capacitive structure to show detail on the ordering and identification of the layers. FIG. 9 is shown for illustrative purposes only and is not to scale.

The high surface-area anodized etched foil-based capacitor comprises an aluminum core layer 1006, a high surface-area layer 1009 (e.g., corresponding to an etched portion or porous surface), an $Al_2O_3$ anodization layer 1012, a conductive material layer 1015 (e.g., a conducting polymer or a conductive ceramic), a carbonaceous layer 1018 (e.g., carbon), a diffusion barrier layer 1021 (e.g., Ti), a metallization layer 1024 (e.g., sputtered Cu), and a metal contact 1027 (e.g., Cu). An insulating dielectric 1030 fills in regions between components. Together, the conductive material layer 1015, the carbonaceous layer 1018, the diffusion barrier layer 1021, and the metallization layer 1024 may form a first electrode of the capacitor. However, the carbonaceous layer 1018, the diffusion barrier layer 1021, and the metallization layer 1024 may be optional. The aluminum core layer 1006 and the high surface-area layer 1009 may form a second electrode of the capacitor. The first electrode may be a cathode, and the second electrode may be an anode, or vice versa.

The first electrode or the second electrode may be common to (e.g., shared among) a plurality of capacitors in a multi-capacitor device, while the opposite electrodes are electrically isolated. For example, the aluminum core layer 1006 may be common to and continuous across a plurality of capacitors in a multi-capacitor device, while the multi-capacitor device has multiple electrically isolated second electrodes. Alternatively, the second electrodes may be common to and continuous across a plurality of capacitors in a multi-capacitor device, while the multi-capacitor device has multiple electrically isolated aluminum core regions 1006. The second electrodes may be connected to each other with one or more through vias and/or one or more blind vias.

Target dimensions were developed for the arrangement and structure of various components of the high surface-area anodized etched foil-based capacitor as follows. For the aluminum substrate, comprising the aluminum core layer 1006 and the high surface-area layer 1009, the nominal thickness 1033 of the aluminum core layer 1006 is about 30 μm, while the nominal thickness 1036 of the high surface-area layer 1009 is about 40 μm.

For the metal contact 1027 (e.g., the top and bottom contacts), a blind via landing pad for the metal contact 1027 has a nominal thickness 1039 of about 30 μm, while the top and bottom thickness for the metal contact 1027 have nominal thicknesses 1042 of about 10 μm. Although specifically called out in the inset view 1003 in FIG. 9, the diffusion barrier layer 1021 has a nominal thickness of about 50 nm, while the metallization layer 1024 has a nominal thickness of about 200 nm.

In the following description of the high surface-area anodized etched foil-based capacitors shown in FIG. 9, the conductive material 1015 comprises the cathode side, while the aluminum core layer 1006 comprises the anode side. These designations as anode/cathode can optionally be reversed in some cases, but are used here to explain the target dimensions. For electrical contact with the aluminum core layer 1006, an anode via 1040 is shown filled with the same material as metal contact 1027. The anode via 140 may be a through via or a blind via. A nominal diameter 1045 of the anode via 1040 is from about 100 μm to about 150 μm. A clearance hole for the anode via 1040, providing a separation for the capacitor's functional elements from the anode via 1040, has a nominal diameter 1048 of about 250 μm. A capture pad for the anode via 1040 has a nominal diameter 1051 of about 300 μm.

For electrical contact with the metallization layer 1024, providing conductive contact with the conductive material layer 1015, a blind cathode via is shown filled with a metal contact 1027. A nominal diameter 1053 of the blind via is about 100 μm. The landing pad for the blind via has a nominal diameter 1057 of about 250 μm.

The top landing pad (e.g., terminal) for the anode and the top landing pad for the cathode may be co-planar as depicted in FIG. 9. The bottom landing pad for the anode and the bottom landing pad for the cathode may also be co-planar.

For double-sided devices, a cathode through via is shown filled with a metal contact 1027 to provide an electrical connection between the top cathode side and the bottom cathode side. A nominal diameter 1060 of the cathode through via is about 100 μm to about 150 μm, with a clearance hole for the cathode through via having a diameter 1063 of about 300 μm. The capture pad for the cathode has a diameter 1066 of about 600 μm.

Other dimensions for which dimensional design rules were established include a spacing dimension 1069 of about 50 μm, which may correspond to a spacing between landing and/or capture pads, with a dimension of about, and a trench width 1072 of from about 150 μm to about 250 μm. An overall thickness dimension 1075 is about 220 μm.

Example 7-Planar High-Density Aluminum
Capacitors with Double Sided Electrode
Architecture that Enables 3D Stacking and
Embedding This Example describes various multi-terminal capacitor devices and processing schemes for preparing multi-terminal capacitor devices. In this Example, some of the disclosed multi-terminal capacitor devices employ a conductor filled via providing a conductive path between a first metal seed surface on one side of a two-sided capacitor structure and second metal seed surface on a second side of the two-sided capacitor structure. As with the other Examples described herein, the capacitor structure may be or correspond to a high surface-area anodized etched foil-based capacitor employing a conductive material electrode, such as a conducting polymer or a conductive ceramic. The multi-terminal capacitor devices in this Example further describe configurations that can improve electrical isolation between the etched foil electrode and the conductive material electrode and/or improve electrical isolation between adjacent discrete capacitor structures, and/or increase the areal packing quantity of discrete capacitor structures.

FIG. 10 provides a schematic cross-sectional illustration of an example multi-terminal capacitor device 1100. FIG. 10 is shown for illustrative purposes only and is not to scale. The multi-terminal capacitor device 1100 comprises an aluminum core layer 1106, high surface-area layers 1109 (e.g., corresponding to an etched portion), $Al_2O_3$ anodization layers 1112, conductive material layers 1115, carbonaceous layers (e.g., carbon) 1118, metal seed layers 1120, which may comprise diffusion barrier layers (e.g., Ti) and/or metallization layers (e.g., sputtered Cu), and top metal layers 1122 (e.g., Cu). Top metal layers 1122 may include contact regions and may fill blind vias 1135 and through vias 1140, 1145 in multi-terminal capacitor device 1100. An insulating region 1130 (e.g., dielectric or insulating polymer, such as ABF) fills in regions between components.

As depicted, multi-terminal capacitor device 1100 includes two blind vias 1135 landing on the metal seed layers 1120, a through via 1140 contacting the aluminum core layer 1106, and a through via 1145 providing conductivity between the between top metal seed layer and the bottom metal seed layer. The through vias 1145 and 1140 and blind via 1135 may be filled with a solid conductor, such as copper, which can provide better conductance than other materials used for vias, including carbon pastes and silver pastes. In some cases, through vias 1140 may be substituted by one or more blind vias, similar to the configuration of anode vias 1040 depicted in FIG. 9.

Figure 11:
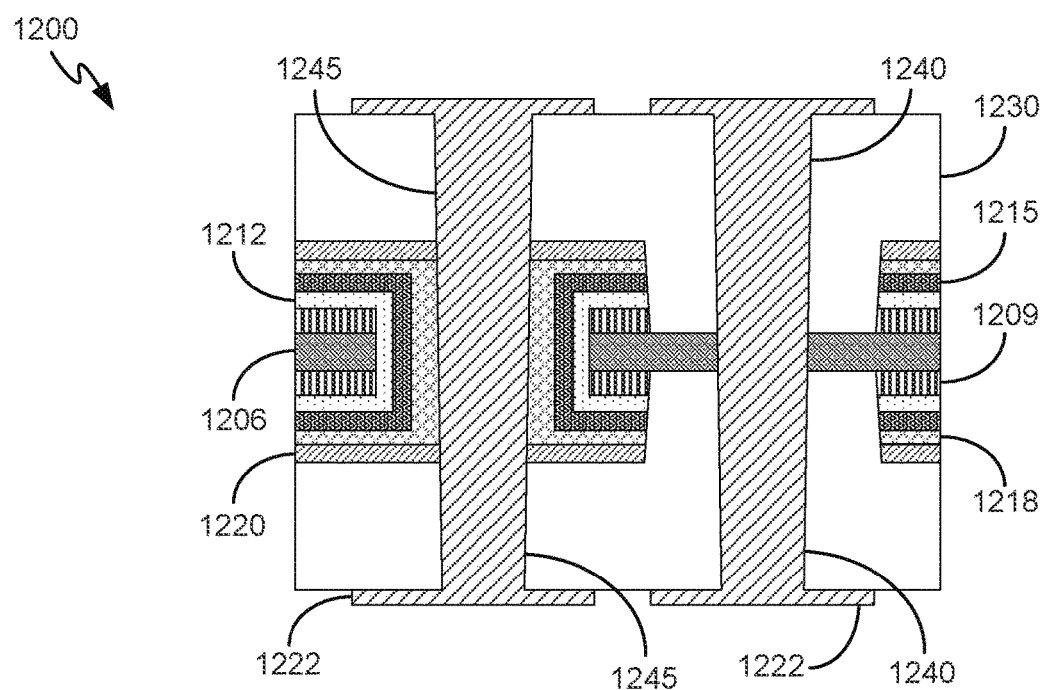
FIG. 11 provides a schematic cross-sectional illustration of an example miniaturized multi-terminal capacitor device.

FIG. 11 provides a schematic cross-sectional illustration of an example miniaturized multi-terminal capacitor device 1200. FIG. 11 is shown for illustrative purposes only and is not to scale, though the configuration illustrated is intended to depict a more compact configuration than shown in FIG. 10, including generally all the same components. For example, miniaturized multi-terminal capacitor device 1200 comprises an aluminum core layer 1206, high surface-area layers 1209 (e.g., corresponding to an etched portion), $Al_2O_3$ anodization layers 1212, conductive material layers 1215, carbonaceous layers (e.g., carbon) 1218, metal seed layers 1220, which may comprise diffusion barrier layers (e.g., Ti) and/or metallization layers (e.g., sputtered Cu), and top metal layers 1222 (e.g., Cu). Top metal layers 1222 may include contact regions and may fill through vias 1240 and through vias 1245 in miniaturized multi-terminal capacitor device 1200. An insulating region 1230 (e.g., dielectric or insulating polymer, such as ABF) fills in regions between components. In some cases, through vias 1240 may be substituted by one or more blind vias, similar to the configuration of anode vias 1040 depicted in FIG. 9.

Miniaturized multi-terminal capacitor device 1200 may provide up to 40× an electrode density than in a comparable multi-terminal capacitor device, such as multi-terminal capacitor device 1100. Additionally, miniaturized multi-terminal capacitor device 1200 may exhibit an up to 20% reduction in thickness compared to other multi-terminal capacitor devices, such as multi-terminal capacitor device 1100. The miniaturization, electrode density increase, and thickness reduction may arise, at least in part, by the processing and positioning of components, including configuration of vias 1245 directly providing electrical contact with metal seed layers 1220.

Figure 12:
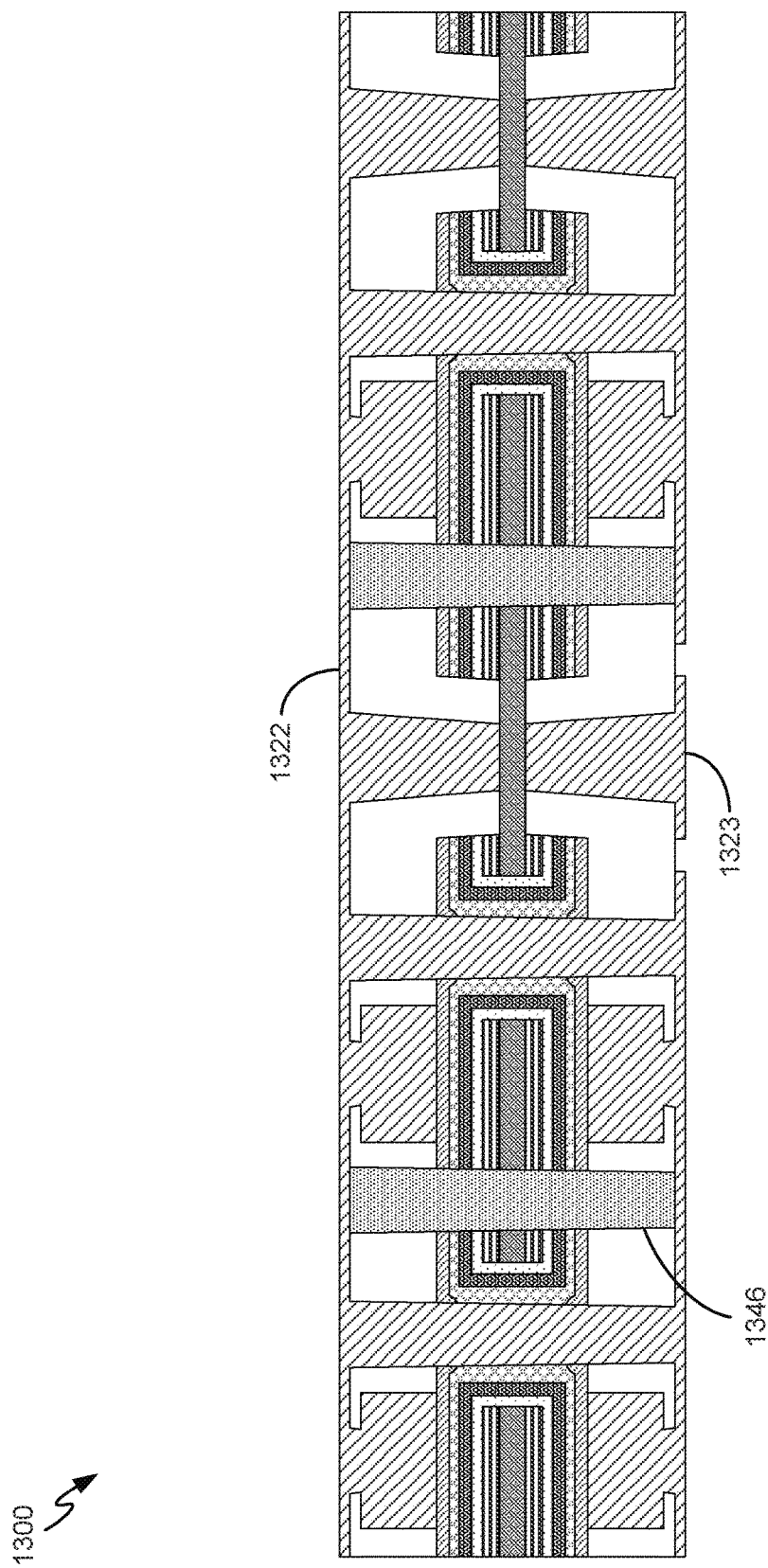
FIG. 12 provides a schematic cross-sectional illustration of an example multi-terminal capacitor device showing a continuous outer electrode configuration and a discretized outer electrode configuration.

FIG. 12 shows another example configuration of a multi-terminal capacitor 1300 with different patterning of top metal layers 1322 and 1323 on different sides. The configuration of metal layers 1322 and 1323 is merely shown as an example to show the configuration of a continuous outer electrode using metal layer 1322, or the configuration of discretized devices using the patterned configuration of metal layer 1323, depending on the desired configuration. In addition, through vias 1346 filled with an insulating material (e.g., dielectric or insulating polymer, such as ABF) can be used to discretize the internal devices to a finer level, such as after initial fabrication. Through vias 1346 can be optionally patterned internally to form an inner via to allow contact with the central aluminum core layer (anode), as desired.

Figure 13A:
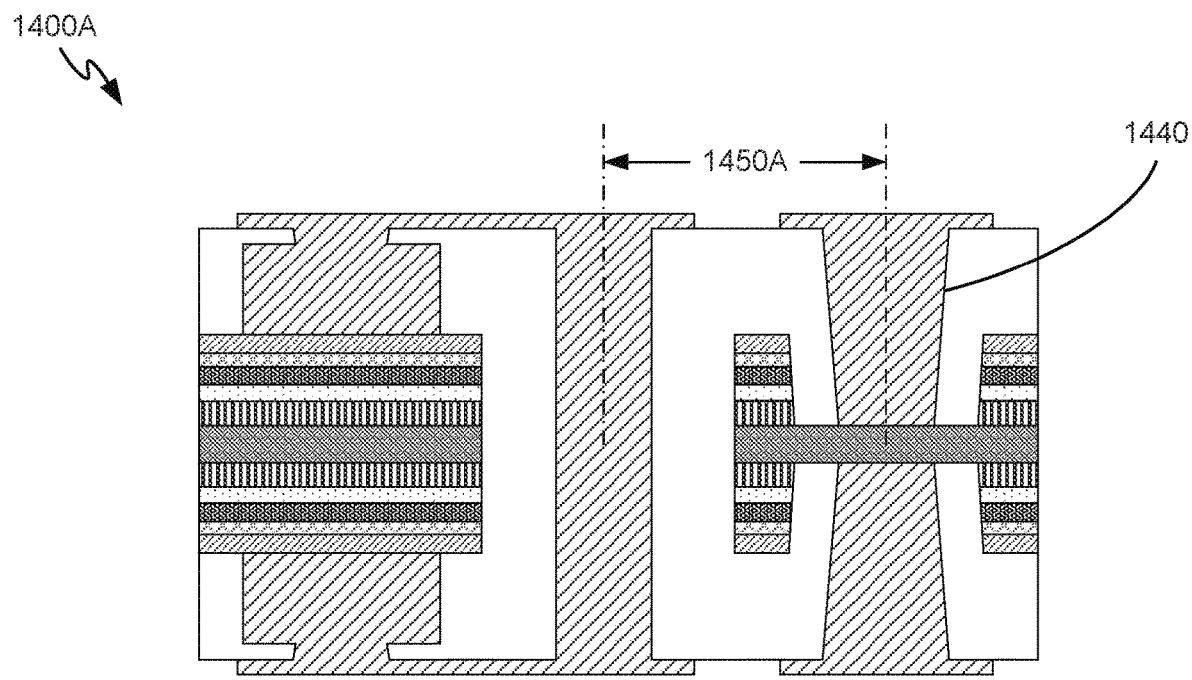
FIG. 13A and FIG. 13B provide schematic cross-sectional illustrations of multi-terminal capacitor devices showing different pitch spacing between adjacent vias.
Figure 13B:
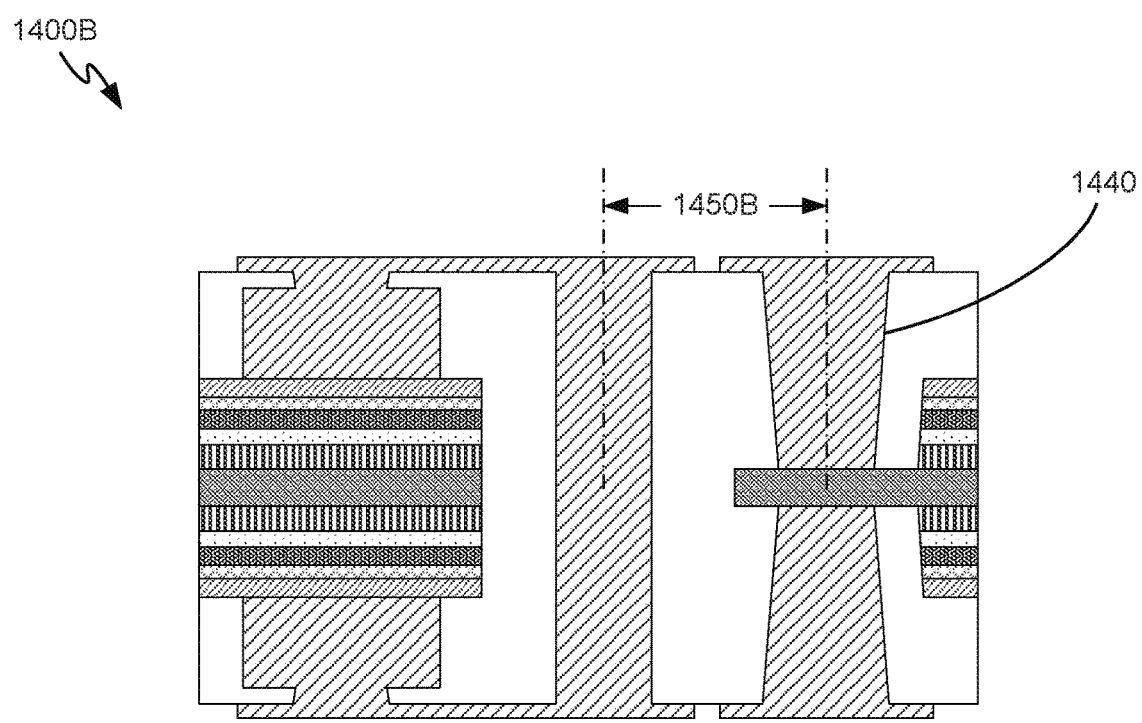

Additional miniaturization options are also possible. FIG. 13A and FIG. 13B provide schematic cross-sectional illustrations of two example multi-terminal capacitor devices 1400A and 1400B. FIGS. 13A and 13B are shown for illustrative purposes only and are not to scale, though the configurations illustrated are intended to show depiction of changes to allow for a more compact configuration. Multi-terminal capacitor device 1400A generally has the same structure as high surface-area anodized etched foil-based capacitor 1000 depicted in FIG. 9. In FIG. 13B, the clearance between adjacent devices in multi-terminal capacitor device 1400B is reduced by establishing an anode via 1440B at the edge of the capacitor structure rather than at a central location, as is the case for anode via 1440A in multi-terminal capacitor device 1400A. In this way, a reduction in pitch 1450B as compared to pitch 1450A can be achieved. Further a reduction in the equivalent series inductance (ESL) can be achieved by the configuration of multi-terminal capacitor device 1400B as compared to multi-terminal capacitor device 1400A because of the reduction in pitch 1450B as compared to pitch 1450A. Further, although anode vias 1440 for contacting the aluminum core layer 1406 are shown as blind vias, a through via contacting the aluminum core layer 1406 may instead be used, similar to the configuration of through vias 1140 and 1240 shown in FIGS. 10 and 11, respectively. In some cases, use of through vias may simplify fabrication as compared to use of blind vias.

Processing to fabricate the multi-terminal capacitor device 1400B may performed by forming blind anode clearance holes for the top and bottom side for contacting the aluminum core layer 1406, or alternatively a through anode clearance hole for contacting the aluminum core layer 1406. This may be followed by forming a through cathode clearance hole for the cathode via, which may remove edges of the anode clearance hole(s). A dielectric (e.g., ABF) may be filled into the through holes. The dielectric may be patterned by formation of inner though vias (e.g., cathode and optionally anode) or inner blind vias (anode), which can be filled with a conductive material, such as using a paste filling process, followed by lamination with a top copper foil and curing of the filled paste.

Fabrication of multi-terminal capacitors may also take into account equivalent series inductance (ESL) of the capacitors and associated electrical contacts. In some cases, it may be desirable to minimize or reduce the ESL of the capacitors as much as possible. For example, in some cases, the capacitor elements of the disclosed multi-terminal capacitors may exhibit an ESL of 100 pico Henry (pH) or less, such as from 10 pH to 20 pH, 20 pH to 30 pH, 30 pH to 40 pH, 40 pH to 50 pH, 50 pH to 60 pH, 60 pH to 70 pH, 70 pH to 80 pH, 80 pH to 90 pH, or 90 pH to 100 pH.

A variety of different multi-terminal capacitor designs may be useful for achieving an ESL of 100 pH or less. For example, in some cases, a multi-terminal capacitor device may be constructed with embedded power planes and ground planes, such as a power plane in an electrical power distribution network for a cathode side of a capacitor and a ground plane in an electrical power distribution network for an anode side of a capacitor. In some cases, for achieving an ESL of 100 pH or less, a separation between the power and ground planes of less than 500 µm may be used, such as from 50 µm to 100 µm, from 100 µm to 150 µm, from 150 µm to 200 µm, from 200 µm to 250 µm, from 250 µm to 300 µm, from 300 µm to 350 µm, from 350 µm to 400 µm, or from 450 µm to 500 µm.

In some cases, the power plane may be positioned in the power delivery path with a cathode side of a capacitor by way of a cathode via, similar to the configuration of blind vias 1135 shown in FIG. 10 or through vias 1145 and 1245 shown in FIGS. 10 and 11, respectively. In some cases, the ground plane may be positioned in the power delivery path with an anode side of a capacitor by way of an anode via, similar to the configuration of blind via 1040 shown in FIG. 9 or through vias 1140 and 1240 shown in FIGS. 10 and 11, respectively. In some cases, for achieving an ESL of 100 pH or less, a ratio of the cathode-to-anode via pitch/via radius may be less than 5, such as from 2 to 2.5, from 2.5 to 3, from 3 to 3.5, from 3.5 to 4, from 4 to 4.5, or from 4.5 to 5. Some ways to achieve this ratio may include increasing diameters of cathode through vias, which may result in reducing an inductance associated with the through vias. Some other ways to achieve this ratio may include reducing a spacing or pitch between cathode through vias and anode vias.

Figure 14:
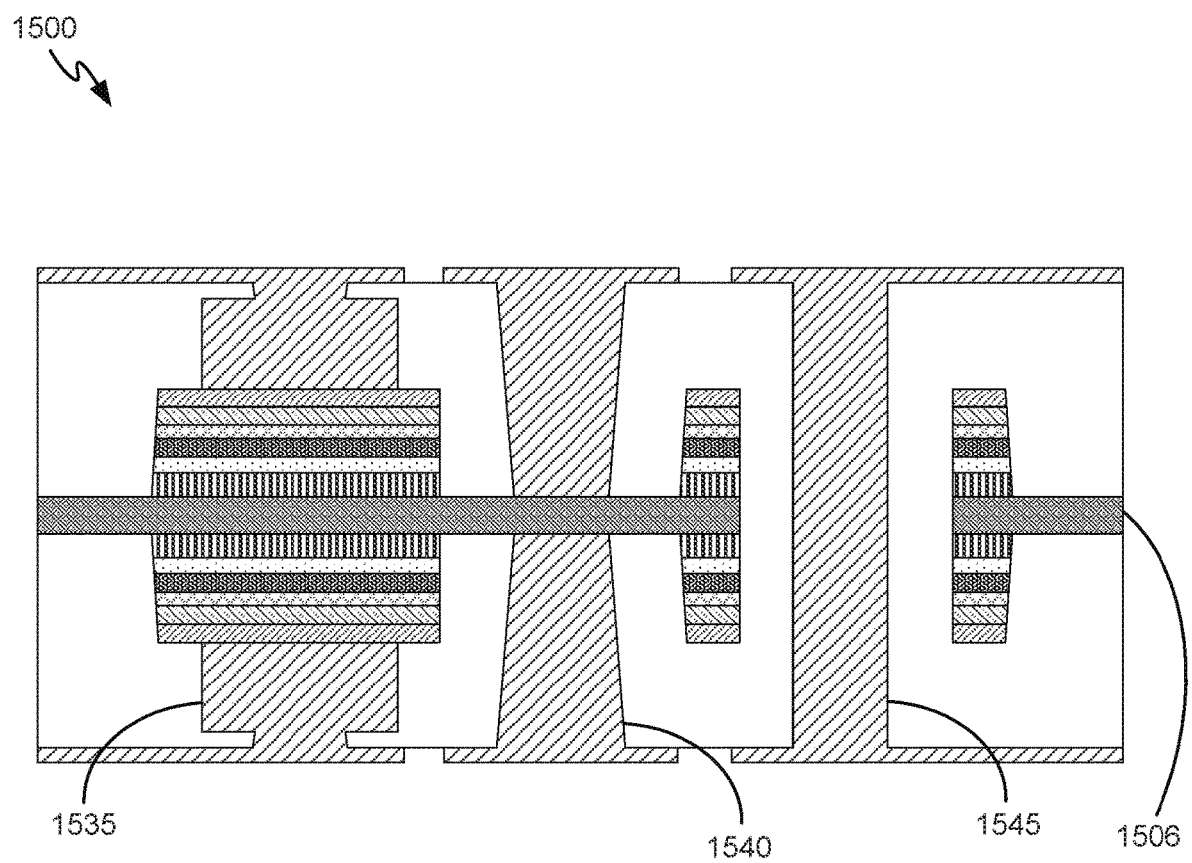
FIG. 14 provides a schematic cross-sectional illustration of an example multi-terminal capacitor device showing a configuration that can be used to reduce an equivalent series inductance of a capacitor.

The arrangement of vias in a multi-terminal capacitor device may also be useful for achieving an ESL of 100 pH or less, in some cases. FIG. 14 provides a schematic cross-sectional illustration of an example multi-terminal capacitor device 1500. FIG. 14 is shown for illustrative purposes only and is not to scale, though the configuration illustrated are intended to show relative orientation of components which may allow, in some cases, for a reduced ESL, such as when compared with other configurations, like the configuration of high surface-area anodized etched foil-based capacitor 1000 depicted in FIG. 9. Multi-terminal capacitor device 1500 generally has the same structure as high surface-area anodized etched foil-based capacitor 1000 depicted in FIG. 9, but in FIG. 14, the arrangement of vias is different from that shown in FIG. 9. In FIG. 14, the through via 1545, providing conductivity between opposing cathodes, is arranged to configure the blind vias 1540, providing conductivity to the aluminum core layer 1506, between the through via 1545 and the other components of the capacitor, such as an $Al_2O_3$ anodization layer, a conductive material layer (e.g., a conducting polymer or a conductive ceramic), a carbonaceous layer (e.g., carbon), a diffusion barrier layer (e.g., Ti), a metallization layer (e.g., sputtered Cu), and a metal contact. Here, different portions of aluminum core layer 1506 can be in electrical communication with one another by way of portions out of the plane shown in FIG. 14 and/or by way of a separate ground plane positioned above and/or below the multi-terminal capacitor device 1500 shown in FIG. 14. Similarly, the through via 1545 can be in electrical communication with blind vias 1535 by way of portions of the top contact out of the plane shown in FIG. 14 and/or by way of a separate power plane positioned above and/or below the multi-terminal capacitor device 1500 shown in FIG. 14. Similarly, in FIGS. 13A and 13B, the blind-via 1440A/1440B is arranged to configure the position of the through-vias. These configurations are useful for allowing the via positions and pitch to be selected so as to attain an effective loop inductance of less than 100 pH.

Figure 15:
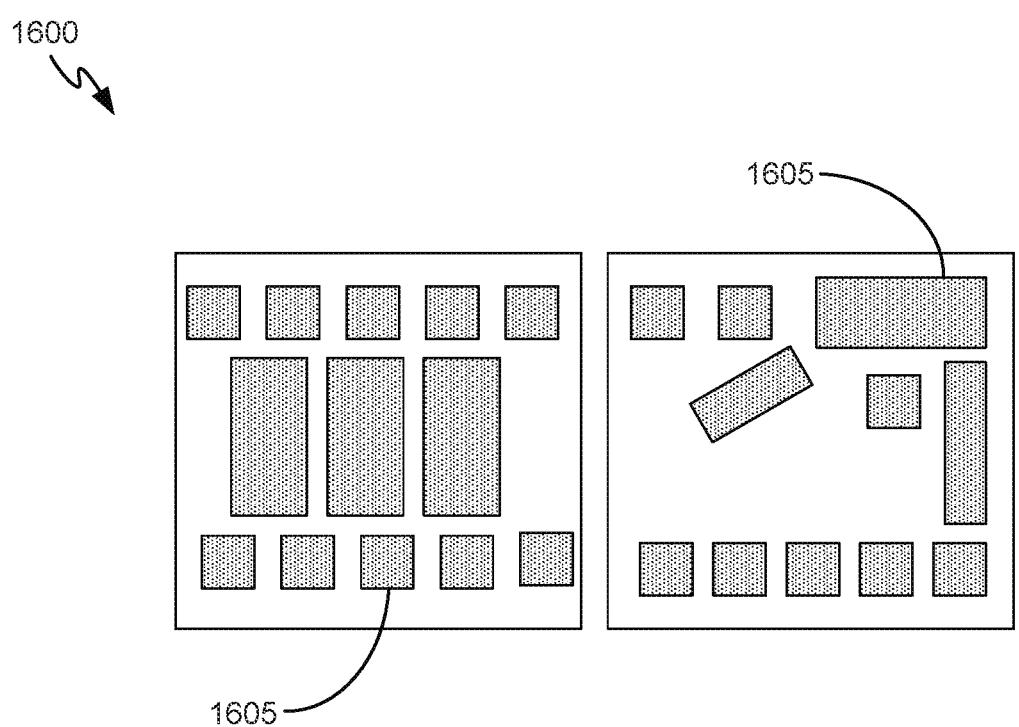
FIG. 15 provides an overview of a caplet architecture of different capacitor devices electrically isolated from one another and having different shapes and areas.

The multi-terminal capacitors described in this Example and elsewhere herein can be geometrically arranged in three-dimensions in any desirable configuration. For example, FIG. 15 provides an overhead view of a caplet architecture 1600 of different capacitor devices 1605 electrically isolated from one another and having different shapes and areas. These individual capacitor devices 1605 can be prepared using trenching, as described in further detail below, which can allow for customizable shapes and arrangements of capacitor devices 1605. For example, the isolated capacitor device 1605 do not have to be confined to a grid structure and can exhibit different areas to provide different capacitors, such as may be useful for load balancing operations.

In some examples, the multi-terminal capacitor devices can have up to 1,000 individual terminals. Further, the configurations described can be one-sided or two-sided, allowing for connections to terminals on one or both sides of the multi-terminal capacitor devices.

Figure 16:
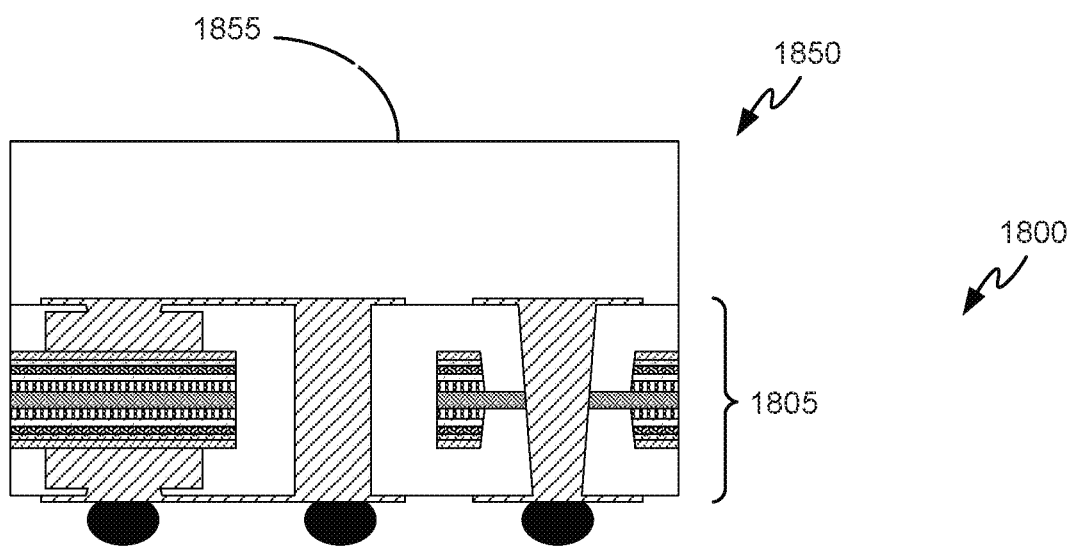
FIG. 16 provides a schematic illustration of multi-terminal capacitor devices in a surface-mounted configuration.

FIG. 16 shows a plan view 1800 of surface-mounted multi-terminal capacitor structures 1805. The expanded inset 1850 shows an example cross-sectional view of the surface-mounted multi-terminal capacitor structure 1805, with a top molding structure 1855 for protecting/packaging the internal components of the multi-terminal capacitor structure.

Figure 17:
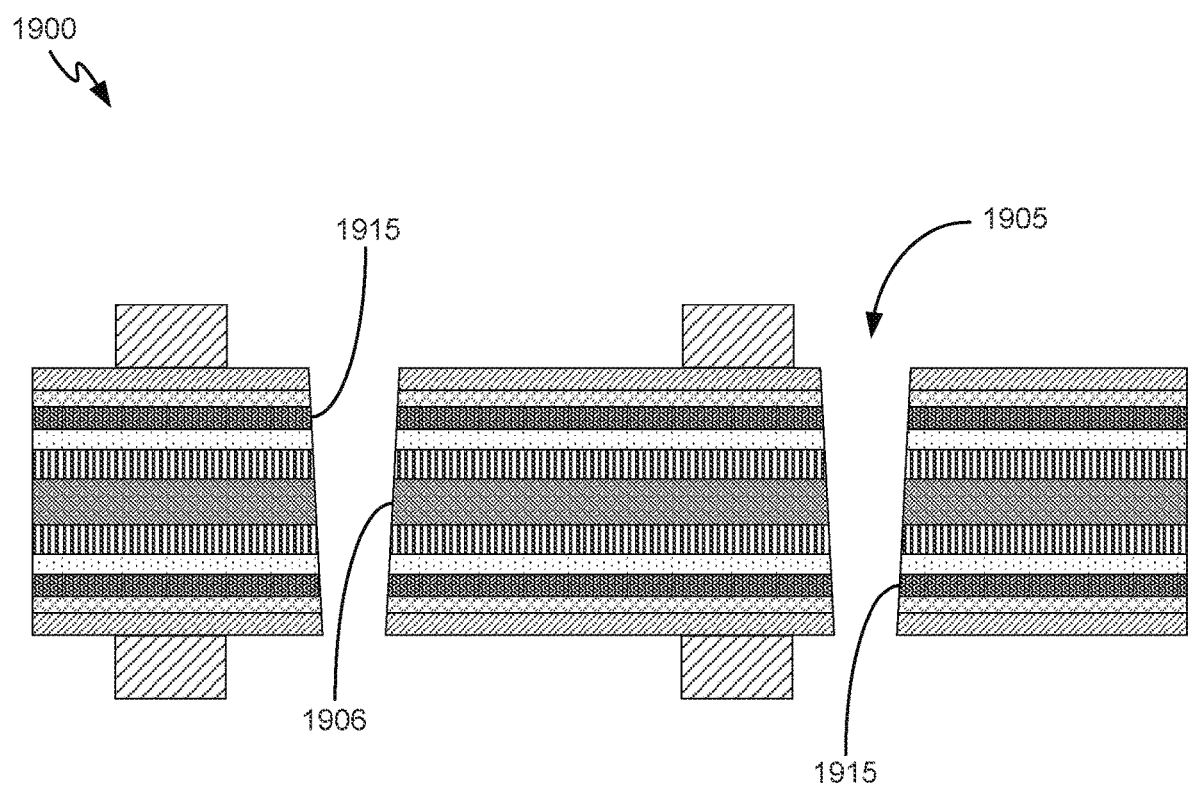
FIG. 17 provides a schematic cross-sectional illustration of components of a multi-terminal capacitor device prepared according to a via-last processing scheme.

The multi-terminal capacitor devices described herein can also provide improved electrical isolation between the capacitor terminals (i.e., between the central aluminum core electrode and the conductive material electrode). For example, when through vias are prepared according to a via-last processing scheme, there can be an increased risk of short circuiting between the two capacitor electrodes and/or between adjacent capacitor structures. FIG. 17 provides a schematic cross-sectional illustration of components of a multi-terminal capacitor device 1900 prepared according to a via-last processing scheme, where a through via 1905 is drilled through the capacitor structure and subsequently filled with a conductor. When the conductor is present in such a through via 1900, the conductor can provide a conductive pathway/short circuit between aluminum core layer 1906 and conductive material layers 1915, for example.

Figure 18:
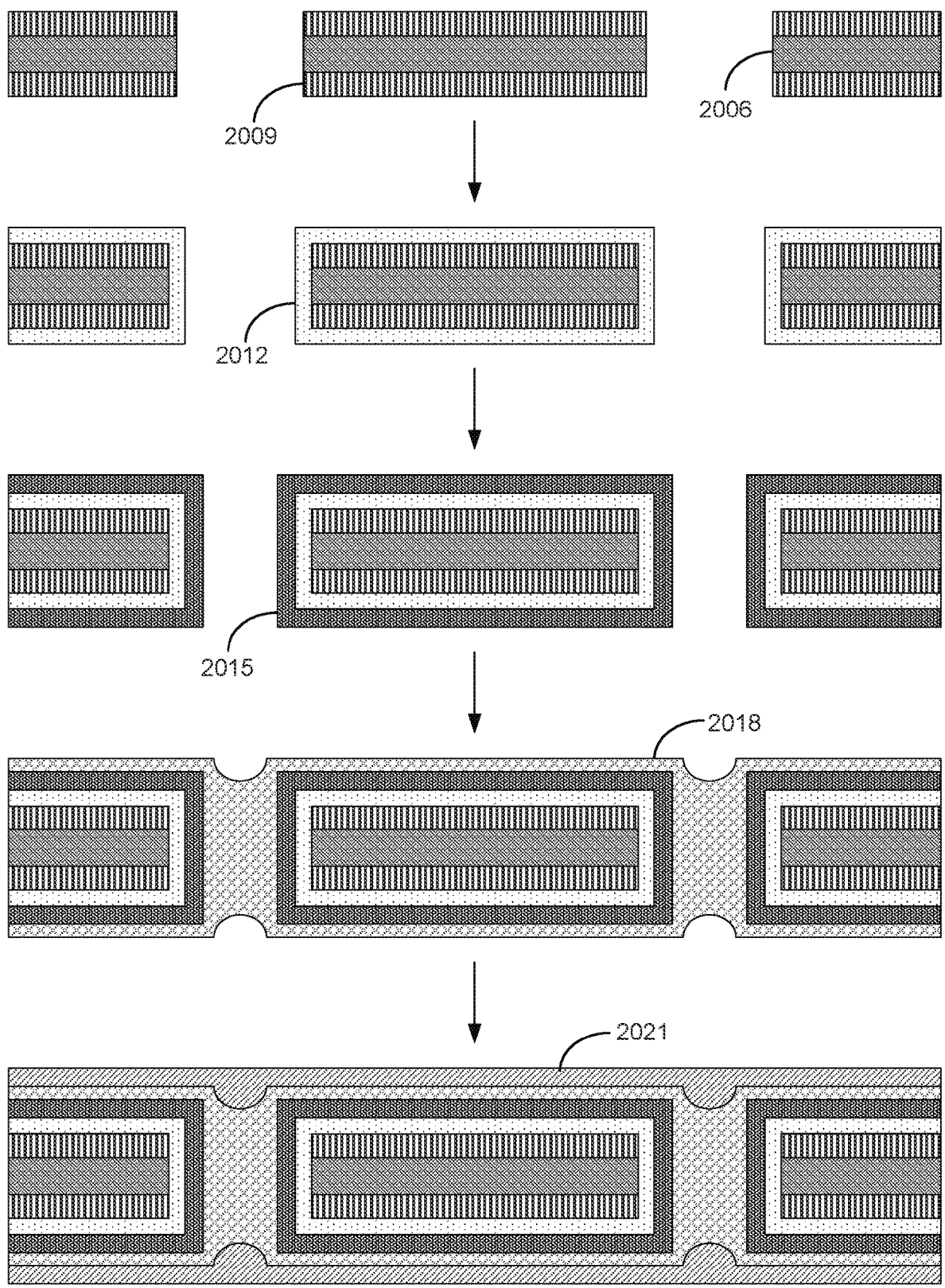
FIG. 18 provides a process flow of preparation of a multi-terminal capacitor device according to a via-first processing scheme.

In some cases, preparing multi-terminal capacitor structures according to a via-first processing scheme can reduce this risk of short circuiting because a dielectric layer can be formed on the surfaces of the central aluminum core electrode, providing a good insulating layer. FIG. 18 provides a process flow of preparation of a multi-terminal capacitor device according to a via-first processing scheme. Initially, aluminum core layer 2006 with high surface-area layers 2009 there are subjected to through via drilling. Following this, the structure is anodized, for example, to prepare an insulating $Al_2O_3$ anodization layer 2012, which can protect surfaces of aluminum core layer 2006 and high surface-area layers 2009 facing the through vias. The anodization layer can then be coated with a conductive material layer 2015, which can again provide complete coverage around the surface of anodization layer 2012 for maximum capacitance. A carbonaceous layer 2018 and a metal seed layer 2021 can then be prepared. In some cases carbonaceous layer 2018 and metal seed layer 2021 can, at least partially, fill the through via.

Figure 19A:
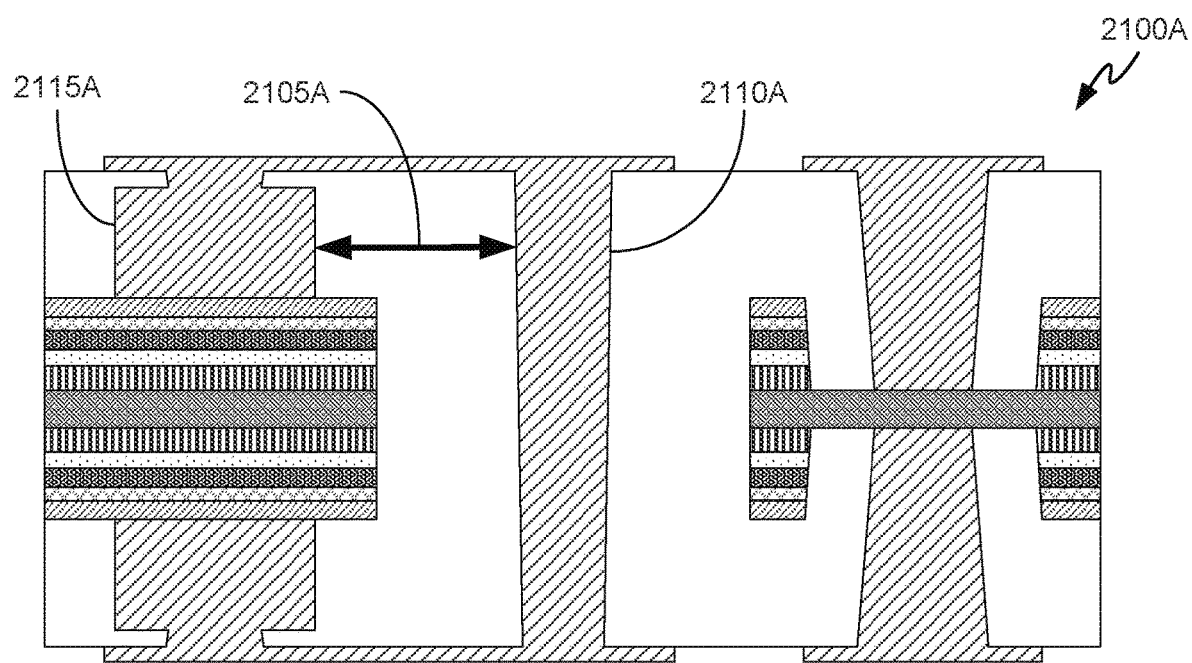
FIG. 19A and FIG. 19B provide schematic cross-sectional illustrations of multi-terminal capacitor devices prepared using via-last and via-first processing schemes.
Figure 19B:
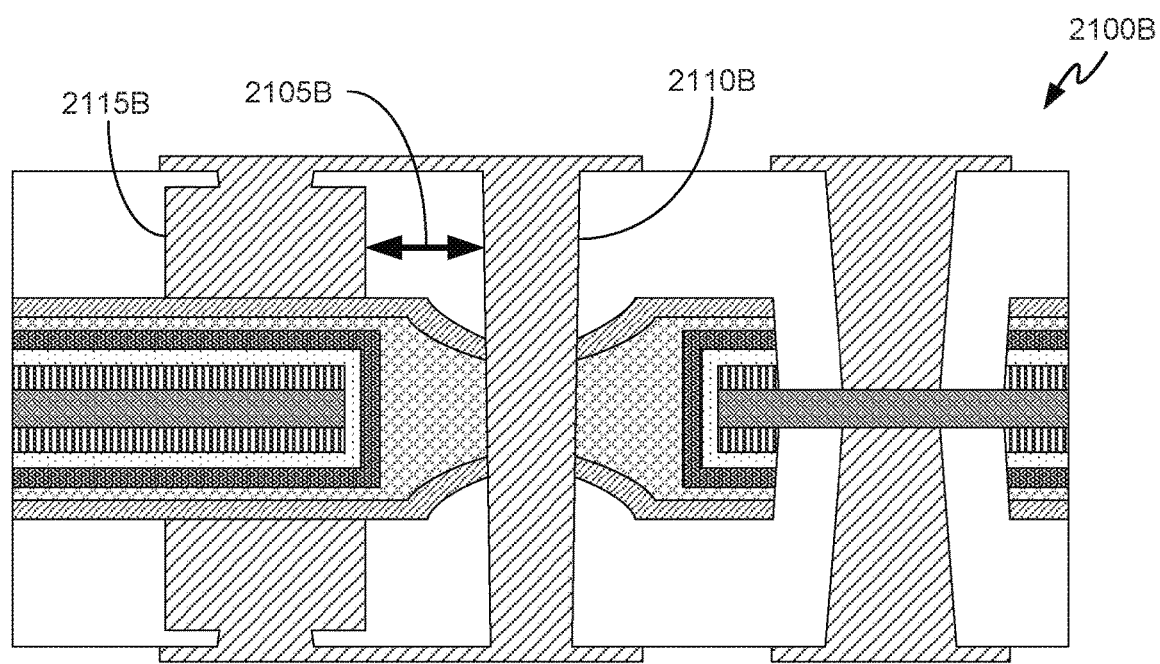

The use of a via-first processing can also provide other advantages. For example, via-first processing can permit more compact and miniaturized configurations, allowing for an increase in the number density of individual capacitor elements in a multi-terminal capacitor device. FIG. 19A provides a schematic cross-sectional illustration of an example multi-terminal capacitor device 2100A prepared according to a via-last processing scheme and FIG. 19B provides a schematic cross-sectional illustration of an example multi-terminal capacitor device 2100B prepared according to a via-first processing scheme. In the multi-terminal capacitor device 2100A, a relatively large clearance 2105A is shown between the through via 2110A and the landing pad 2115A making contact with the active capacitor elements. This clearance 2105A may be needed because the landing pad 2115A and through via 2110A are prepared at different points in time. For example, the through via 2110A may be already filled when landing pad 2115A is applied. In FIG. 19B, a much smaller clearance 2105B is shown between the through via 21101B and the landing pad 2115B. In some cases, the clearance can even be zero, such that through via 2110B and landing pad 2115B can overlap, similar to the configuration of miniaturized multi-terminal capacitor device 1200 shown in FIG. 11.

Figure 20:
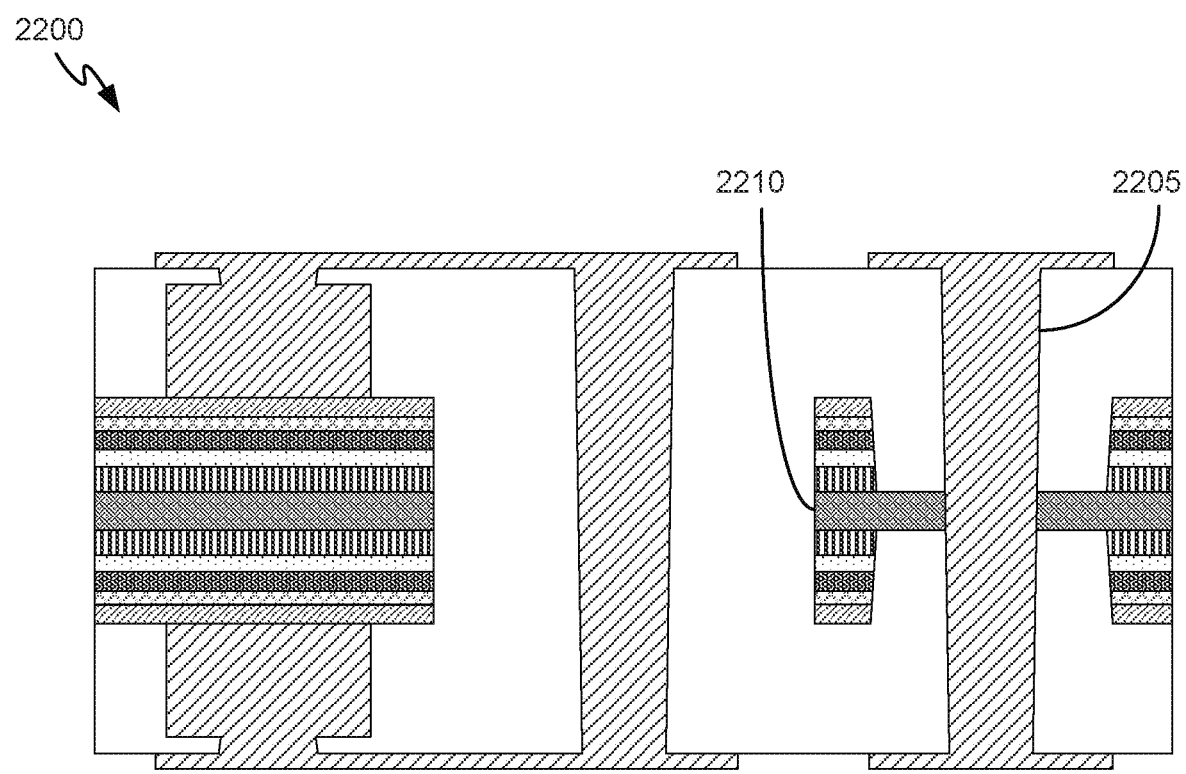
FIG. 20 provides a schematic cross-sectional illustration of a multi-terminal capacitor device using a through via for contacting an internal electrode.

An alternative configuration of a multi-terminal capacitor device is to make contact with a central aluminum core layer using a through via rather than blind vias. FIG. 20 provides a schematic cross-sectional illustration of a multi-terminal capacitor device 2200. For example, FIG. 20 shows use of a through via 2205 for contacting a central aluminum core layer 2210, which compares with the configuration depicted in FIG. 9, where blind vias 1040 are used to contact the aluminum core layer 1006. In some cases, use of a through via may provide a more simplified configuration than use of two blind vias.

Figure 21:
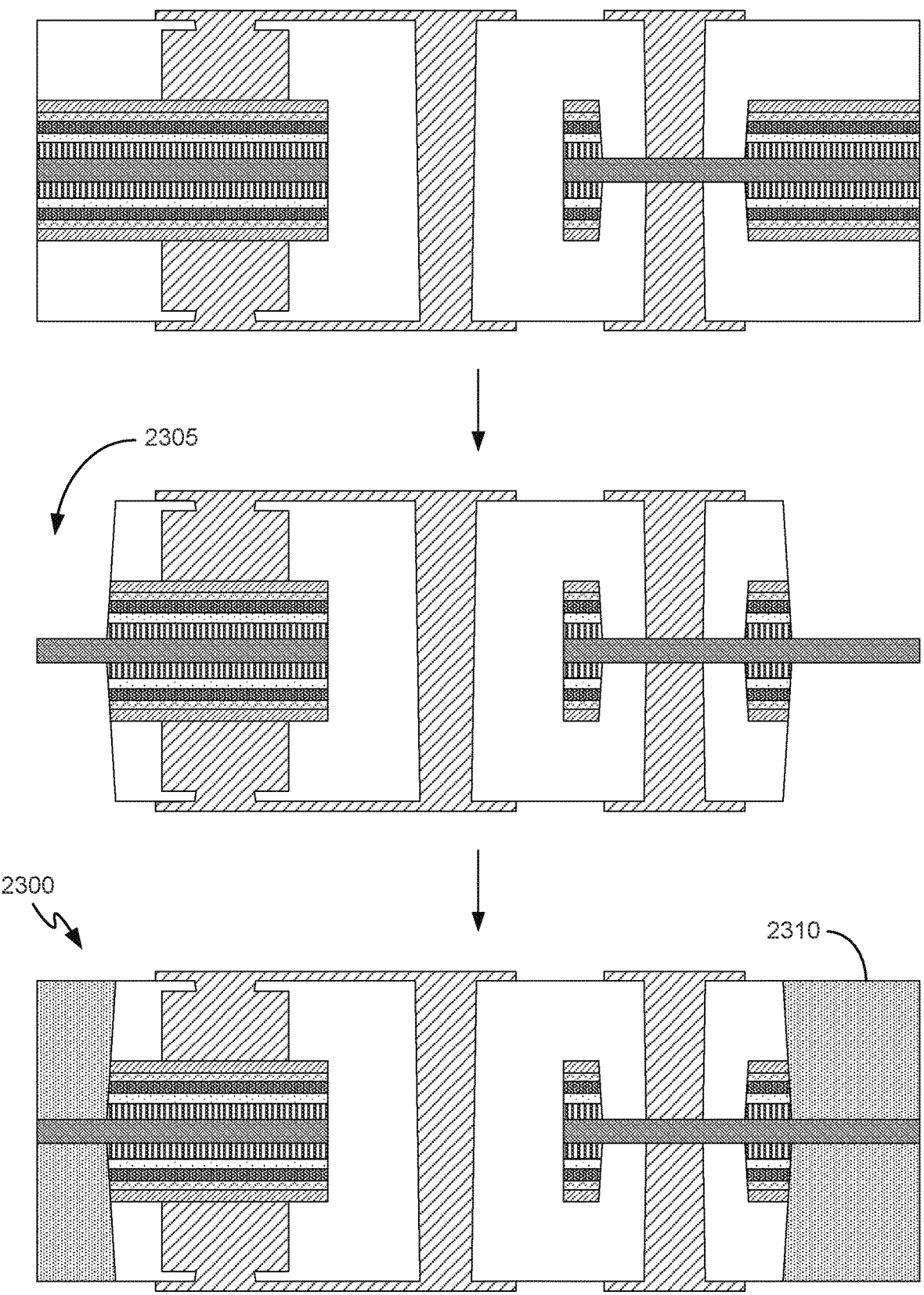
FIG. 21 provides a process flow of preparation of a multi-terminal capacitor device using a continuous trenching scheme.

Different trenching configurations may also be used for constructing a multi-terminal capacitor device. For example, one option for trenching is to create trenches that terminate at the central core layer, which may allow for the central core layer to be used as a continuous electrode. FIG. 21 provides a process flow of preparation of a multi-terminal capacitor device 2300 using a continuous trenching scheme. Trenches 2305 are created to isolate the conductive material electrodes of adjacent devices from one another. Subsequently, trenches 2305 are filled, such as with an insulating material 2310. Such a configuration may employ a reverse bias configuration and/or require reverse bias stability.

Figure 22:
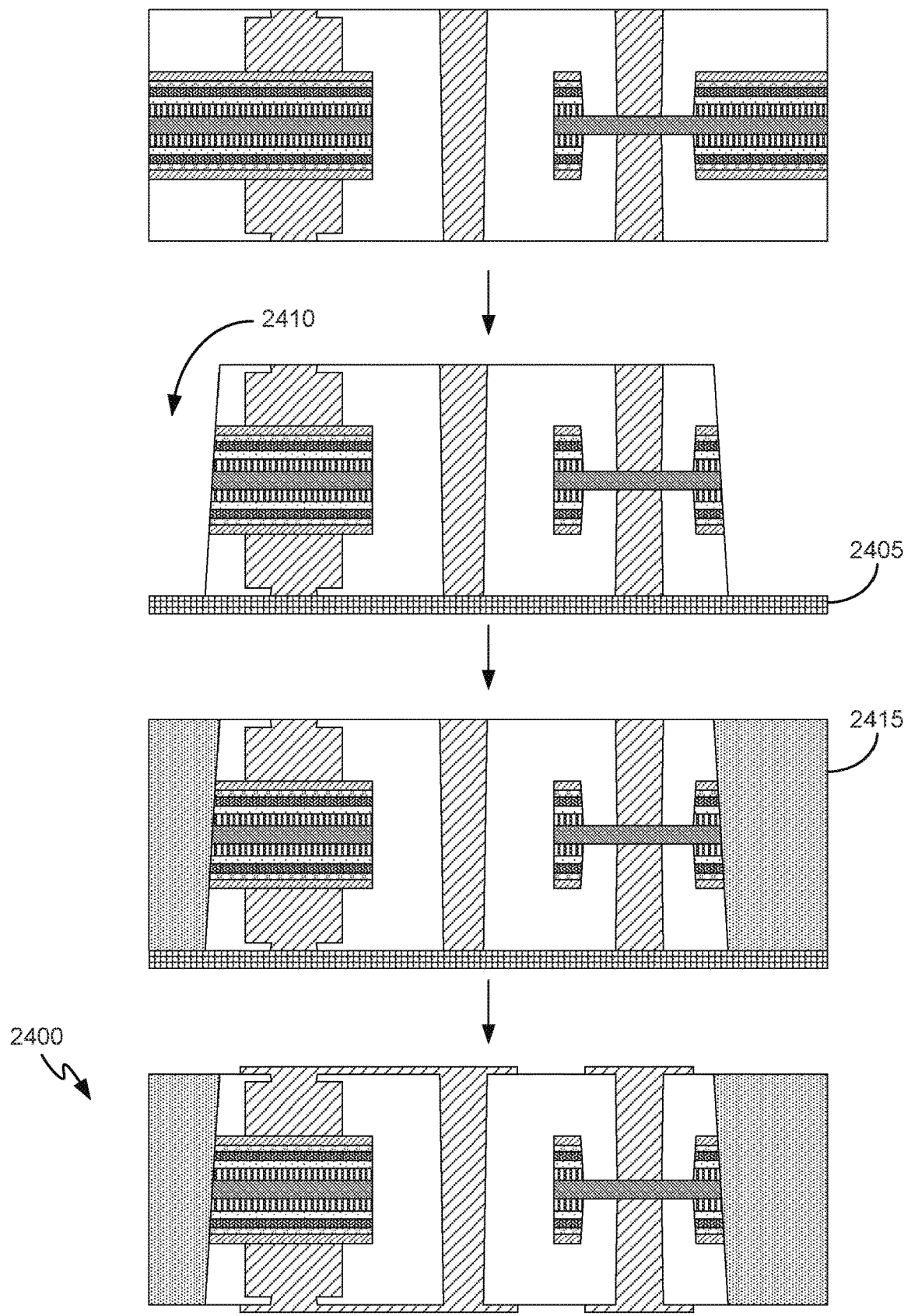
FIG. 22 provides a process flow of preparation of a multi-terminal capacitor device using a discretized trenching scheme.

An alternative option for trenching is to create trenches that are drilled through the entire capacitor stack. FIG. 22 provides a process flow of preparation of a multi-terminal capacitor device 2400 using a discretized trenching scheme. Here, the base device is positioned on a processing substrate 2405 and the central core layer is discretized by the trenches 2410, which can result in completely independent operation of different adjacent capacitor devices. The trenches 2410 are then be filled with an insulating material 2415 and the processing substrate removed for preparation of contact pads. Continuous or discretized top metal layers can be used, similar to the various configurations shown in FIG. 12.

By performing trenching after making the base structure of a multi-component capacitor device, the resultant individual capacitor elements can be individually tested to identify problematic elements and good or operable elements. If not all the individual capacitor elements are needed, the problematic elements can be identified and only the operable capacitor elements can be used. In some cases, the operable elements can be singulated and built into a new device with a desired structure.

The multi-terminal capacitor devices described in this Example and elsewhere in this disclosure can be used in a variety of configurations. In some cases, adjacent capacitors can be connected in parallel to generate additional capacitance structures. In some cases, adjacent capacitors can be connected in series. Optionally, different planar double-sided multi-terminal capacitor devices can be stacked on top of one another to provide for additional flexibility and areal capacitance density.

Illustrative Aspects

As used below, any reference to a series of aspects (e.g., "Aspects 1-4") or non-enumerated group of aspects (e.g., "any previous or subsequent aspect") is to be understood as a reference to each of those aspects disjunctively (e.g., "Aspects 1-4" is to be understood as "Aspects 1, 2, 3, or 4").

Aspect 1 is a multi-terminal capacitor device comprising: a plurality of individual capacitors arranged in a single device layer, each individual capacitor comprising: a first electrode comprising a modified aluminum foil; a dielectric layer conformal with the first electrode, the dielectric layer comprising aluminum oxide; and a second electrode comprising a conductive material in conformal contact with the dielectric layer; and a plurality of capacitor terminals including one or more first electrode terminals and one or more second electrode terminals, each first electrode terminal in electrical contact with one or more first electrodes and each second electrode terminal in electrical contact with one or more second electrodes.

Aspect 2 is the multi-terminal capacitor device of any previous or subsequent aspect, wherein the plurality of individual capacitors comprises: a continuous first electrode, wherein the continuous first electrode comprises the modified aluminum foil, and wherein the continuous first electrode corresponds to the first electrode of each of the plurality of individual capacitors; a continuous dielectric layer conformal with the continuous first electrode, wherein the continuous dielectric layer comprises the aluminum oxide, and wherein the continuous dielectric layer corresponds to the dielectric layer of each of the plurality of individual capacitors; and a plurality of individual second electrodes each in conformal contact with the continuous dielectric layer, wherein each of the plurality of individual second electrodes comprises the conductive material, wherein each of the plurality of individual second electrodes is spatially separated from adjacent individual second electrodes by a spacing, and wherein each of the plurality of individual second electrodes corresponds to the second electrode of different individual capacitors of the plurality of individual capacitors.

Aspect 3 is the multi-terminal capacitor device of any previous or subsequent aspect, wherein the continuous first electrode has lateral dimensions of from 1 mm to 100 mm.

Aspect 4 is the multi-terminal capacitor device of any previous or subsequent aspect, wherein the plurality of individual second electrodes each independently have lateral dimensions of from 0.1 mm to 50 mm.

Aspect 5 is the multi-terminal capacitor device of any previous or subsequent aspect, wherein the spacing is from 1 µm to 10 mm.

Aspect 6 is the multi-terminal capacitor device of any previous or subsequent aspect, wherein the plurality of individual capacitors comprises: a plurality of individual first electrodes, wherein each of the plurality of individual first electrodes comprises the modified aluminum foil, wherein each of the plurality of individual first electrodes is spatially separated from adjacent individual first electrodes by a spacing, and wherein each of the plurality of individual first electrodes corresponds to the first electrode of different individual capacitors of the plurality of individual capacitors; a plurality of individual dielectric layers, wherein each of the plurality of individual dielectric layers is conformal with a corresponding individual first electrode, wherein each of the plurality of individual dielectric layers comprises the aluminum oxide, and wherein each of the plurality of individual dielectric layers corresponds to the dielectric layer of different individual capacitors of the plurality of individual capacitors; and a continuous second electrode in conformal contact with each of the plurality of individual dielectric layers, wherein the continuous second electrode comprises the conductive material, and wherein the continuous second electrode corresponds to the second electrode of each of the plurality of individual capacitors.

Aspect 7 is the multi-terminal capacitor device of any previous or subsequent aspect, wherein the continuous second electrode has lateral dimensions of from 1 mm to 100 mm.

Aspect 8 is the multi-terminal capacitor device of any previous or subsequent aspect, wherein the plurality of individual first electrodes each independently have lateral dimensions of from 0.1 mm to 50 mm.

Aspect 9 is the multi-terminal capacitor device of any previous or subsequent aspect, wherein the spacing is from 1 µm to 1 mm.

Aspect 10 is the multi-terminal capacitor device of any previous or subsequent aspect, wherein each of the plurality of individual capacitors comprises: a plurality of individual first electrodes, wherein each of the plurality of individual first electrodes comprises the modified aluminum foil, wherein each of the plurality of individual first electrodes is spatially separated from adjacent individual first electrodes by a spacing, and wherein each of the plurality of individual first electrodes corresponds to the first electrode of different individual capacitors of the plurality of individual capacitors; a plurality of individual dielectric layers, wherein each of the plurality of individual dielectric layers is conformal with a corresponding individual first electrode, wherein each of the plurality of individual dielectric layers comprises the aluminum oxide, and wherein each of the plurality of individual dielectric layers corresponds to the dielectric layer of different individual capacitors of the plurality of individual capacitors; and a plurality of individual second electrodes, wherein each of the plurality of individual second electrodes is in conformal contact with a corresponding individual dielectric layer, wherein each of the plurality of individual second electrodes comprises the conductive material, wherein each of the plurality of individual second electrodes is spatially separated from adjacent individual second electrodes by the spacing, and wherein each of the plurality of individual second electrodes corresponds to the second electrode of different individual capacitors of the plurality of individual capacitors.

Aspect 11 is the multi-terminal capacitor device of any previous or subsequent aspect, wherein the plurality of individual first electrodes and the plurality of individual second electrodes each independently have lateral dimensions of from 0.1 mm to 50 mm.

Aspect 12 is the multi-terminal capacitor device of any previous or subsequent aspect, wherein the spacing is from 1 µm to 10 mm.

Aspect 13 is the multi-terminal capacitor device of any previous or subsequent aspect, further comprising: one or more additional device layers positioned adjacent to the single device layer in a stacked configuration, wherein each of the one or more additional device layers includes a plurality of additional individual capacitors, each additional individual capacitor comprising: an additional first electrode comprising modified aluminum foil; an additional dielectric layer conformal with the additional first electrode, the additional dielectric layer comprising aluminum oxide; and an additional second electrode comprising conductive material in conformal contact with the additional dielectric layer; and an additional plurality of capacitor terminals including one or more additional first electrode terminals and one or more additional second electrode terminals, each additional first electrode terminal in electrical contact with one or more additional first electrodes and each additional second electrode terminal in electrical contact with one or more additional second electrodes.

Aspect 14 is the multi-terminal capacitor device of any previous or subsequent aspect, wherein the single device layer and the one or more additional device layers are stacked so as to occupy a same areal footprint.

Aspect 15 is the multi-terminal capacitor device of any previous or subsequent aspect, wherein a total capacitance of the multi-terminal capacitor device is a sum of a first capacitance provided by the single device layer and additional capacitances provided by the one or more additional device layers.

Aspect 16 is the multi-terminal capacitor device of any previous or subsequent aspect, wherein the modified aluminum foil comprises a etched aluminum foil.

Aspect 17 is the multi-terminal capacitor device of any previous or subsequent aspect, wherein the modified aluminum foil comprises an aluminum foil that is etched on one or both surfaces, such as an aluminum foil that is etched on a top surface of the aluminum foil, a bottom surface of the aluminum foil, or both top and bottom surfaces of the aluminum foil.

Aspect 18 is the multi-terminal capacitor device of any previous or subsequent aspect, wherein the etched aluminum foil comprises a plurality of tunnels corresponding to recessed regions within the modified aluminum foil, and wherein the dielectric layer extends within the plurality of tunnels and conformally coats a surface therein.

Aspect 19 is the multi-terminal capacitor device of any previous or subsequent aspect, wherein the first electrode comprises aluminum having a purity of greater than 80%.

Aspect 20 is the multi-terminal capacitor device of any previous or subsequent aspect, wherein the first electrode has a thickness of from 5 µm to 500 µm.

Aspect 21 is the multi-terminal capacitor device of any previous or subsequent aspect, wherein the first electrode exhibits a volumetric surface area of from 100 $mm^2/mm^3$ to 10,000 $mm^2/mm^3$.

Aspect 22 is the multi-terminal capacitor device of any previous or subsequent aspect, wherein the modified aluminum foil comprises sintered aluminum powder supported by and in physical and electrical contact with an aluminum foil substrate or wherein the modified aluminum foil comprises any other high surface area material structures.

Aspect 23 is the multi-terminal capacitor device of any previous or subsequent aspect, wherein the modified aluminum foil comprises vapor deposited aluminum, aluminum oxide, titanium, or titanium oxide supported by and in physical and electrical contact with an aluminum foil.

Aspect 24 is the multi-terminal capacitor device of any previous or subsequent aspect, wherein the vapor deposited aluminum, aluminum oxide, titanium, or titanium oxide is deposited using a glancing angle deposition process.

Aspect 25 is the multi-terminal capacitor device of any previous or subsequent aspect, wherein the first electrode comprises an aluminum alloy including one or more alloying elements or dopants selected from Ti, Zr, Si, Mg, Cu, Ta, Ba, or Ce.

Aspect 26 is the multi-terminal capacitor device of any previous or subsequent aspect, wherein the dielectric layer comprises aluminum oxide doped with one or more other oxides, such as oxides of Ti, Zr, Si, Mg, Cu, Ta, Ba, or Ce.

Aspect 27 is the multi-terminal capacitor device of any previous or subsequent aspect, wherein the dielectric layer has a dielectric constant of from 5 to 1000.

Aspect 28 is the multi-terminal capacitor device of any previous or subsequent aspect, wherein the dielectric layer has a thickness of from 3 nm to 100 nm.

Aspect 29 is the multi-terminal capacitor device of any previous or subsequent aspect, wherein the dielectric layer is formed through a process including anodizing the modified aluminum foil.

Aspect 30 is the multi-terminal capacitor device of any previous or subsequent aspect, wherein the conductive material is a conducting polymer, such as one or more of a polypyrrole, a polythiophene, a polyaniline, a polyacetylene, a polyphenylene, a poly(p-phenylene-vinylene), PEDOT: PSS (poly(3,4-ethylenedioxythiophene) polystyrene sulfonate), or P3HT (poly(3-hexylthiophene-2,5-diyl)), or a metal, or a conductive ceramic, such as TiN.

Aspect 31 is the multi-terminal capacitor device of any previous or subsequent aspect, wherein the conductive material conformally coats non-planar regions of the first electrode and is separated from the first electrode by the dielectric layer.

Aspect 32 is the multi-terminal capacitor device of any previous or subsequent aspect, wherein the second electrode has a thickness of from 5 nm to 50 µm.

Aspect 33 is the multi-terminal capacitor device of any previous or subsequent aspect, wherein the plurality of individual capacitors each exhibit a capacitance density of from 0.05 µF/mm$^2$ to 25 µF/mm$^2$.

Aspect 34 is the multi-terminal capacitor device of any previous or subsequent aspect, wherein each of the plurality of individual capacitors is independently electrically addressable.

Aspect 35 is the multi-terminal capacitor device of any previous or subsequent aspect, wherein the plurality of individual capacitors each have independent lateral dimensions.

Aspect 36 is the multi-terminal capacitor device of any previous or subsequent aspect, wherein the plurality of individual capacitors each independently have a footprint of 0.1 mm$^2$ to 2500 mm$^2$.

Aspect 37 is the multi-terminal capacitor device of any previous or subsequent aspect, wherein the single device layer has a thickness of from 50 µm to 500 µm.

Aspect 38 is the multi-terminal capacitor device of any previous or subsequent aspect, further comprising a substrate or transfer tape supporting the plurality of individual capacitors.

Aspect 39 is the multi-terminal capacitor device of any previous or subsequent aspect, wherein the second electrode further comprises: a conducting carbonaceous layer in physical contact with the conductive material.

Aspect 40 is the multi-terminal capacitor device of any previous or subsequent aspect, wherein the conducting carbonaceous layer comprises one or more of carbon black, graphite, a carbon-based ink, a polymeric binder, sputtered carbon, or carbon-polymer composites.

Aspect 41 is the multi-terminal capacitor device of any previous or subsequent aspect, wherein the conducting carbonaceous layer has a thickness of from 100 nm to 100 µm.

Aspect 42 is the multi-terminal capacitor device of any previous or subsequent aspect, wherein the second electrode further comprises: a diffusion barrier layer in electrical contact with the conductive material.

Aspect 43 is the multi-terminal capacitor device of any previous or subsequent aspect, wherein the diffusion barrier layer comprises Ti, W, Cr, Ti—W, TaN, or Co—W.

Aspect 44 is the multi-terminal capacitor device of any previous or subsequent aspect, wherein the diffusion barrier layer has a thickness of from 10 nm to 2500 nm.

Aspect 45 is the multi-terminal capacitor device of any previous or subsequent aspect, wherein the second electrode further comprises: a metallization layer in electrical contact with the conductive material.

Aspect 46 is the multi-terminal capacitor device of any previous or subsequent aspect, wherein the metallization layer comprises Ag, Au, Cu, Pt, Pd, and/or composites or alloys of these, polymers, epoxies, silicones, or fluoroelastomers.

Aspect 47 is the multi-terminal capacitor device of any previous or subsequent aspect, wherein the metallization layer has a thickness of from 100 nm to 2500 nm.

Aspect 48 is the multi-terminal capacitor device of any previous or subsequent aspect, wherein the second electrode further comprises: a metal contact layer in electrical contact with the conductive material.

Aspect 49 is the multi-terminal capacitor device of any previous or subsequent aspect, wherein the metal contact layer comprises Cu or Ag.

Aspect 50 is the multi-terminal capacitor device of any previous or subsequent aspect, wherein the metal contact layer has a thickness of from 0.5 µm to 50 µm.

Aspect 51 is the multi-terminal capacitor device of any previous or subsequent aspect, further comprising a dielectric planarization layer positioned adjacent to the plurality of individual capacitors.

Aspect 52 is the multi-terminal capacitor device of any previous or subsequent aspect, further comprising a plurality of conductor filled vias, wherein each conductor filled via extends through the dielectric planarization layer, and wherein each conductor filled via provides electrical contact between a corresponding capacitor terminal and a corresponding first electrode or corresponding second electrode.

Aspect 53 is the multi-terminal capacitor device of any previous or subsequent aspect, wherein the dielectric planarization layer has a thickness of from 1 µm to 100 µm.

Aspect 54 is the multi-terminal capacitor device of any previous or subsequent aspect, further comprising an insulating material in a spacing separating adjacent individual capacitors.

Aspect 55 is the multi-terminal capacitor device of any previous or subsequent aspect, further comprising a plurality of conductor filled vias, wherein each conductor filled via is positioned within the spacing separating adjacent individual capacitors and extends through the insulating material, and wherein each conductor filled via provides electrical contact between a corresponding capacitor terminal and a corresponding first electrode or corresponding second electrode.

Aspect 56 is the multi-terminal capacitor device of any previous or subsequent aspect, wherein a spacing separating adjacent individual capacitors is from 1 µm to 10 mm.

Aspect 57 is the multi-terminal capacitor device of any previous or subsequent aspect, wherein the single device layer is in a planar configuration or a curved configuration exhibiting a radius of curvature greater than 5 cm.

Aspect 58 is a method comprising: providing a capacitor, wherein the capacitor comprises: a first electrode comprising a modified aluminum foil; a dielectric layer conformal with the first electrode, the dielectric layer comprising aluminum oxide; and a second electrode comprising a conductive material in conformal contact with the dielectric layer; patterning the capacitor to remove portions of the capacitor to form a plurality of individual capacitors arranged in a single device layer; and providing a plurality of capacitor terminals including one or more first electrode terminals and one or more second electrode terminals, wherein each first electrode terminal of the one or more first electrode terminals is in electrical contact with one or more of the first electrodes, and wherein each second electrode terminal of the one or more second electrode terminals is in electrical contact with one or more of the second electrodes, thereby generating a multi-terminal capacitor device.

Aspect 59 is the method of any previous or subsequent aspect, wherein providing the capacitor comprises: providing the modified aluminum foil; subjecting the modified aluminum foil to an anodizing process, wherein the anodizing process generates the dielectric layer conformal with the first electrode; and arranging the conductive material adjacent to the dielectric layer.

Aspect 60 is the method of any previous or subsequent aspect, wherein providing the capacitor further comprises one or more of: depositing a conducting carbonaceous layer over the conductive material; depositing a diffusion barrier layer over the conductive material; or depositing a metallization layer over the conductive material.

Aspect 61 is the method of any previous or subsequent aspect, wherein providing the capacitor further comprises: patterning the modified aluminum foil prior to arranging the conductive material adjacent to the dielectric layer.

Aspect 62 is the method of any previous or subsequent aspect, wherein the modified aluminum foil is patterned prior to arranging the conductive material adjacent to the dielectric layer.

Aspect 63 is the method of any previous or subsequent aspect, wherein providing the capacitor further comprises: patterning the modified aluminum foil prior to subjecting the modified aluminum foil to the anodizing process.

Aspect 64 is the method of any previous or subsequent aspect, wherein the modified aluminum foil is patterned prior to subjecting the modified aluminum foil to the anodizing process.

Aspect 65 is the method of any previous or subsequent aspect, wherein providing the capacitor comprises: patterning the modified aluminum foil using a laser etching or laser ablation process.

Aspect 66 is the method of any previous or subsequent aspect, wherein patterning the capacitor comprises one or more of: patterning the first electrode to generate a plurality of individual first electrodes; patterning the dielectric layer to generate a plurality of individual dielectric layers; or patterning the second electrode to generate a plurality of individual second electrodes.

Aspect 67 is the method of any previous or subsequent aspect, wherein patterning the capacitor comprises one or more of: masking and etching the capacitor; subjecting the capacitor to a laser etching or laser ablation process; or mechanically dicing the capacitor.

Aspect 68 is the method of any previous or subsequent aspect, wherein patterning the capacitor comprises: depositing a polymer isolation bridge pattern; and depositing a conductive material so that it is contained within the polymer isolation bridge pattern.

Aspect 69 is the method of any previous or subsequent aspect, wherein patterning the capacitor comprises: depositing a polymer isolation bridge pattern with polymer microdispensing or microprinting; and depositing a conductive material with microdispensing or microprinting so that it is contained within the polymer isolation bridge pattern.

Aspect 70 is the method of any previous or subsequent aspect, wherein masking and etching the capacitor comprises: masking the second electrode with a photoresist; and wet etching of unmasked second electrode portions or plasma etching of unmasked secondary electrode portions, thereby generating a plurality of individual second electrodes.

Aspect 71 is a method comprising: providing a modified aluminum foil, wherein the modified aluminum foil comprises an aluminum core layer, a modified top surface, and a modified bottom surface; subjecting the modified aluminum foil to an anodizing process, wherein the anodizing process generates a dielectric layer on and conformal with the modified top surface and the modified bottom surface; and arranging a conductive material adjacent to the dielectric layer.

Aspect 72 is the method of any previous or subsequent aspect, further comprising one or more of: depositing a conducting carbonaceous layer over the conductive material; depositing a diffusion barrier layer over the conductive material; or depositing a metallization layer over the conductive material.

Aspect 73 is the method of any previous or subsequent aspect, further comprising: patterning the modified aluminum foil prior to arranging the conductive material adjacent to the dielectric layer.

Aspect 74 is the method of any previous or subsequent aspect, further comprising: patterning the modified aluminum foil prior to subjecting the modified aluminum foil to the anodizing process.

Aspect 75 is the method of any previous or subsequent aspect, further comprising: patterning the modified aluminum foil using a laser etching or laser ablation process.

Aspect 76 is the method of any previous or subsequent aspect, wherein providing the capacitor comprises the method of any previous or subsequent aspect.

Aspect 77 is a multi-component device comprising: a multi-terminal capacitor device, the multi-terminal capacitor device comprising: a plurality of individual capacitors arranged in a single device layer, each individual capacitor comprising: a first electrode comprising a modified aluminum foil; a dielectric layer conformal with the first electrode, the dielectric layer comprising aluminum oxide; and a second electrode comprising a conductive material in conformal contact with the dielectric layer; and a plurality of capacitor terminals including one or more first electrode terminals and one or more second electrode terminals, each first electrode terminal in electrical contact with one or more first electrodes and each second electrode terminal in electrical contact with one or more second electrodes; and one or more circuit components, wherein at least one of the one or more circuit components is positioned in electrical communication with at least one capacitor terminal of the plurality of capacitor terminals.

Aspect 79 is a double-sided capacitor device, comprising: a first electrode comprising a modified aluminum foil, wherein the modified aluminum foil comprises an aluminum core layer, a modified top surface, and a modified bottom surface; a dielectric layer conformal with the first electrode, the dielectric layer comprising aluminum oxide; and a second electrode comprising a conductive material in conformal contact with the dielectric layer.

Aspect 80 is the device of any previous or subsequent aspect, wherein the device comprises the multi-terminal capacitor device of any previous or subsequent aspect or a component thereof.

Aspect 81 is the device of any previous or subsequent aspect, made by the method of any previous or subsequent aspect.

Aspect 82 is the method of any previous or subsequent aspect, comprising a method of making the device of any previous or subsequent aspect.

Aspect 83 is the device of any previous or subsequent aspect, made by the method of any previous or subsequent aspect.

All patents, publications and abstracts cited above are incorporated herein by reference in their entirety. The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A device, comprising:
   a plurality of capacitors, wherein a capacitor of the plurality of capacitors comprises:
      a first electrode comprising an aluminum substrate comprising a top porous surface and a bottom porous surface,
      a top dielectric layer conformal to the top porous surface and a bottom dielectric layer conformal to the bottom porous surface, and
      a second electrode comprising at least one conductive top layer disposed on the top dielectric layer and at least one conductive bottom layer disposed on the bottom dielectric layer; and
   a plurality of terminals comprising a top first electrode terminal and a bottom first electrode terminal in electrical contact with one or more first electrodes of the plurality of capacitors, the plurality of terminals further comprising a top second electrode terminal and a bottom second electrode terminal that are electrically isolated from the top first and bottom first electrode terminals and in electrical contact with one or more second electrodes of the plurality of capacitors;
   wherein the capacitor of the plurality of capacitors further comprises:
      a first electrode through via formed through the first electrode, the top and bottom dielectric layers, and the second electrode and in electrical contact with the first electrode, the top first electrode terminal, and the bottom first electrode terminal; and
      a second electrode through via in electrical contact with the at least one conductive top layer of the second electrode, the at least one conductive bottom layer of the second electrode, the top second electrode terminal, and the bottom second electrode terminal;
   wherein the at least one conductive top layer defines a concave depression where the second electrode through via extends through the at least one conductive top layer.

2. The device of claim 1, wherein the aluminum substrate comprises a solid aluminum core disposed between the top porous surface and the bottom porous surface.

3. The device of claim 1, wherein the capacitor of the plurality of capacitors further comprises a blind via in electrical contact with the at least one conductive top layer or the at least one conductive bottom layer of the second electrode, but not both.

4. The device of claim 1, wherein the capacitor of the plurality of capacitors further comprises a blind via in electrical contact with the first electrode.

5. The device of claim 1, wherein the top first electrode terminal is co-planar with the top second electrode terminal and the bottom first electrode terminal is co-planar with the bottom second electrode terminal.

6. The device of claim 1, wherein the first electrode and the second electrode of the capacitor are electrically and physically isolated from an adjacent first electrode and an adjacent second electrode of an adjacent capacitor of the plurality of capacitors by an electrically insulating dielectric substantially filling a volume between the capacitor and the adjacent capacitor.

7. The device of claim 1, wherein the plurality of capacitors is arranged in a single layer within the device.

8. The device of claim 1, wherein the first electrode is common to the plurality of capacitors.

9. The device of claim 1, wherein the second electrode is common to the plurality of capacitors.

10. The device of claim 1, wherein the top dielectric layer or the bottom dielectric layer comprise aluminum oxide.

11. The device of claim 10, wherein the top dielectric layer or the bottom dielectric layer is doped with an additional oxide.

12. The device of claim 1, wherein the first electrode comprises titanium.

13. The device of claim 1, wherein the at least one conductive top layer comprises a top conductive material layer conformal to the top dielectric layer and the at least one conductive bottom layer comprises a bottom conductive material layer conformal to the bottom dielectric layer.

14. The device of claim 13, wherein the at least one conductive top layer and the at least one conductive bottom layer further comprise one or more of a carbonaceous layer, a diffusion barrier layer, and a metallization layer.

15. The device of claim 1, wherein the at least one conductive bottom layer defines a concave depression where the second electrode through via extends through the at least one conductive bottom layer.

16. A device, comprising:
   a plurality of capacitors, wherein a capacitor of the plurality of capacitors comprises:
      a first electrode comprising an aluminum substrate comprising a top porous surface and a bottom porous surface,
      a top dielectric layer conformal to the top porous surface and a bottom dielectric layer conformal to the bottom porous surface, and
      a second electrode comprising at least one conductive top layer disposed on the top dielectric layer and at least one conductive bottom layer disposed on the bottom dielectric layer, wherein the at least one conductive top layer comprises a top conductive material layer conformal to the top dielectric layer and the at least one conductive bottom layer comprises a bottom conductive material layer conformal to the bottom dielectric layer; and
   a plurality of terminals comprising a top first electrode terminal and a bottom first electrode terminal in electrical contact with one or more first electrodes of the plurality of capacitors, the plurality of terminals further comprising a top second electrode terminal and a bottom second electrode terminal that are electrically isolated from the top first and bottom first electrode terminals and in electrical contact with one or more second electrodes of the plurality of capacitors;
   wherein the capacitor of the plurality of capacitors further comprises:
      a first electrode through via formed through the first electrode, the top and bottom dielectric layers, and the second electrode and in electrical contact with the first electrode, the top first electrode terminal, and the bottom first electrode terminal; and
      a second electrode through via in electrical contact with the at least one conductive top layer of the second electrode, the at least one conductive bottom layer of the second electrode, the top second electrode terminal, and the bottom second electrode terminal, wherein the top dielectric layer and the bottom dielectric layer are connected together by a via-facing dielectric layer that protects a surface of the first electrode facing the second electrode through via, wherein the top conductive material layer and the bottom conductive material layer are connected together by a conductive material layer that coats the via-facing dielectric layer;

wherein the at least one conductive top layer defines a concave depression where the second electrode through via extends through the at least one conductive top layer.

17. The device of claim 16, wherein the first electrode and the second electrode of the capacitor are electrically and physically isolated from an adjacent first electrode and an adjacent second electrode of an adjacent capacitor of the plurality of capacitors by an electrically insulating dielectric substantially filling a volume between the capacitor and the adjacent capacitor.

18. The device of claim 16, wherein the plurality of capacitors is arranged in a single layer within the device.

19. The device of claim 16, wherein the second electrode is common to the plurality of capacitors.

20. The device of claim 16, wherein the at least one conductive top layer comprises a top conductive material layer conformal to the top dielectric layer and the at least one conductive bottom layer comprises a bottom conductive material layer conformal to the bottom dielectric layer.

21. The device of claim 20, wherein the at least one conductive top layer and the at least one conductive bottom layer further comprise one or more of a carbonaceous layer, a diffusion barrier layer, and a metallization layer.

22. A device, comprising:
a plurality of capacitors, wherein a capacitor of the plurality of capacitors comprises:
a first electrode comprising an aluminum substrate comprising a top porous surface and a bottom porous surface,
a top dielectric layer conformal to the top porous surface and a bottom dielectric layer conformal to the bottom porous surface, and
a second electrode comprising at least one conductive top layer disposed on the top dielectric layer and at least one conductive bottom layer disposed on the bottom dielectric layer, wherein the at least one conductive top layer comprises a top conductive material layer conformal to the top dielectric layer and the at least one conductive bottom layers comprise a bottom conductive material layer conformal to the bottom dielectric layer; and
a plurality of terminals comprising a top first electrode terminal and a bottom first electrode terminal in electrical contact with one or more first electrodes of the plurality of capacitors, the plurality of terminals further comprising a top second electrode terminal and a bottom second electrode terminal that are electrically isolated from the top first and bottom first electrode terminals and in electrical contact with one or more second electrodes of the plurality of capacitors;
wherein the capacitor of the plurality of capacitors further comprises a through via in electrical contact with the at least one conductive top layer of the second electrode, the at least one conductive bottom layer of the second electrode, the top second electrode terminal, and the bottom second electrode terminal, wherein the top dielectric layer and the bottom dielectric layer are connected together by a via-facing dielectric layer that protects a surface of the first electrode facing the through via, wherein the top conductive material layer and the bottom conductive material layer are connected together by a conductive material layer that coats the via-facing dielectric layer;
wherein the at least one conductive top layer defines a concave depression where the through via extends through the at least one conductive top layer.

23. The device of claim 22, wherein the first electrode and the second electrode of the capacitor are electrically and physically isolated from an adjacent first electrode and an adjacent second electrode of an adjacent capacitor of the plurality of capacitors by an electrically insulating dielectric substantially filling a volume between the capacitor and the adjacent capacitor.

24. The device of claim 22, wherein the plurality of capacitors is arranged in a single layer within the device.

25. The device of claim 22, wherein the second electrode is common to the plurality of capacitors.

26. The device of claim 22, wherein the at least one conductive top layer comprises a top conductive material layer conformal to the top dielectric layer and the at least one conductive bottom layer comprises a bottom conductive material layer conformal to the bottom dielectric layer.

27. The device of claim 26, wherein the at least one conductive top layer and the at least one conductive bottom layer further comprise one or more of a carbonaceous layer, a diffusion barrier layer, and a metallization layer.

28. A device, comprising:
a plurality of capacitors, wherein a capacitor of the plurality of capacitors comprises:
a first electrode comprising an aluminum substrate comprising a top porous surface and a bottom porous surface,
a top dielectric layer conformal to the top porous surface and a bottom dielectric layer conformal to the bottom porous surface, and
a second electrode comprising at least one conductive top layer disposed on the top dielectric layer and at least one conductive bottom layer disposed on the bottom dielectric layer, wherein the at least one conductive top layer comprises a top conductive material layer conformal to the top dielectric layer and the at least one conductive bottom layer comprises a bottom conductive material layer conformal to the bottom dielectric layer; and
a plurality of terminals comprising at least one first electrode terminal in electrical contact with one or more first electrodes of the plurality of capacitors and at least one second electrode terminal electrically isolated from the at least one first electrode terminal and in electrical contact with one or more second electrodes of the plurality of capacitors;
wherein the capacitor of the plurality of capacitors further comprises a through via in electrical contact with the at least one conductive top layer of the second electrode, the at least one conductive bottom layer of the second electrode, and the at least one second electrode terminal, wherein the top dielectric layer and the bottom dielectric layer are connected together by a via-facing dielectric layer that protects a surface of the first electrode facing the through via, wherein the top conductive material layer and the bottom conductive material layer are connected together by a conductive material layer that coats the via-facing dielectric layer;
wherein the at least one conductive top layer defines a concave depression where the through via extends through the at least one conductive top layer.

29. The device of claim 28, wherein the first electrode and the second electrode of the capacitor are electrically and physically isolated from an adjacent first electrode and an adjacent second electrode of an adjacent capacitor of the plurality of capacitors by an electrically insulating dielectric substantially filling a volume between the capacitor and the adjacent capacitor.

30. The device of claim 28, wherein the plurality of capacitors is arranged in a single layer within the device.

31. The device of claim 28, wherein the second electrode is common to the plurality of capacitors.

32. The device of claim 28, wherein the top dielectric layer or the bottom dielectric layer comprise aluminum oxide.

33. The device of claim 28, wherein the top dielectric layer or the bottom dielectric layer is doped with an additional oxide.

34. The device of claim 28, wherein the first electrode comprises titanium.

35. The device of claim 28, wherein the at least one conductive top layer comprises a top conductive material layer conformal to the top dielectric layer and the at least one conductive bottom layer comprises a bottom conductive material layer conformal to the bottom dielectric layer.

36. The device of claim 35, wherein the at least one conductive top layer and the at least one conductive bottom layer further comprise one or more of a carbonaceous layer, a diffusion barrier layer, and a metallization layer.

37. The device of claim 28, wherein the at least one conductive bottom layer defines a concave depression where the through via extends through the at least one conductive bottom layer.

38. A device, comprising:
a plurality of capacitors, wherein a capacitor of the plurality of capacitors comprises:
a first electrode comprising an aluminum substrate comprising a top porous surface and a bottom porous surface,
a top dielectric layer conformal to the top porous surface and a bottom dielectric layer conformal to the bottom porous surface, and
a second electrode comprising at least one conductive top layer disposed on the top dielectric layer and at least one conductive bottom layer disposed on the bottom dielectric layer; and
a plurality of terminals comprising a top first electrode terminal and a bottom first electrode terminal in electrical contact with one or more first electrodes of the plurality of capacitors, the plurality of terminals further comprising a top second electrode terminal and a bottom second electrode terminal that are electrically isolated from the top first and bottom first electrode terminals and in electrical contact with one or more second electrodes of the plurality of capacitors;
wherein the capacitor of the plurality of capacitors further comprises:
a first electrode through via formed through the first electrode, the top and bottom dielectric layers, and the second electrode and in electrical contact with the first electrode, the top first electrode terminal, and the bottom first electrode terminal; and
a second electrode through via in electrical contact with the at least one conductive top layer of the second electrode, the at least one conductive bottom layer of the second electrode, the top second electrode terminal, and the bottom second electrode terminal;
wherein the at least one conductive bottom layer defines a concave depression where the second electrode through via extends through the at least one conductive bottom layer.

39. A device, comprising:
a plurality of capacitors, wherein a capacitor of the plurality of capacitors comprises:
a first electrode comprising an aluminum substrate comprising a top porous surface and a bottom porous surface,
a top dielectric layer conformal to the top porous surface and a bottom dielectric layer conformal to the bottom porous surface, and
a second electrode comprising at least one conductive top layer disposed on the top dielectric layer and at least one conductive bottom layer disposed on the bottom dielectric layer, wherein the at least one conductive top layer comprises a top conductive material layer conformal to the top dielectric layer and the at least one conductive bottom layer comprises a bottom conductive material layer conformal to the bottom dielectric layer; and
a plurality of terminals comprising a top first electrode terminal and a bottom first electrode terminal in electrical contact with one or more first electrodes of the plurality of capacitors, the plurality of terminals further comprising a top second electrode terminal and a bottom second electrode terminal that are electrically isolated from the top first and bottom first electrode terminals and in electrical contact with one or more second electrodes of the plurality of capacitors;
wherein the capacitor of the plurality of capacitors further comprises:
a first electrode through via formed through the first electrode, the top and bottom dielectric layers, and the second electrode and in electrical contact with the first electrode, the top first electrode terminal, and the bottom first electrode terminal; and
a second electrode through via in electrical contact with the at least one conductive top layer of the second electrode, the at least one conductive bottom layer of the second electrode, the top second electrode terminal, and the bottom second electrode terminal, wherein the top dielectric layer and the bottom dielectric layer are connected together by a via-facing dielectric layer that protects a surface of the first electrode facing the second electrode through via, wherein the top conductive material layer and the bottom conductive material layer are connected together by a conductive material layer that coats the via-facing dielectric layer;
wherein the at least one conductive bottom layer defines a concave depression where the second electrode through via extends through the at least one conductive bottom layer.

40. A device, comprising:
a plurality of capacitors, wherein a capacitor of the plurality of capacitors comprises:
a first electrode comprising an aluminum substrate comprising a top porous surface and a bottom porous surface,
a top dielectric layer conformal to the top porous surface and a bottom dielectric layer conformal to the bottom porous surface, and
a second electrode comprising at least one conductive top layer disposed on the top dielectric layer and at least one conductive bottom layer disposed on the bottom dielectric layer, wherein the at least one conductive top layer comprises a top conductive material layer conformal to the top dielectric layer and the at least one conductive bottom layers comprise a bottom conductive material layer conformal to the bottom dielectric layer; and a plurality of terminals comprising a top first electrode terminal and a bottom first electrode terminal in electrical contact with one or more first electrodes of the plurality of capacitors, the plurality of terminals further comprising a top second electrode terminal and a bottom second electrode terminal that are electrically isolated from the top first and bottom first electrode terminals and in electrical contact with one or more second electrodes of the plurality of capacitors;

wherein the capacitor of the plurality of capacitors further comprises a through via in electrical contact with the at least one conductive top layer of the second electrode, the at least one conductive bottom layer of the second electrode, the top second electrode terminal, and the bottom second electrode terminal, wherein the top dielectric layer and the bottom dielectric layer are connected together by a via-facing dielectric layer that protects a surface of the first electrode facing the through via, wherein the top conductive material layer and the bottom conductive material layer are connected together by a conductive material layer that coats the via-facing dielectric layer;

wherein the at least one conductive bottom layer defines a concave depression where the through via extends through the at least one conductive bottom layer.

41. A device, comprising:
a plurality of capacitors, wherein a capacitor of the plurality of capacitors comprises:
 a first electrode comprising an aluminum substrate comprising a top porous surface and a bottom porous surface, a top dielectric layer conformal to the top porous surface and a bottom dielectric layer conformal to the bottom porous surface, and a second electrode comprising at least one conductive top layer disposed on the top dielectric layer and at least one conductive bottom layer disposed on the bottom dielectric layer, wherein the at least one conductive top layer comprises a top conductive material layer conformal to the top dielectric layer and the at least one conductive bottom layer comprises a bottom conductive material layer conformal to the bottom dielectric layer; and a plurality of terminals comprising at least one first electrode terminal in electrical contact with one or more first electrodes of the plurality of capacitors and at least one second electrode terminal electrically isolated from the at least one first electrode terminal and in electrical contact with one or more second electrodes of the plurality of capacitors;

wherein the capacitor of the plurality of capacitors further comprises a through via in electrical contact with the at least one conductive top layer of the second electrode, the at least one conductive bottom layer of the second electrode, and the at least one second electrode terminal, wherein the top dielectric layer and the bottom dielectric layer are connected together by a via-facing dielectric layer that protects a surface of the first electrode facing the through via, wherein the top conductive material layer and the bottom conductive material layer are connected together by a conductive material layer that coats the via-facing dielectric layer;

wherein the at least one conductive bottom layer defines a concave depression where the through via extends through the at least one conductive bottom layer.

* * * * *